(12) United States Patent
Fochs

(10) Patent No.: US 10,122,195 B2
(45) Date of Patent: Nov. 6, 2018

(54) DESK ORGANIZER

(71) Applicant: Thomas P Fochs, Victorville, CA (US)

(72) Inventor: Thomas P Fochs, Victorville, CA (US)

( * ) Notice: Subject to any disclaimer, the term of this patent is extended or adjusted under 35 U.S.C. 154(b) by 155 days.

(21) Appl. No.: 15/233,250

(22) Filed: Aug. 10, 2016

(65) Prior Publication Data

US 2017/0047754 A1 Feb. 16, 2017

Related U.S. Application Data

(60) Provisional application No. 62/204,047, filed on Aug. 12, 2015.

(51) Int. Cl.
| | |
|---|---|
| *H02J 7/00* | (2006.01) |
| *A47B 49/00* | (2006.01) |
| *B43M 99/00* | (2010.01) |
| *H02J 1/00* | (2006.01) |

(52) U.S. Cl.
CPC ............ *H02J 7/0045* (2013.01); *A47B 49/00* (2013.01); *B43M 99/008* (2013.01); *H02J 1/00* (2013.01); *H02J 7/0052* (2013.01); *H02J 2001/002* (2013.01); *H02J 2007/0062* (2013.01)

(58) Field of Classification Search
CPC .......... H02J 7/0045; H02J 1/00; H02J 7/0052; H02J 2001/002; H02J 2007/0062; A47B 49/00; B43M 99/008
See application file for complete search history.

(56) References Cited

U.S. PATENT DOCUMENTS

| | | | | |
|---|---|---|---|---|
| 2,614,698 | A | * 10/1952 | Bell | ...................... A47G 25/00 211/131.1 |
| D171,893 | S | * 4/1954 | Hills | .............................. D19/85 |
| 4,305,511 | A | 12/1981 | Denholtz | |
| D279,950 | S | 8/1985 | Wan | |
| 4,534,474 | A | 8/1985 | Ng | |
| 4,623,063 | A | * 11/1986 | Balkin | ................... B65D 85/04 206/303 |
| D296,568 | S | 7/1988 | Nadeau | |
| 4,850,658 | A | * 7/1989 | Sandor | ..................... A47F 5/02 211/163 |
| D321,011 | S | 10/1991 | Blossom | |
| D329,876 | S | 9/1992 | Breen | |

(Continued)

*Primary Examiner* — Ko H Chan
(74) *Attorney, Agent, or Firm* — Eric Kelly

(57) ABSTRACT

Various desk organizers are described and disclosed herein. Such organizers may comprise four subassemblies in communication with each other; such as: a vertical-organizer, a horizontal-organizer, a charging-module, and a turntable. The vertical-organizer may be located on a top of the organizer, while the turntable or the horizontal-organizer may be located on a bottom of the organizer and in removable contact with a desktop. The turntable may facilitate rotation of any subassembly located on top of the turntable. The charging-module may be removably attached to the horizontal-organizer. The horizontal-organizer may removably store stationary. The charging-module may be used to charge computing devices. The vertical-organizer may comprise a plurality of receptacles for removable storing of various office supplies. Openings to this plurality of receptacles may be arranged in a progressively tiered manner with lowest height openings located towards a front and highest height openings located towards a back.

16 Claims, 39 Drawing Sheets

(56) References Cited

U.S. PATENT DOCUMENTS

| | | | |
|---|---|---|---|
| D340,071 S | 10/1993 | Sun | |
| 5,524,775 A | 6/1996 | Kaine | |
| D372,938 S | 8/1996 | Wilson | |
| D377,807 S | 2/1997 | Green | |
| 5,651,152 A * | 7/1997 | Ritchie | A47C 21/00 294/143 |
| D407,753 S | 4/1999 | Kwok | |
| D408,858 S | 4/1999 | Stravitz | |
| D418,947 S | 1/2000 | Greiner | |
| D428,624 S | 7/2000 | Kwok | |
| D433,066 S | 10/2000 | Porter | |
| D435,865 S | 1/2001 | La Greca | |
| 6,182,839 B1 | 2/2001 | Robbins | |
| 6,189,711 B1 | 2/2001 | Chang | |
| 6,210,329 B1 * | 4/2001 | Christmas | A61B 50/31 600/437 |
| 6,279,753 B1 * | 8/2001 | Swanson | F21V 33/002 211/1.51 |
| 6,364,125 B1 | 4/2002 | DAngelo | |
| 6,371,296 B1 * | 4/2002 | Rumbough | A47K 10/185 206/233 |
| D459,398 S * | 6/2002 | Stravitz | D19/86 |
| 6,588,609 B1 | 7/2003 | Richet | |
| D497,184 S * | 10/2004 | Bain | D19/75 |
| 6,942,109 B2 | 9/2005 | Aros | |
| 6,968,957 B2 | 11/2005 | Fynn | |
| 7,878,337 B2 * | 2/2011 | Abdullah | A45C 11/36 211/10 |
| 7,980,387 B2 | 7/2011 | Allen | |
| D650,861 S | 12/2011 | Chuang | |
| D650,862 S * | 12/2011 | Chuang | D19/77 |
| D681,406 S | 5/2013 | Soliman | |
| D708,257 S | 7/2014 | Camarata | |
| D713,454 S * | 9/2014 | Chuang | D19/77 |
| 2007/0272629 A1 | 11/2007 | Spirer | |
| 2013/0233816 A1 | 9/2013 | Greenfield | |

* cited by examiner

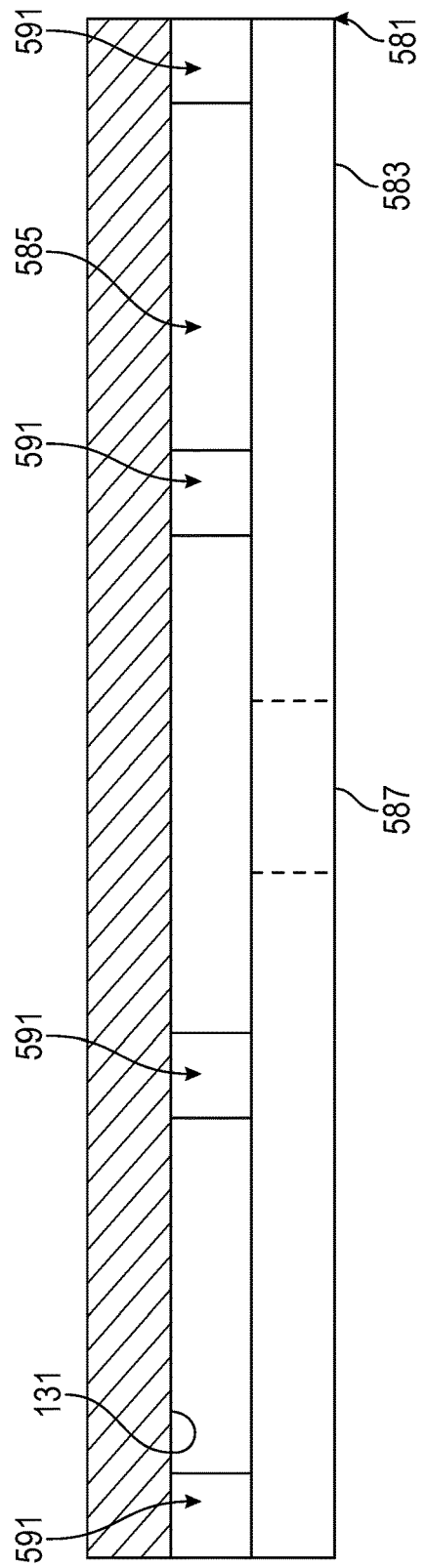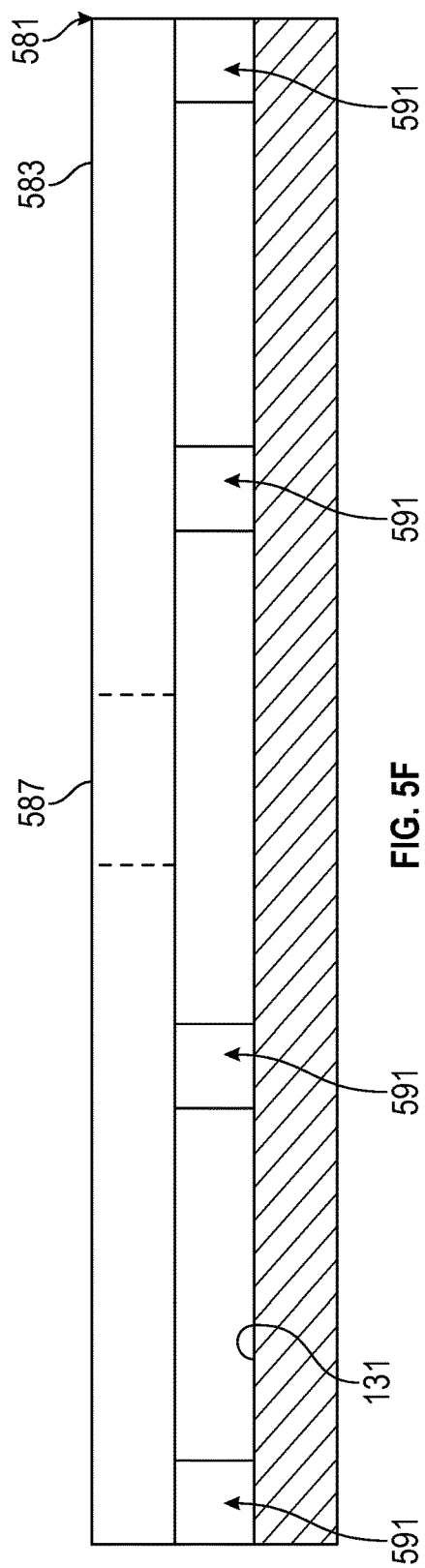

DESK ORGANIZER

PRIORITY NOTICE

The present application claims priority under 35 U.S.C. § 119(e) to U.S. Provisional Patent Application Ser. No. 62/204,047 filed on Aug. 12, 2015, the disclosure of which is incorporated herein by reference in its entirety.

TECHNICAL FIELD OF THE INVENTION

The present invention relates in general to organizers and more specifically to desk organizers; wherein a subassembly of the organizer may comprise a plurality of receptacles that may be structured with openings in a progressively tiered manner.

COPYRIGHT AND TRADEMARK NOTICE

A portion of the disclosure of this patent application may contain material that is subject to copyright protection. The owner has no objection to the facsimile reproduction by anyone of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is by way of example and should not be construed as descriptive or to limit the scope of this invention to material associated only with such marks.

BACKGROUND OF THE INVENTION

There is a relevant body of desk organizer prior art. However, no single prior desk organizer solves substantially all of the shortcomings that various embodiments of the present invention solve.

For example, some prior art desk organizers use a "one size fits all" approach with little or no diversity in storage compartment size, volume, shape, or opening orientation. This of course presents a problem for storing articles of diverse sizes, structures, and shapes. For example, office supplies may comprise such diverse articles as pens, pencils, markers, highlighters, crayons, writing implements, drafting implements, scissors, staplers, staples, staple removers, tape, binder clips, paper clips, paper (of various sizes and quantity), adhesive note pads (such as post-its), rulers, note pads, computing devices, mobile computing devices, phones, smartphones, beverage containers, photographs, compasses, protractors, calculators, coins, correctional fluid, correctional tape, eye glasses, sunglasses, clocks, watches, wipes, and the like.

Some prior art desk organizers provide either vertically accessible storage compartments (e.g., openings accessible from a top direction) or horizontally accessible storage compartments (e.g., openings accessible from a side direction), but not both together in a single organizer. It may be desirable to store certain shaped articles in vertically accessible storage compartments (such as, but not limited to, writing implements). It may be desirable to store certain shaped articles in horizontally accessible storage compartments (such as, but not limited to, stationary). And it may be desirable to have an option in a single organizer to utilize either or both of vertically accessible storage compartments and/or horizontally accessible storage compartments.

Much of the vertically accessible storage compartments desk organizer prior art has a cone, conical, or pyramid structure. Such structures share a prominent high point or high region in the middle of the desk organizer and this creates a common problem for this entire class of prior art desk organizer. This common problem is one of visibility of the removably stored articles. Because the prominent high point or high region located in the center, there necessarily must be regions behind this center that are obscured from visibility, requiring either that the desk organizer be moved to see what is obscured or requiring the user to look from above to see what may be obscured behind the high center. It would be desirable to utilize a progressively tiered structure of storage compartment openings instead, such that high regions are not located at the center but rather at a back, which increase visibility of all or substantially all of any storage compartments and/or the articles which may be removably stored within such storage compartments.

Additionally, much of the desk organizer prior art does not rotate, which may create a visibility problem for the user. Additionally, some desk organizer prior art that may rotate may have the cone, conical, or pyramid structure, which means that no matter which way such desk organizers may be rotated, some storage compartments may always be blocked from the view of the user; or that no matter which way such desk organizers may be rotated, some storage compartments may always be in the view of the user, even when the desk organizer may not be in use. It may be desirable to have a progressively tiered structured for storage compartment openings, such that the desk organizer may be rotated, when not use, so no such storage compartments are visible.

Some of the desk organizer prior art may be bulky, cumbersome, heavy, and/or large, making portability of such desk organizer's problematic. It would be desirable to have a desk organizer that may be readily portable. Similarly, it would be desirable to have a desk organizer that may not take up too much room of a desktop or similar supporting substrate surface.

In much of the desk organizer prior art any storage compartments present are fixed, and non-divisible and/or non-reconfigurable. In order to accommodate the diversity of office supply articles, it may be desirable if at least some of any present storage compartments may be divisible and/or reconfigurable, e.g., by adding, removing, or moving dividers, panels, and/or walls.

Additionally, much of the desk organizer prior art leaves no open surface areas for accepting tacky post-it type notes, other notes, or photos. It would be desirable to have a desk organizer with sufficient and/or dedicated surface area for accepting such tacky post-it type notes, other notes, or photos.

There is a need in the art for a desk organizer that may solve all, substantially all, or a majority of these prior art shortcomings within a single embodiment.

It is to these ends that the present invention has been developed.

BRIEF SUMMARY OF THE INVENTION

To minimize the limitations in the prior art, and to minimize other limitations that will be apparent upon reading and understanding the present specification, the present invention describes an organizer, such as various embodiments of desk organizers.

In some embodiments, such organizers may comprise four subassemblies in communication with each other.

These subassemblies may comprise a vertical-organizer, a horizontal-organizer, a charging-module, and a turntable. The vertical-organizer may be located on a top of the organizer, while the turntable or the horizontal-organizer may be located on a bottom of the organizer and in removable contact with a desktop or some other similar supporting substrate surface. That is, in some embodiments, the turntable may form a base of the organizer; while in other embodiments, the horizontal-organizer may form the base of the organizer. The turntable may facilitate rotation of any subassembly located on top of the turntable. The charging-module may be removably attached to the horizontal-organizer. The horizontal-organizer may removably store sheets of stationary, such as paper. The charging-module may be used to charge computing devices, such as, but not limited to, a smartphone or tablet computing device. The vertical-organizer may comprise a plurality of receptacles for removable storing of various articles, such as office supplies. Openings to this plurality of receptacles may be arranged in a progressively tiered manner with lowest height openings located towards a front of the vertical-organizer and highest height openings located towards a back of the vertical-organizer.

It is an objective of the present invention to provide a desk organizer with a variety of different receptacles and/or enclosures with a variety of different sizes, volumes, shapes, and/or opening orientations. This may help accommodate removable storage of a greater variety of office supply articles over the prior art.

It is another objective of the present invention to provide to a desk organizer with both vertically accessible receptacles and horizontally accessible enclosure(s).

It is another objective of the present invention to provide to provide a desk organizer wherein openings of a plurality of receptacles may be arranged in a progressively tiered structure, such that all or substantially all of such receptacles may be viewed without having to rotate the desk organizer or without the user having to move to see such receptacles. Such a progressively tiered structure may enhance receptacle visibility and access and/or enhance article visibility and access.

It is another objective of the present invention to provide a desk organizer that may be readily rotated.

It is another objective of the present invention to provide a desk organizer that may be rotated so that all or substantially all receptacles may not be viewed, e.g., when the desk organizer may not be in use; or alternatively, when it may be desirable to orient surface areas to the user, wherein such surface areas may accommodate tacky post-it notes, other notes, and/or photos.

It is another objective of the present invention to provide to a desk organizer that is both small enough and light enough to be readily portable.

It is another objective of the present invention to provide a desk organizer that may occupy a surface area footprint of about one square foot of desktop surface area or less.

It is another objective of the present invention to provide a desk organizer wherein some of the receptacles and/or enclosure(s) may be divisible and/or reconfigurable in terms of removing, adding, or moving dividers, panels, and/or walls.

It is yet another objective of the present invention to provide a desk organizer with designated surface area for receiving and/or displaying tacky post-it notes, other notes, and/or photos.

These and other advantages and features of the present invention are described herein with specificity so as to make the present invention understandable to one of ordinary skill in the art, both with respect to how to practice the present invention and how to make the present invention.

BRIEF DESCRIPTION OF THE SEVERAL VIEWS OF THE DRAWINGS

Elements in the figures have not necessarily been drawn to scale in order to enhance their clarity and improve understanding of these various elements and embodiments of the invention. Furthermore, elements that are known to be common and well understood to those in the industry are not depicted in order to provide a clear view of the various embodiments of the invention. (Note, unless otherwise explicitly noted, all views are assembled views.)

FIG. 5E may depict a top view of a photo-holder.

FIG. 5F may depict a bottom view of the photo-holder.

Figure 1A:
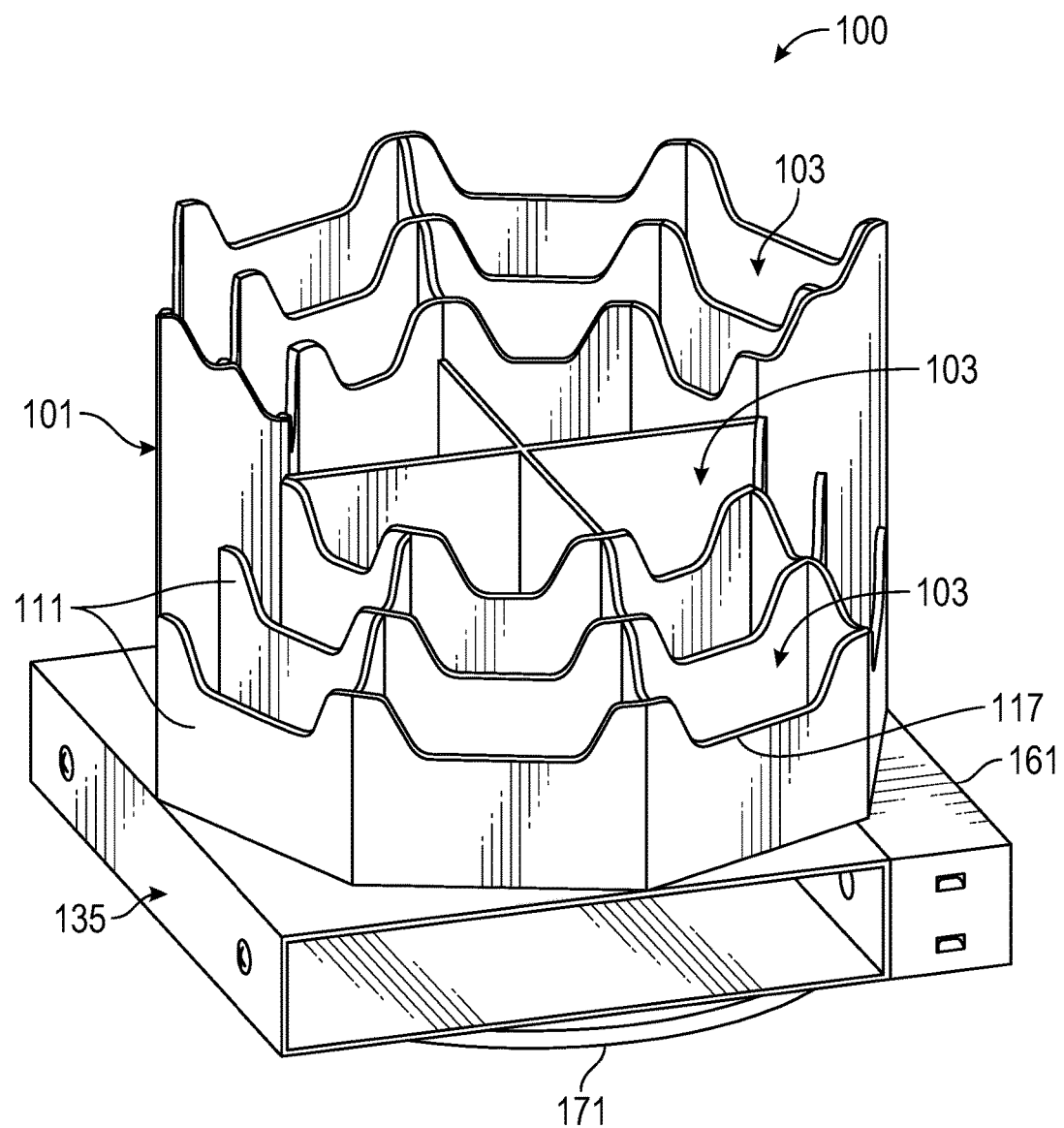
FIG. 1A may depict a perspective view of an exemplary embodiment of an assembled organizer.

REFERENCE NUMERAL LISTING/SCHEDULE 100 organizer 100
101 vertical-organizer 101
103 one or more receptacles 103
105 bottom 105
107 side-walls 107
109 radial-walls 109
111 perimeter-walls 111
113 top edges 113
115 crenulation 115
117 opening 117
119 one or more center receptacles 119
121 kite rhombus shape 121
123 plurality of trapezoid shaped receptacles 123
125 plurality of irregular shaped polygon receptacles 125
127 exterior outside surface 127
129 outer front 129
131 outer back 131
133 center 133
135 horizontal-organizer 135
141 first-enclosure-side-wall 141
143 second-enclosure-side-wall 143
145 back-enclosure-side-wall 145
147 charging module fastener 147
149 enclosure-bottom 149
151 bottom exterior 151
153 enclosure-top 153
155 top exterior 155
157 enclosure-opening 157
159 enclosure-volume 159
161 charging module 161
163 complimentary fastener 163
165 standard electrical outlet 165
167 port 167
169 housing 169
171 turntable 171
173 upper member 173
175 substantially flat and planar 175
177 base member 177
201 curved vertical-organizer 201
216 sinuous crenulation path 216
300 organizer 300
401 transparent vertical-organizer 401
501 vertical-organizer 501
581 photo-holder 581
583 exterior-surface 583
585 sleeve-opening 585
587 access-hole 587
588 access-slot 588
589 top edge 589
591 spacer 591
595 access-slot width 595
596 slot height 596
597 holder height 597
598 back wall height 598
599 corner 599
603 outer ring 603
605 middle ring 605
607 inner ring 607
609 plurality of dividers 609
609a lowest height dividers 609a
609b next lowest height dividers 609b
609c next highest height divider 609c
609d highest height divider 609d
611 plurality of panels 611
611a lowest height panels 611a
611b highest height panels 611b
611c next lowest height panels 611c
611d next highest height panels 611d
611e front highest height panels 611e 611f back lowest height panels 611f
709 plurality of dividers 709
709a lowest height divider 709a
709b next lowest height divider 709b
709c next highest height divider 709c
709d highest height divider 709d
711 plurality of curved panels 711
711a lowest height panel 711a
711b highest height panel 711b
711c next lowest height panel 711c
711d next highest height panel 711d
711e front highest height panel 711e
711f back lowest height panel 711f
807 wall 807
813 top edge 813
888 access-slot 888
891 top radius 891
892 bottom radius 892
893 top separation gap 893
894 bottom separation gap 894
895 access-slot width 895
907 wall 907
913 top edge 913
927 exterior outside surface 927
928 interior surface 928
931 first-bevel-angle 931
932 second-bevel-angle 932
933 wall width 933
1081 photo-holder 1081
1083 exterior-surface 1083
1084 interior facing major surface 1084
1088 access-slot 1088
1089 top edge 1089
1091 spacer 1091
1092 protrusion (locking mount) 1092
1093 protrusion-receiving-hole 1093
1097 holder height 1097
1099 corner 1099

DETAILED DESCRIPTION OF THE INVENTION

In some embodiments, various organizers for removable storing of one or more articles may be described and disclosed herein. In some embodiments, the organizer may be a desk organizer. For example, and without limiting the scope of the present invention, the one or more articles may be selected from the group comprising: office supplies, a pen, a pencil, a marker, a highlighter, a crayon, a writing implement, a drafting implement, scissors, a stapler, staples, a staple remover, tape, binder clips, paper clips, paper, an adhesive note pad, an adhesive note (such as, but not limited to, a post-it type note), a ruler, a note pad, a computing device, a mobile computing device, a phone, a smartphone, a beverage container, photographs, a compass, a protractor, a calculator, coins, correctional fluid, correctional tape, eye glasses, sunglasses, a clock, a watch, wipes, and the like.

In some embodiments, such organizers may comprise four subassemblies in communication with each other. These subassemblies may comprise a vertical-organizer, a horizontal-organizer, a charging-module, and a turntable. The vertical-organizer may be located on a top of the organizer, while the turntable or the horizontal-organizer may be located on a bottom of the organizer and in removable contact with a desktop or some other similar supporting substrate surface. That is, in some embodiments, the turntable may form a base of the organizer; while in other embodiments, the horizontal-organizer may form the base of the organizer. The turntable may facilitate rotation of any subassembly located on top of the turntable. The charging-module may be removably attached to the horizontal-organizer. The horizontal-organizer may removably store sheets of stationary, such as, but not limited to, paper. The charging-module may be used to charge computing devices, such as, but not limited to, a smartphone or tablet computing device. The vertical-organizer may comprise a plurality of receptacles for removable storing of various articles, such as the office supplies as noted above. Openings to this plurality of receptacles may be arranged in a progressively tiered manner with lowest height openings located towards a front of the vertical-organizer and highest height openings located towards a back of the vertical-organizer.

In some embodiments, the organizer may only comprise the vertical-organizer. In some embodiments, the organizer may comprise the vertical-organizer and the turntable. In some embodiments, the organizer may comprise the vertical-organizer, the turntable, and the horizontal-organizer.

In the following discussion that addresses a number of embodiments and applications of the present invention, reference is made to the accompanying drawings that form a part thereof, where depictions are made, by way of illustration, of specific embodiments in which the invention may be practiced. It is to be understood that other embodiments may be utilized and changes may be made without departing from the scope of the invention.

A FIG. 1 series of figures may comprise figures FIG. 1A through FIG. 1G showing different views of an organizer 100 and its subassemblies.

Figure 1B:
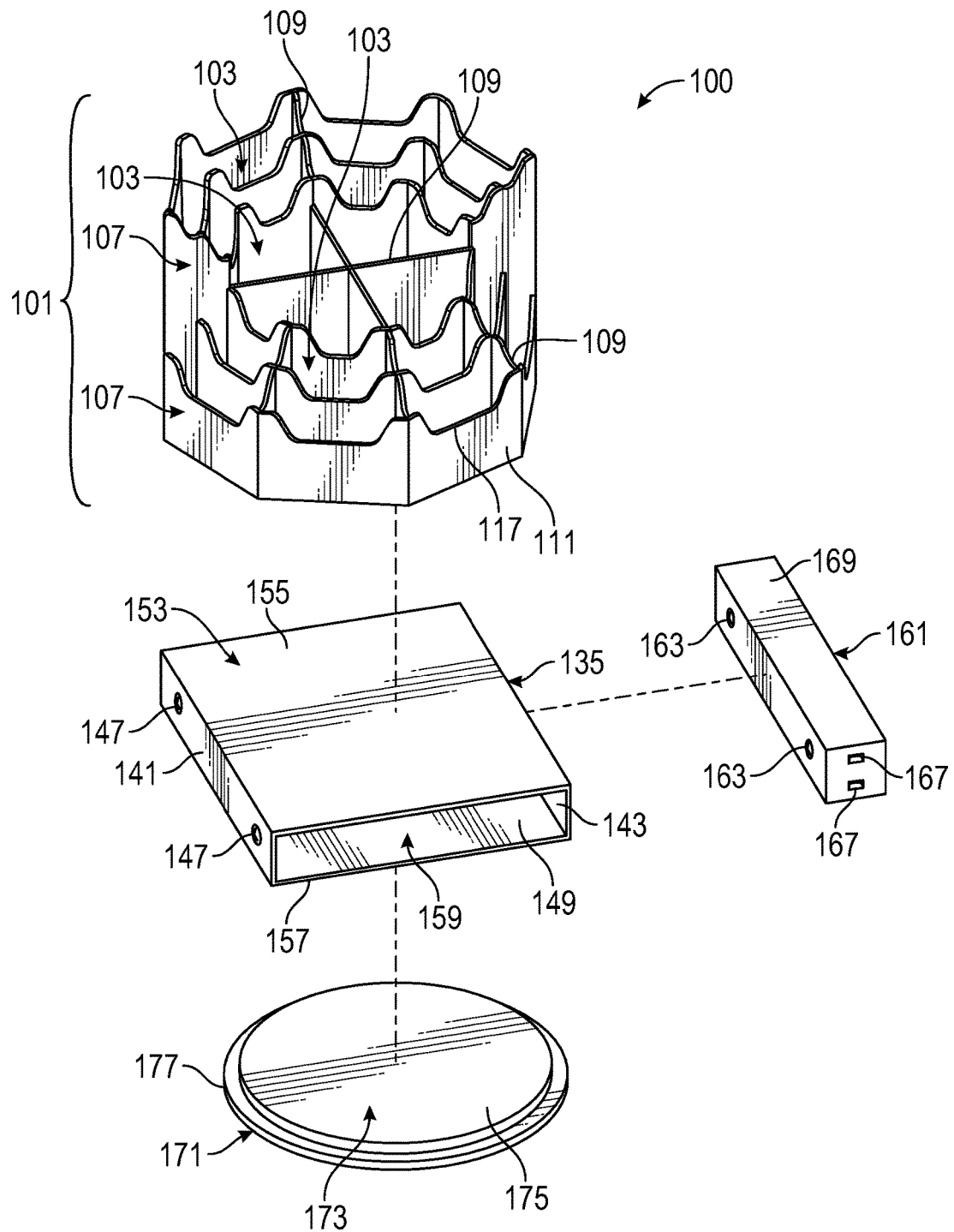
FIG. 1B may depict an exploded perspective view of subassemblies from the organizer of FIG. 1A.
Figure 1C:
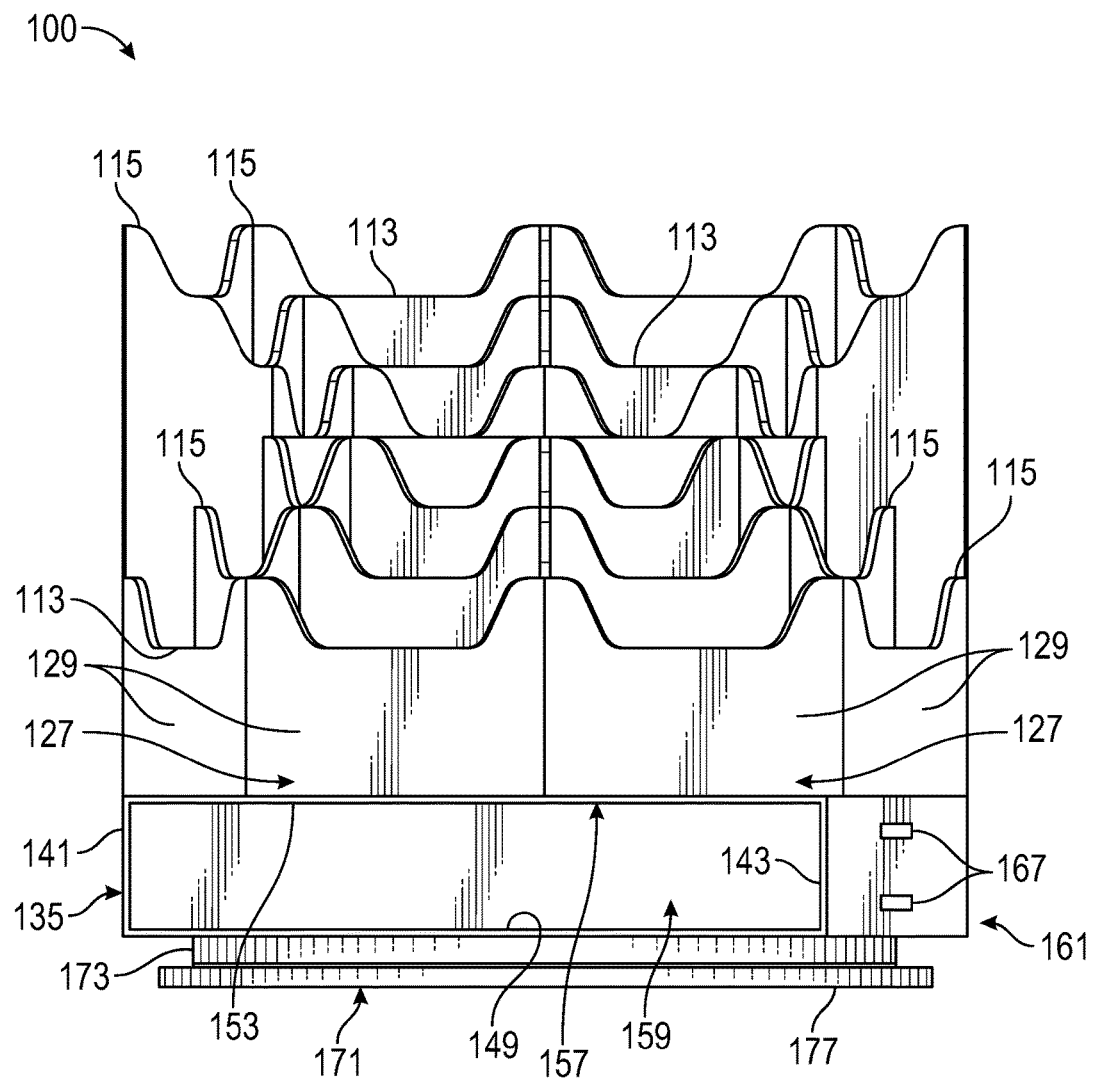
FIG. 1C may depict a front view of the organizer of FIG. 1A.
Figure 1D:
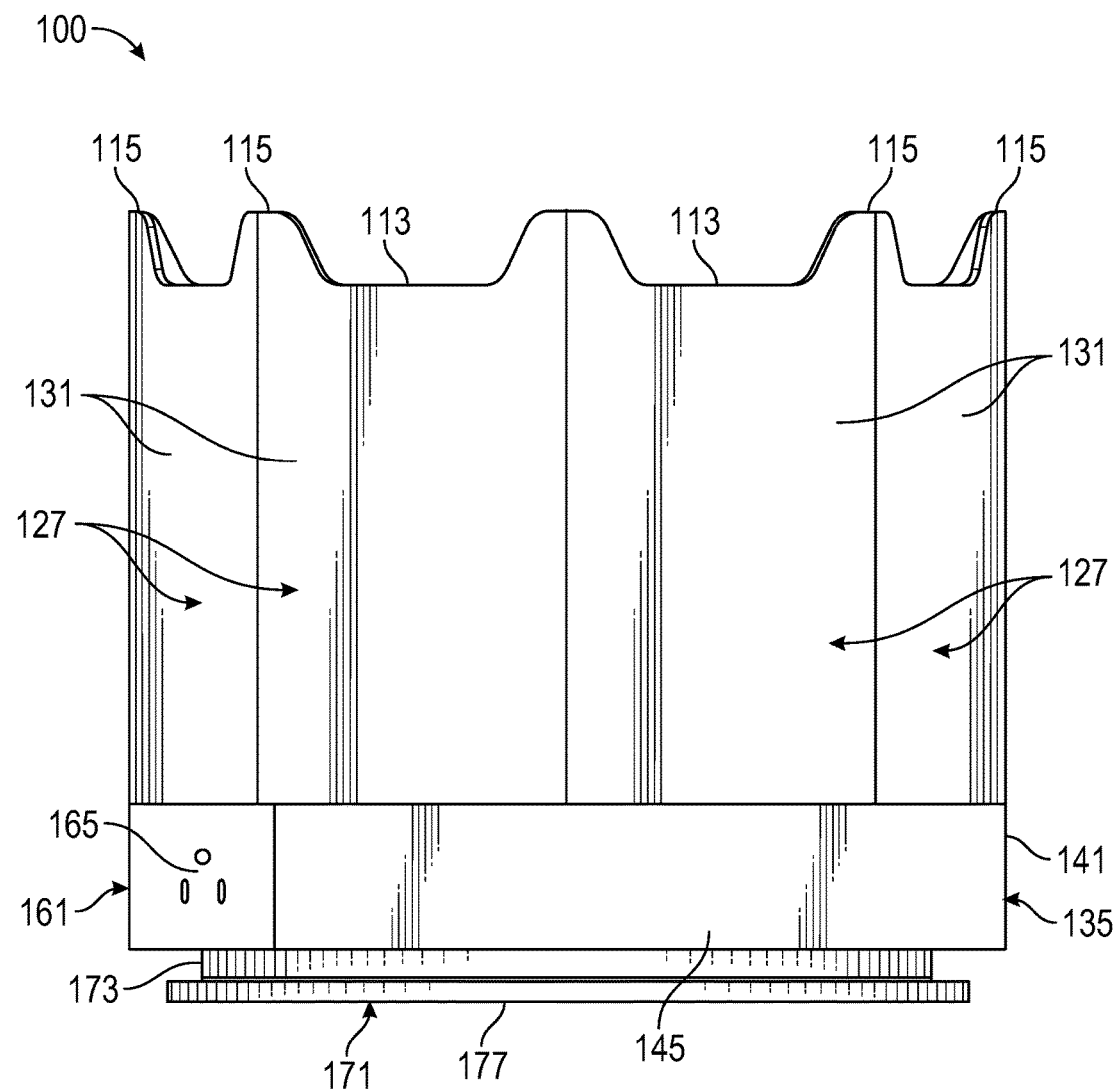
FIG. 1D may depict a back view of the organizer of FIG. 1A.
Figure 1E:
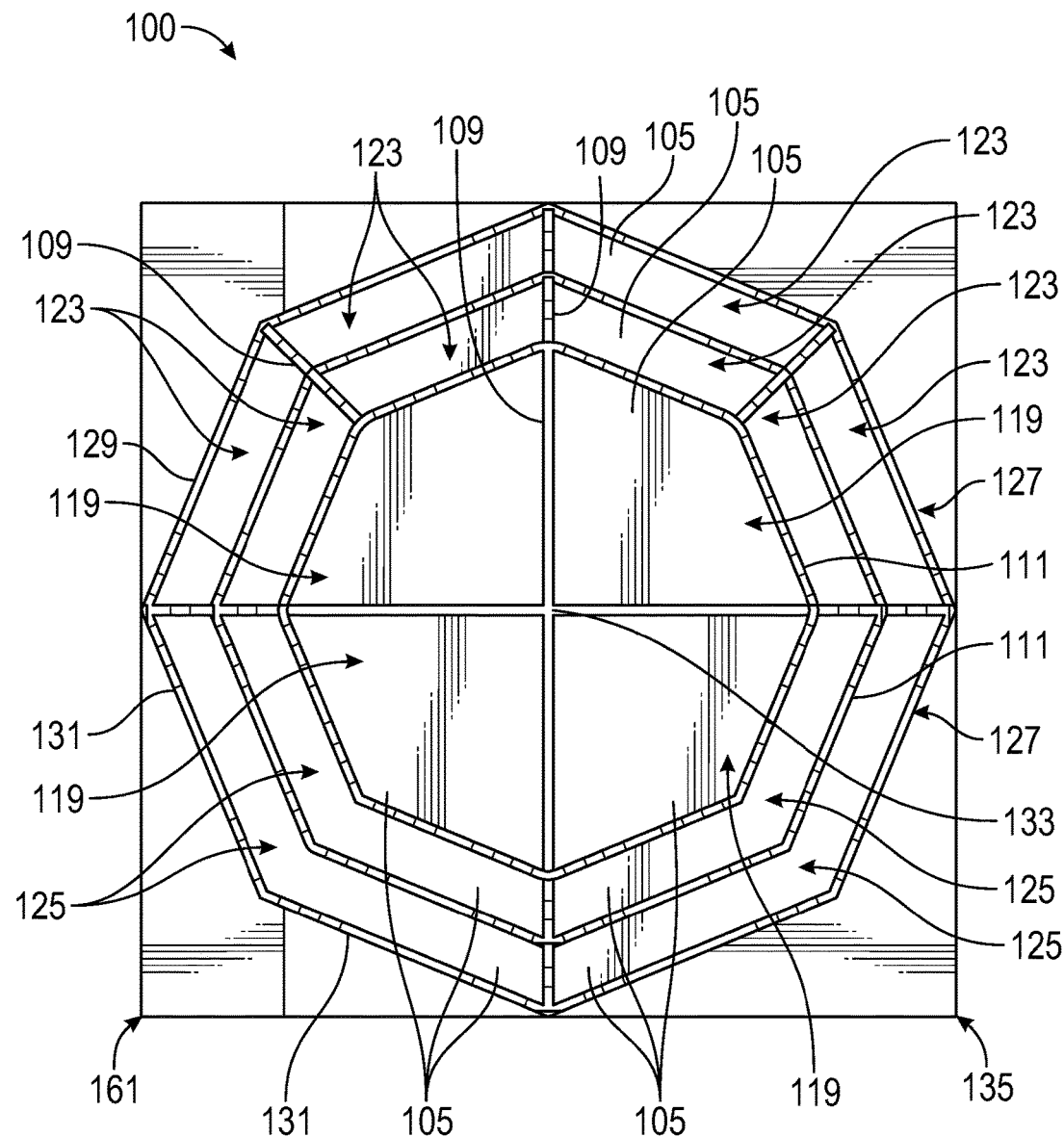
FIG. 1E may depict a top view of the organizer of FIG. 1A.
Figure 1F:
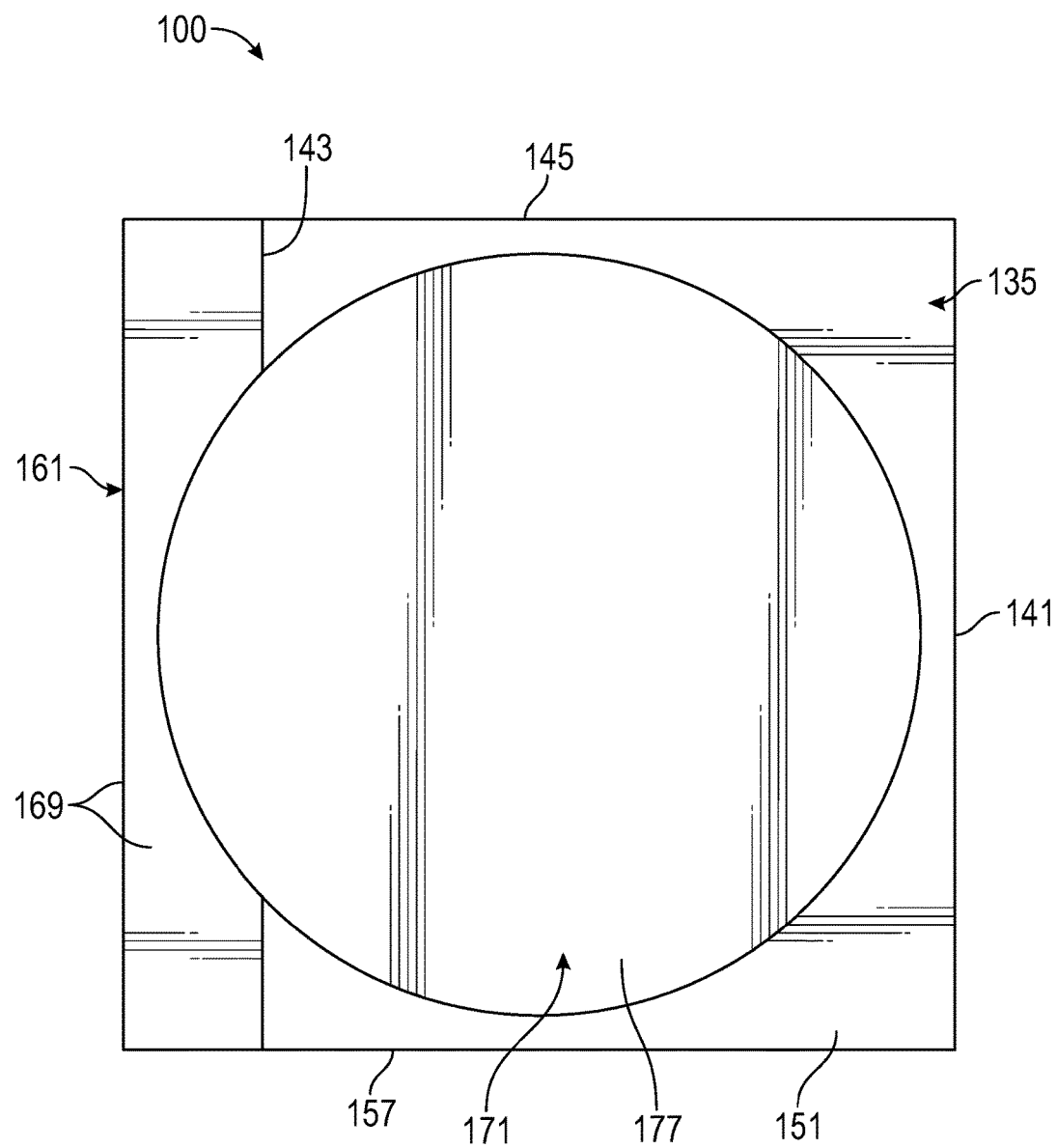
FIG. 1F may depict a bottom view of the organizer of FIG. 1A.
Figure 1G:
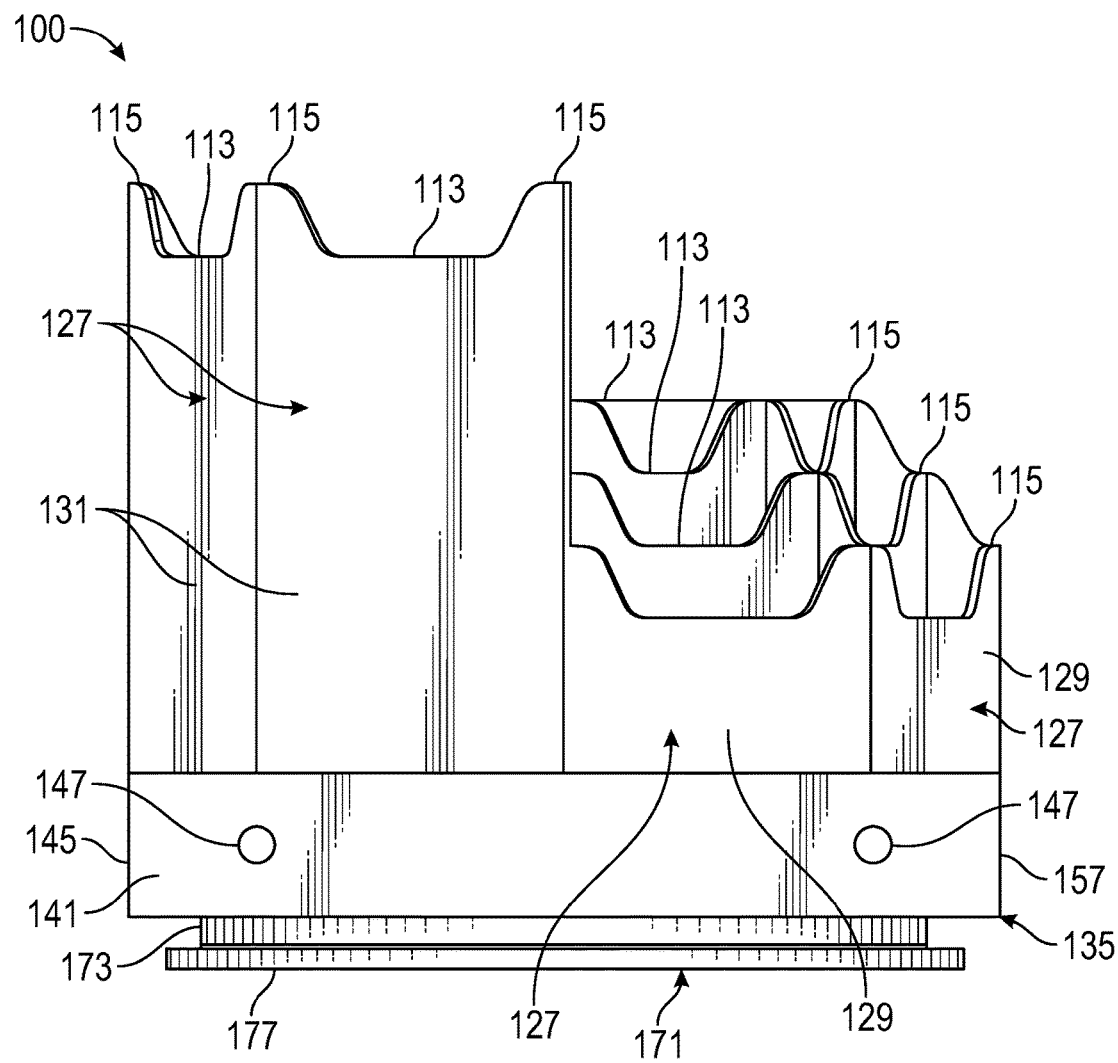
FIG. 1G may depict a left-side view of the organizer of FIG. 1A.

FIG. 1A may depict a perspective view of an embodiment of organizer 100, in an assembled state. FIG. 1B may depict an exploded perspective view of subassemblies of organizer 100. FIG. 1C may depict a front view of organizer 100. FIG. 1D may depict a back view of organizer 100. FIG. 1E may depict a top view of organizer 100. FIG. 1F may depict a bottom view of organizer 100. FIG. 1G may depict a left-side view of organizer 100. Note a right-side view of organizer 100 may not be explicitly depicted; however, see FIG. 3F which depicts a right-side view of organizer 300 which may be substantially equivalent to a left-side view of organizer 100, except that in FIG. 3F vertical-organizer 101 may be rotated differently than the FIG. 1 series views.

In some embodiments, organizer 100 may comprise these subassemblies: a vertical-organizer 101, a horizontal-organizer 135, a charging module 161, and a turntable 171. In some embodiments, organizer 100 may comprise only one vertical-organizer 101 and no other subassemblies. In some embodiments, organizer 100 may comprise one vertical-organizer 101 and one or more of: horizontal-organizer 135, charging module 161, and/or turntable 171. In some exemplary embodiments, organizer 100 may comprise one vertical-organizer 101, one horizontal-organizer 135, one charging module 161, and one turntable 171. See e.g., the FIG. 1 series of figures. In some exemplary embodiments, disposed between vertical-organizer 101 and turntable 171 may be horizontal-organizer 135, and optionally at least one charging module 161 which may be removably attached to horizontal-organizer 135. See e.g., the FIG. 1 series of figures.

Note, a name of "vertical-organizer," such as, but not limited to vertical-organizer 101, may denote that openings to one or more receptacles 103 of the given vertical-organizer may be accessible from a vertical direction, e.g., from a top direction. Likewise, a name of "horizontal-organizer," such as, but not limited to horizontal-organizer 135, may denote that an opening to at least one enclosure of the given horizontal-organizer may be accessible from a horizontal direction, e.g., from a front direction (or side, or back direction).

Figure 6A:
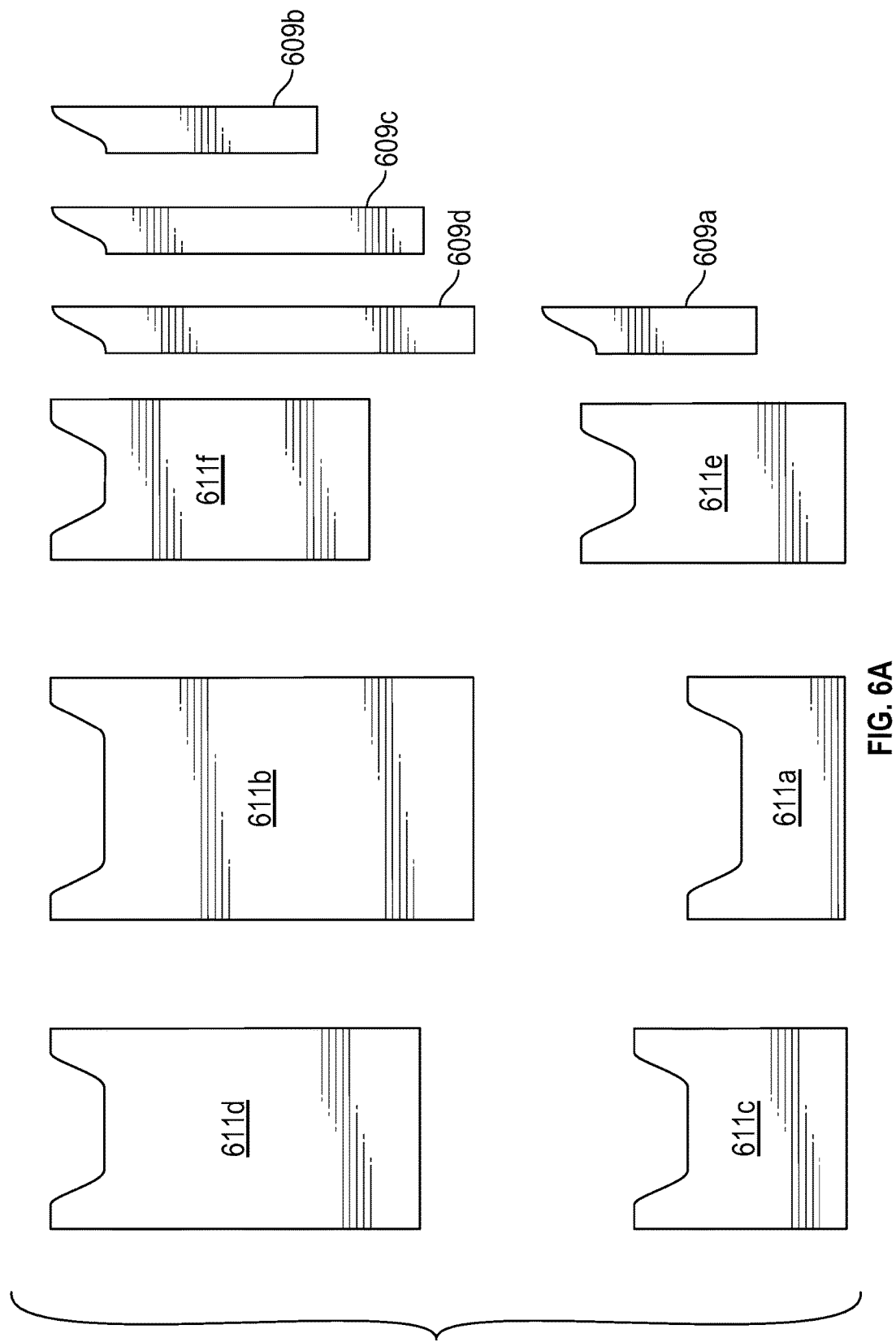
FIG. 6A may depict a plurality of panels and a plurality of dividers, not assembled, wherein this plurality of panels and this plurality of dividers may be used to construct a vertical-organizer.
Figure 6B:
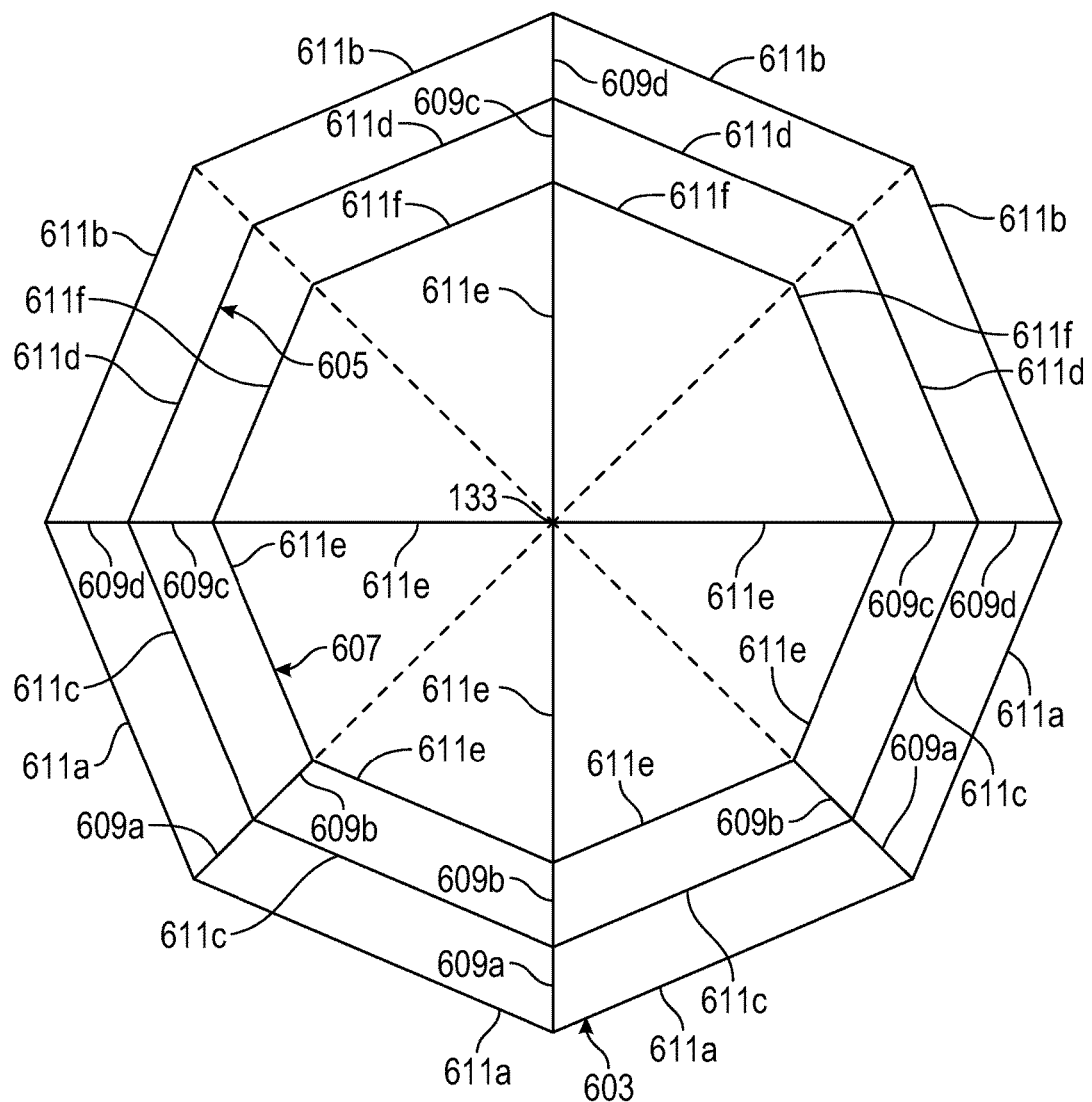
FIG. 6B may depict a top view showing how the plurality of panels and the plurality of dividers may be used to construct the vertical-organizer noted in FIG. 6A; wherein this vertical-organizer may comprise an inner ring, a middle ring, and an outer ring.
Figure 7A:
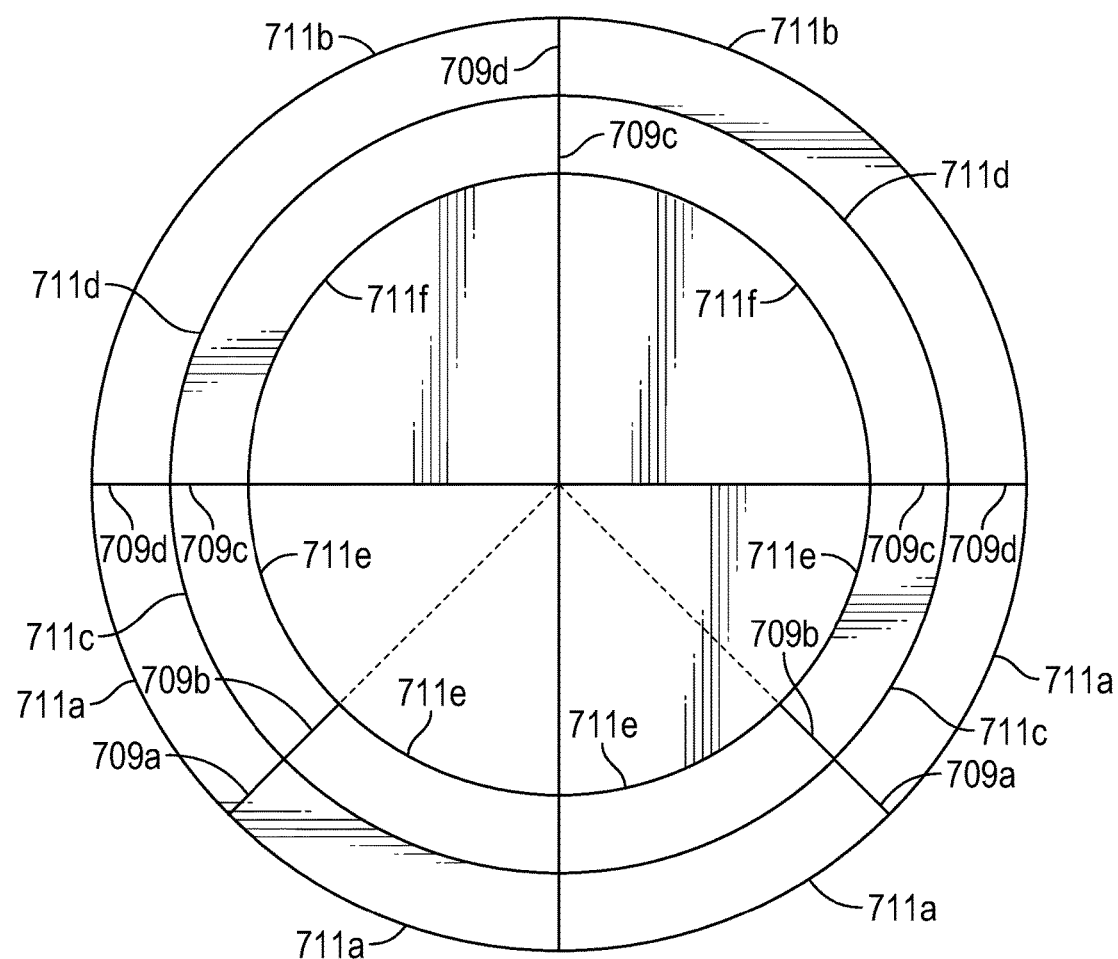
FIG. 7A may depict a top view showing how a plurality of curved panels and a plurality of dividers may be used to construct a curved vertical-organizer with curved panels; wherein this curved vertical-organizer with curved panels may comprise a curved inner ring, a curved middle ring, and a curved outer ring.

Note, in some embodiments of organizer 100, vertical-organizer 101 may be replaced with curved vertical-organizer 201, or any other vertical-organizer noted herein such as vertical-organizer 401 or vertical-organizer 501 or the vertical-organizer disclosed in FIG. 6B or the curved vertical-organizer disclosed in FIG. 7A.

In some embodiments, vertical-organizer 101 may comprise one or more receptacles 103. In some embodiments, the one or more receptacles 103 may be a plurality of receptacles 103. See e.g., FIG. 1A. In some embodiments, each receptacle 103 selected from the one or more receptacles 103 may comprise a bottom 105 and side-walls 107. That is, a given bottom 105 and at least three side-walls 107 may form a given receptacle 103. See e.g., FIG. 1E for bottom 105. See e.g., FIG. 1B for side-walls 107. In some embodiments, each receptacle 103 selected from the one or more receptacles 103 may be sized to removably store the one or more articles, such as, but not limited to, one or more of the office supplies. One or more receptacles 103 may be of different sizes (e.g., with respect to different shapes and/or different volumes), to accommodate different sizes and/or quantities of the articles.

In some embodiments, each of the one or more receptacles 103 may be in communication with at least three other receptacles 103 selected from the one or more receptacles 103. See e.g., FIG. 1E.

In some embodiments, each receptacle 103 selected from the one or more receptacles 103 may comprise an opening 117 for accessing the given receptacle 103. In some embodiments, at least one of these openings 117 may be accessible from the top direction. In some embodiments, each such opening 117 may be accessible from the top direction. See e.g., the FIG. 1 series of figures in general wherein each opening 117 for each receptacle 103 may be accessible from the vertical direction, such as the top direction.

In some embodiments, these openings 117 for the receptacles 103 may be organized in a series of progressively higher access heights as disposed from bottom 105 (or as disposed from a table top or a desktop). That is, in some embodiments, these openings 117 may be arranged (grouped) in a finite arrangement of progressively higher tiers. See e.g., FIG. 1A and FIG. 1B.

In some embodiments, this series of the progressively higher access heights transition from a lowest height proximate to an outer front 129 of the vertical-organizer 101 progressing to a highest height proximate to an outer back 131 of vertical-organizer 101. See e.g., FIG. 1G. By analogy this arrangement may be similar to stadium seating arrangement and for a similar purpose of maximizing visibility. Such an arrangement of progressively higher access heights for groupings of receptacle 103 openings may maximize viewing of vertical-organizer 101 from a front direction, including maximizing viewing of any articles that may be removably stored within these receptacles 103.

In some embodiments, this series of the progressively higher access heights for groupings of receptacle 103 openings may comprise four, five, six, or seven different and distinct access heights. For example, and without limiting the scope of the present invention, in some exemplary embodiments the progressively higher access heights may be located substantially at three inches, four inches, five inches, six inches, seven inches, and eight inches as measured from bottom 105 to a top of a respective crenulation 115. See e.g., FIG. 1C.

In some embodiments, a two dimensional projection of vertical-organizer 101 from a top or a bottom direction may results in an overall two dimensional exterior shape selected from the group comprising: an octagon, a polygon, a regular polygon, an irregular polygon, a circle, or an ellipse. For example, and without limiting the scope of the present invention, in some exemplary embodiments, this two dimensional projection may be an octagon, see e.g., FIG. 1E. (Or see FIG. 2, wherein a two dimensional projection of vertical-organizer 201 may be a circle.) In some exemplary embodiments, an outside diameter (including from opposing corners of the octagon shape) of this shape may be substantially twelve inches.

Continuing discussing the FIG. 1 series of figures, in some embodiments, at least half of one or more receptacles 103 in vertical-organizer 101 (e.g., eight such receptacles 103) may have a trapezoid shape as viewed from the top direction. For example, and without limiting the scope of the present invention, in FIG. 1E, sixteen receptacles 103 may be depicted. At least half of the FIG. 1E receptacles 103 may be trapezoids as viewed from the top direction.

In some embodiments, one or more receptacles 103 may comprise one or more center receptacles 119 located closest to a center 133 of vertical-organizer 101 as viewed from the top direction. In some embodiments, one or more center receptacles 119 may be radially disposed around center 133. Center 133 of vertical-organizer 101 is shown in FIG. 1E (and in FIG. 3E). In some embodiments, one or more center receptacles 119 may have one or more of a kite rhombus shape 121, a triangle shape, or an octagon shape, as viewed from the top direction. (In the case of curved vertical-organizers, such as curved vertical-organizer 201 or the curved vertical-organizer shown in FIG. 7A, this center receptacle 119 shape may be a pie wedge shape [or a pizza slice shape]; see e.g., FIG. 2 and FIG. 7A.) For example, and without limiting the scope of the present invention, in FIG. 1E, four center receptacles 119 may be depicted. Each of these FIG. 1E center receptacles 119 may be a kite rhombus shape 121, as viewed from the top direction. (See FIG. 3E for reference numeral 121, which is also top view of vertical-organizer 101.)

In some embodiments, one or more receptacles 103 may comprise a plurality of trapezoid shaped receptacles 123 as viewed from the top direction. In some embodiments, the plurality of trapezoid shaped receptacles 123 may partially circumscribe one or more center receptacles 119. In some embodiments, plurality of trapezoid shaped receptacles 123 may be disposed in two rows of trapezoid shaped receptacles 123, an inner row closest to the one or more center receptacles 119 and an outer row proximate and in contact with the inner row. This outer row may be closest with outer front 129. See e.g., FIG. 1E (and see FIG. 3E).

In some embodiments, one or more receptacles 103 may comprises a plurality of irregular shaped polygon receptacles 125 that are longer than wide as viewed from the top direction. In some embodiments, plurality of irregular shaped polygon receptacles 125 may partially circumscribe a remainder of one or more center receptacles 119 that is not circumscribed by plurality of trapezoid shaped receptacles 123. In some embodiments, plurality of irregular shaped polygon receptacles 125 may be disposed in two rows of irregular shaped polygon receptacles 125, an inner row closest to one or more center receptacles 119 and an outer row proximate and in contact with the inner row. This outer row may be closest with outer back 131. See e.g., FIG. 1E.

In some embodiments, one or more receptacles 103 may be disposed within one, two, three, or four concentric rings, such as but not limited to, octagon rings, as viewed from the top direction. For example, and without limiting the scope of the present invention, all of the one or more receptacles 103 may be located within an outermost octagon as viewed from the top direction. See e.g., FIG. 1E. In some exemplary embodiments, one or more receptacles 103 may be disposed within three concentric octagon rings, as viewed from the top direction. See e.g., FIG. 1E.

In some embodiments, bottom 105 of each receptacle 103 may share a common plane. See e.g., FIG. 1E. In some embodiments, bottom 105 may be formed from a portion of vertical-organizer 101, such as, but not limited to a floor member of each receptacle 103. In some embodiments, bottom 105 may be formed from a portion of top exterior 155 of enclosure-top 153, a component of horizontal-organizer 135. In some embodiments, bottom 105 may be formed from a portion of substantially flat and planar 175 of upper member 173 of turntable 171.

In some embodiments, each side-wall 107 may be one or more of a radial-wall 109 and/or a perimeter-wall 111. That is, the term "side-wall" may be a broader term that may refer to one or more of radial-wall 109 and/or perimeter-wall 111. In some embodiments, radial-walls 109 may be conceptualized as spokes or dividers. In some embodiments, perimeter-walls 111 may be conceptualized as panels. See e.g., FIG. 1B that depicts both radial-walls 109 and perimeter-walls 111, as well as the broader reference numeral 107 (and see also FIG. 3B). In some embodiments, each or any radial-wall 109 may extend in a direction from an exterior outside surface 127 of the vertical-organizer 101 towards center 133 of vertical-organizer 101. Or alternatively, each or any radial-wall 109 may radiate in an outward direction from center 133 of vertical-organizer 101 towards exterior outside surface 127 of vertical-organizer 101. Note, in some embodiments, only some of the radial-walls 109 may extend from exterior outside surface 127 to center 133; whereas, all radial-walls 109 may extend in the direction from exterior outside surface 127 to center 133. See e.g., FIG. 1E for such radial-wall 109 orientation.

In some embodiments, some receptacles 103 may be substantially bound at the sides by at least two radial-walls 109 and at least one perimeter-wall 111. In some embodiments, side-walls 107 of each center receptacle 119 selected from the one or more center receptacles 119 may comprise at least two radial-walls 109 and at least one perimeter-wall 111. See e.g., FIG. 1E. In some embodiments, the at least two radial-walls 109 may terminate together at center 133. And disposed from center 133 and not touching center 133 may be the at least one perimeter-wall 111 that may connect to each of the at least two radial-walls 109 forming the one or more center receptacles 119. See e.g., FIG. 1E. In some embodiments these at least two radial-walls 109 and the at least one perimeter-wall 111 may form kite rhombus shape 121 (see e.g., FIG. 3E for kite rhombus shape 121 of center receptacles 119) or a triangle (not depicted) as viewed from the top direction.

In some embodiments, side-walls 107 of each trapezoid shaped receptacle 123 selected from the plurality of trapezoid shaped receptacles 123 may comprise at least two perimeter-walls 111 and at least two radial-walls 109. See e.g., FIG. 1E. In some embodiments, these at least two perimeter-walls 111 may be substantially parallel to each other; and each of the at least two perimeter-walls 111 may connect to a different radial-wall 109 of the at least two radial-walls 109. See e.g., FIG. 1E. In some embodiments, these at least two perimeter-walls 111 and these at least two radial-walls 109 may form a trapezoid shape as viewed from the top direction. See e.g., FIG. 1E.

In some embodiments, side-walls 107 of each irregular shaped polygon receptacle 125 selected from plurality of irregular shaped polygon receptacles 125 may comprise at least two perimeter-walls 111 and at least two radial-walls 109. See e.g., FIG. 1E. In some embodiments, the at least two perimeter-walls 111 may be substantially parallel with respect to each other; and each of the at least two perimeter-walls 111 may connect to a different radial-wall 109 of the at least two radial-walls 109. See e.g., FIG. 1E. In some embodiments, these at least two perimeter-walls 111 and these at least two radial-walls 109 may form an irregular polygon shape that may be longer than wider as viewed from the top direction. See e.g., FIG. 1E.

In some embodiments, each side-wall 107 may be a planar member. Recall that each side-wall 107 may comprise one or more of radial-walls 109 and perimeter-walls 111. See e.g., the FIG. 1 series of figures in general. In some embodiments, each side-wall 107 may be a substantially flat planar member. See e.g., the FIG. 1 series of figures in general. In some embodiments, a largest surface of a majority of side-walls 107 may each be substantially straight (e.g., run in a substantially straight direction) as viewed from the top direction. See e.g., the FIG. 1 series of figures in general.

In some embodiments, each perimeter-wall 111 may comprise a top edge 113. See e.g., FIG. 1C, FIG. 1D, and FIG. 1G. Such top edges 113 may define where openings 117 to each respective receptacle 103 may be located. In some embodiments, top edges 113 of perimeter-walls 111 of each receptacle 103 selected from the one or more receptacles 103 may be crenulated with at least one crenulation 115. See e.g., FIG. 1C, FIG. 1D, and FIG. 1G. Use of such crenulations 115 may minimize an amount of materials utilized in constructing perimeter-walls 111, while providing maximum visibility and increased ease of access to a given receptacle 103. Use of such crenulations 115 may help to maximize visibility of articles removably contained within receptacles 103. In some embodiments, such top edges 113 that may be crenulated may comprise at least one valley and at least two peaks, wherein the at least two peaks are higher than the at least one valley, with respect to bottom 105. See e.g., FIG. 1C, FIG. 1D, and FIG. 1G. Such peaks may be denoted by crenulation 115, while such valleys may be denoted by top edge 113 in the figures.

Figure 2:
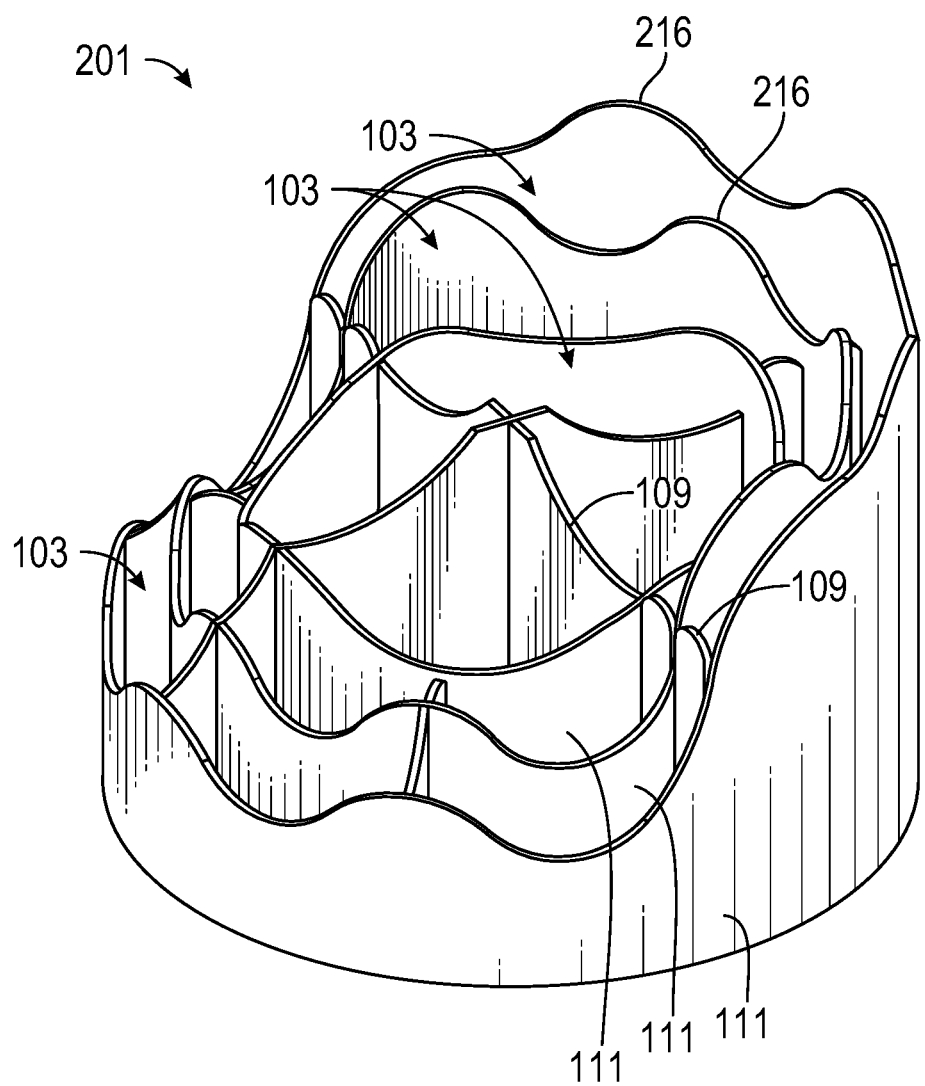
FIG. 2 may depict a perspective view of an exemplary embodiment of a vertical-organizer; wherein wall geometry may be curved.

In some embodiments, these top edges 113 that may be crenulated may follow a path that may be one or more of geometric (see e.g., FIG. 1C, FIG. 1D, and FIG. 1G) or sinuous (see e.g., FIG. 2 and/or the FIG. 7 series of figures).

In some embodiments, at least one of the side-walls 107 may be removable and/or movable. This may decrease a quantity of one or more receptacles 103 and/or change a shape of one or more receptacles 103. In some embodiments, a predetermined quantity of additional side-walls 107 may be removably added to vertical-organizer 101 to increase the quantity of one or more receptacles 103. In some embodiments, locations on bottom 105 and/or on exterior surfaces of existing side-walls 107 may comprise channels, notches, and/or slots for receiving complimentary flanges of such additional added in side-walls 107. In some embodiments, these additional side-walls 107 may be added in a dove-tail joint fashion.

For example, and without limiting the scope of the present invention, in some embodiments, one or more radial-walls 109 used in forming one or more center receptacles 119 may be removable. For example, and without limiting the scope of the present invention, in some embodiments, one or more radial-walls 109 may be added to existing one or more center receptacles 119 thus creating additional one or more center receptacles 119.

In some embodiments, one or more receptacles 103 may be the quantity of one to thirty two receptacles 103. In some embodiments, one or more receptacles 103 may be the quantity of sixteen receptacles 103. See e.g., FIG. 1E.

In some embodiments, the quantity of sixteen receptacles 103 may be arranged as follows: four center receptacles 119 located closest to center 133 of vertical-organizer 101 as viewed from the top direction; eight trapezoid shaped receptacles 123 circumscribing two of the four center receptacles 119; and four irregular shaped polygon receptacles 125 circumscribing a remainder of the two of the four center receptacles 119 that are not circumscribed by the eight trapezoid shaped receptacles 123. In some embodiments, the eight trapezoid shaped receptacles 123 may be disposed in two rows of four trapezoid shaped receptacles 123 each, an inner row closest to the center receptacles 119 and out an outer row proximate and in contact with the inner row. The outer row of four trapezoid shaped receptacles 123 may have the lowest height openings, i.e. these four trapezoid shaped receptacles 123 may represent the lowest tier. The inner row of four trapezoid shaped receptacles 123 may have next lowest height openings. See e.g., FIG. 1E and FIG. 1A.

In some embodiments, the four irregular shaped polygon receptacles 125 may be disposed in two rows of irregular shaped polygon receptacles 125, with each row having two irregular shaped polygon receptacles 125, an inner row closest to the center receptacles 119 and out an outer row proximate and in contact with the inner row. The outer row of two irregular shaped polygon receptacles 125 may have the highest height openings, i.e. these two irregular shaped polygon receptacles 125 may represent the highest tier. The inner row of two irregular shaped polygon receptacles 125 may have next highest height openings. See e.g., FIG. 1E and FIG. 1A.

And the height openings of the center receptacles 119 may be higher than rows of any of the trapezoid shaped receptacles 123, but lower than the rows of any of the irregular shaped polygon receptacles 125. See e.g., FIG. 1E and FIG. 1A.

In some embodiments, components (e.g., side-walls 107 or side-walls 107 and bottoms 105) of vertical-organizer 101 may be all integral, such that the vertical-organizer 101 may be substantially a single article of manufacture. In some embodiments, the vertical-organizer 101 may be substantially constructed as the single article of manufacture, such as, but not limited to, by injection molding and/or by 3D printing.

In some embodiments, bottom 105 and side-walls 107 of the vertical-organizer 101 may all be integral, such that vertical-organizer 101 may be a single article of manufacture.

In some embodiments, bottom 105 and the side-walls 107 may all be separate articles of manufacture that may be assembled together to form vertical-organizer 101. (See e.g., a FIG. 6 and the FIG. 7 series of figures.) The assembling together of bottom 105 and the sidewalls 107 may be done by one or more of the following: chemical adhesive, solvent bonding, ultrasonic bonding, heat welding, friction fits, snap fits, mechanical fasteners, and/or the like.

In some embodiments, vertical-organizer 101 may be substantially constructed from rigid to semi-rigid materials of construction. In some embodiments, vertical-organizer 101 may be substantially constructed from one or more of: plastics, metal, wood, composites, laminates, cardboard, ceramics, stone, glass, and/or the like.

In some embodiments, vertical-organizer 101 may be substantially constructed from one or more thermoplastics. In some embodiments, vertical-organizer 101 may be substantially constructed from one or more of polyoxymethylene (POM, such as Delrin®, Celcon®, Ramtal®, Duracon®, Hostaform®, and the like), acrylonitrile-butadiene styrene (ABS), polyvinyl chloride (PVC), polycarbonate, nylon, polystyrene, polypropylene (PP), and polyethylene (PE, including HDPE), and/or the like. Various fillers and/or colorants may be added to any such thermoformed plastic formulations. For example, and without limiting the scope of the present invention, fillers may provide desirable textures and/or increase structural strength (e.g., by using glass fibers or the like).

Continuing discussing the FIG. 1 series of figures, in some embodiments, organizer 100 may further comprise horizontal-organizer 135. In some embodiments, horizontal-organizer 135 may comprise at least one enclosure. In some embodiments, the at least one enclosure may be sized to removably house the one or more articles. In some embodiments, an enclosure-volume 159 of horizontal-organizer 135 may be sized to removably house the one or more articles. In some embodiments, an enclosure-volume 159 of horizontal-organizer 135 may be sized to removably house sheets of stationary, such as, but not limited to, paper. That is, the in some embodiments, the articles that horizontal-organizer 135 may house may be sheets of paper. In some embodiments, sizing of enclosure-volume 159 may accommodate such sheets of paper from a quarter ream up to two and half reams of paper down to a single sheet of paper, depending upon the embodiment. Such sheets of paper may be housed such that the sheets of paper may be laying substantially flat and horizontal and substantially within (or at least partially within) enclosure-volume 159. See e.g., FIG. 1B and FIG. 1C.

In some embodiments, the at least one enclosure may function as paper tray, for removable storage of paper, such as letter, legal, A4, and the like sized paper. In some embodiments, an interior length of the at least one enclosure may be substantially twelve inches. In some embodiments, an interior width of the at least one enclosure may be substantially ten inches.

In some embodiments, the at least one enclosure may be formed from at least three enclosure-side-walls, at least one enclosure-bottom 149, and at least one enclosure-top 153. In some embodiments, the at least three enclosure-side-walls may extend substantially perpendicular away from at least one enclosure-bottom 149 to connect and support at least one enclosure-top 153. In some embodiments, at least one-enclosure-top 153 may be disposed opposite from at least one-enclosure bottom 149. See e.g., FIG. 1B and FIG. 1C.

In some embodiments, the at least one enclosure-bottom 149 may act as a shelf to removably support the one more articles (e.g., sheets of paper) being removably stored at least partially within the at least one enclosure of horizontal-organizer 135.

In some embodiments, the at least three enclosure-side-walls may comprise a first-enclosure-side-wall 141, a second-enclosure-side-wall 143, and a back-enclosure-side-wall 145. In some embodiments, first-enclosure-side-wall 141 may be disposed opposite of second-enclosure-side-wall 143. In some embodiments, first-enclosure-side-wall 141 and second-enclosure-side-wall 143 may be substantially parallel to each other. See e.g., FIG. 1B and FIG. 1C for first-enclosure-side-wall 141 and second-enclosure-side-wall 143. In some embodiments, back-enclosure-side-wall 145 may be disposed opposite from an enclosure-opening 157 (e.g., at least one enclosure-opening 157). See e.g., FIG. 1D for back-enclosure-side-wall 145. See e.g., FIG. 1B and FIG. 1C for enclosure-opening 157. In some embodiments, first-enclosure-side-wall 141 and second-enclosure-side-wall 143 may each be substantially perpendicular to back-enclosure-side-wall 145.

In some embodiments, first-enclosure-side-wall 141 and second-enclosure-side-wall 143 may be substantially symmetrical to each other with respect to structure and geometry. See e.g., FIG. 1B and FIG. 1C.

In some embodiments, at least one enclosure-bottom 149, at least one enclosure-top 153, and the at least three enclosure-side-walls may substantially bound enclosure-volume 159. See e.g., FIG. 1B and FIG. 1C. In some embodiments, enclosure-volume 159 may be hollow and may be accessible from at least one enclosure-opening 157.

In some embodiments, horizontal-organizer 135 may comprise at least one charging module fastener 147. See e.g., FIG. 1B and FIG. 1G. In some embodiments, at least one charging module fastener 147 may removably attach to at least one complimentary fastener 163 located on an exterior of a charging module 161.

In some embodiments, at least one charging module fastener 147 and the at least one complimentary fastener 163 may be removably attached to each other via an attachment means. In some embodiments, at least one charging module fastener 147 and the at least one complimentary fastener 163 may be paired mechanical fasteners. Thus, the attachment means may be this paired mechanical fastener. In some embodiments, these paired mechanical fasteners are selected from the group comprising: magnets, magnets with complimentary region of ferrous metal, snap fasteners, plurality of hooks with plurality of complimentary loops (e.g., a Velcro type fastener), friction fit between at least one pin and complimentary cavity, and rail and complimentary receiving channel, and/or the like. In some exemplary embodiments, at least one charging module fastener 147 and the at least one complimentary fastener 163 may be at least one magnet and either another magnet or a region of ferrous metal. See e.g., FIG. 1B and FIG. 1G.

In some embodiments, horizontal-organizer 135 may comprise at least one charging module fastener 147 per first-enclosure-side-wall 141 and at least one charging module fastener 147 per the second-enclosure-side-wall 143. Each such at least one charging module fastener 147 may be removably attachable to at least one complimentary fastener 163 located on an exterior of a given charging module 161.

In some exemplary embodiments, first-enclosure-side-wall 141 may comprise at least two charging module fasteners 147. In some exemplary embodiments, second-enclosure-sidewall 143 may comprise at least two charging module fasteners 147. In some exemplary embodiments, each charging module 161 may comprise at least two complimentary fasteners 163 for removable attachment with either the at least two charging module fasteners 147 of first-enclosure-side-wall 141 or with the at least two charging module fasteners 147 of second-enclosure-side-wall 143. See e.g., FIG. 1B.

In some embodiments, at least some portion of a top exterior 155 of at least one enclosure-top 153 of horizontal-organizer 135 may be in communication with at least some portion of a bottom exterior of vertical-organizer 101. See e.g., FIG. 1A and FIG. 1B.

In some embodiments, this communication between horizontal-organizer 135 and vertical-organizer 101 may be removable. In some embodiments, vertical-organizer 101 may sit (rest) on top of horizontal-organizer 135 by gravity. In some embodiments, horizontal-organizer 135 may be removably attached to vertical-organizer 101 by a mechanical fastener. In some embodiments, that mechanical fastener may be Velcro or a Velcro like fastener comprising a plurality of hooks on one surface and a plurality of complimentary loops located on the opposing surface to be removably mated.

In some embodiments, the communication between horizontal-organizer 135 and vertical-organizer 101 may be permanent. In some embodiments, this permanent communication (connection) may be accomplished by one or more of the following: chemical adhesive, solvent bonding, ultrasonic bonding, heat welding, mechanical fasteners, and/or the like. In some embodiments, these mechanical fasteners may be nails, screws, bolts, rivets, friction snap fits, and the like.

In some embodiments, horizontal-organizer 135 may be substantially constructed from rigid to semi-rigid materials of construction. In some embodiments, horizontal-organizer 135 may be substantially constructed from one or more of: plastics, metal, wood, composites, laminates, cardboard, ceramics, stone, glass, and/or the like.

In some embodiments, horizontal-organizer 135 may be substantially constructed from one or more thermoplastics. In some embodiments, horizontal-organizer 135 may be substantially constructed from one or more of polyoxymethylene (POM, such as Delrin®, Celcon®, Ramtal®, Duracon®, Hostaform®, and the like), ABS, PVC, polycarbonate, nylon, polystyrene, PP, and polyethylene (PE, including HDPE), and/or the like. Various fillers and/or colorants may be added to any such thermoformed plastic formulations. For example, and without limiting the scope of the present invention, fillers may provide desirable textures and/or increase structural strength (e.g., by using glass fibers or the like).

In some embodiments, horizontal-organizer 135 may be substantially constructed of substantially transparent materials of construction. In some embodiments, horizontal-organizer 135 may be substantially constructed of substantially opaque materials of construction. In some embodiments, some components of horizontal-organizer 135 may be substantially transparent while other components of horizontal-organizer 135 may be substantially opaque.

Continuing discussing the FIG. 1 series of figures, in some embodiments, organizer 100 may comprise at least one charging module 161 and at least one horizontal-organizer 135. See e.g., FIG. 1A. In some embodiments, at least one charging module 161 may comprise a circuit. In some embodiments, this circuit may comprise at least one standard electrical outlet 165 for receiving a standard electrical plug. See e.g., FIG. 1D. In some embodiments, this circuit may comprise at least one port 167 for removably connecting to at least one charging cable of at least one computing device. See e.g., FIG. 1B and FIG. 1C. In some embodiments, this circuit may comprise an AC/DC converter. In some embodiments, the AC/DC converter may be disposed between and connected to at least one standard electrical outlet 165 and to at least one port 167. In some embodiments, at least one charging module 161 may provide some electrical power to the at least one computing device for at least charging purposes. Disposed between and in communication with at least one standard electrical outlet 165 and at least one port 167 may be electrical wiring (not shown) within housing 169.

In some embodiments, the circuit may receive 120 AC (or similar alternating current power) and convert that AC power to appropriate DC power for charging the at least one computing device. In some embodiments, the at least one computing device may be selected from one or more of: a smartphone, a smartwatch, a tablet computing device, a GPS device, a pedometer, a laptop, a desktop, and the like.

In some embodiments, at least one port 167 may be selected from the group comprising: a USB connector, a mini-USB connector, a micro-USB connector, an Apple connector, a FireWire connector, a ThunderBolt connector, or any other connector configuration for removable coupling to the at least one charging cable of the least one computing device.

In some embodiments, the at least one port may be a radio configured to provide wireless power transmission to the at least one computing device. In such embodiments, the circuit may further comprise a processor and memory in electrical communication with the processor. The processor and the radio may be in electrical communication. The memory may non-transitorily store code, executable by the processor, governing how the radio may wirelessly transmit power to the at least one computing device.

In some embodiments, at least one charging module 161 may comprise a housing 169. In some embodiments, housing 169 may have an exterior shape of a rectangular prism. In some embodiments, housing 169 may have a height that is substantially the same as a height of horizontal-organizer 135. In some exemplary embodiments, housing 169 may have a length of substantially twelve inches by a width of substantially two inches.

In some embodiments, substantially all of the circuit may be disposed within housing 169. In some embodiments, housing 169 may house the AC/DC converter. In some embodiments, housing 169 may provide physical structure for attachment of at least one standard electrical outlet 165. In some embodiments, at least one standard electrical outlet 165 may be located on a back-wall of the housing 169. See e.g., FIG. 1D. In some embodiments, housing 169 may provide physical structure for attachment of at least one port 167. In some embodiments, at least one port 167 may be located on a front-wall of housing 169. See e.g., FIG. 1B and FIG. 1C. In some embodiments, the front-wall and the back-wall of housing 169 may be disposed opposite of each other. In some embodiments, the front-wall may be separated from the back-wall by the length of housing 169.

In some embodiments, at least one charging module 161 may be removably attachable to at least one side-wall (e.g., 141 and/or 143) of horizontal-organizer 135. See e.g., FIG. 1B. In some embodiments, at least one charging module 161 may comprise at least one complimentary fastener 163 located on an exterior of housing 169. See e.g., FIG. 1B. In some embodiments, at least one complimentary fastener 163 may be complimentary to at least one charging module fastener 147 located on at least one enclosure-side-wall (e.g., 141 and/or 143) of horizontal-organizer 135. In some embodiments, at least one complimentary fastener 163 and the at least one charging module fastener 147 may removably attach to each other.

As noted above, in some embodiments, at least one charging module fastener 147 and the at least one complimentary fastener 163 may be paired mechanical fasteners. In some embodiments, these paired mechanical fasteners are selected from the group comprising: magnets, magnets with complimentary region of ferrous metal, snap fasteners, plurality of hooks with plurality of complimentary loops (e.g., a Velcro like fastener), friction fit between at least one pin and complimentary cavity, and rail and complimentary receiving channel, and/or the like. In some exemplary embodiments, at least one charging module fastener 147 and the at least one complimentary fastener 163 may be at least one magnet and either another magnet or a region of ferrous metal. See e.g., FIG. 1B and FIG. 1G.

In some embodiments, at least one charging module 161 may be removably attachable to either a left-side or a right-side of horizontal-organizer 135; wherein the left-side and the right-side are as viewing the horizontal-organizer 135 from a front side with enclosure-opening 157 closest to a viewer.

In some embodiments, housing 169 may be substantially constructed from rigid to semi-rigid materials of construction. In some embodiments, housing 169 may be substantially constructed from one or more of plastics, metal, wood, composites, laminates, cardboard, ceramics, stone, or glass.

In some embodiments, housing 169 may be substantially constructed from one or more thermoplastics. In some embodiments, housing 169 may be substantially constructed from one or more of polyoxymethylene (POM, such as Delrin®, Celcon®, Ramtal®, Duracon®, Hostaform®, and the like), ABS, PVC, polycarbonate, nylon, polystyrene, PP, and polyethylene (PE, including HDPE), and/or the like. Various fillers and/or colorants may be added to any such thermoformed plastic formulations. For example, and without limiting the scope of the present invention, fillers may provide desirable textures and/or increase structural strength (e.g., by using glass fibers or the like).

In some embodiments, housing 169 may be substantially constructed of substantially transparent materials of construction. In some embodiments, housing 169 may be substantially constructed of substantially opaque materials of construction. In some embodiments, some components of housing 169 may be substantially transparent while other components of housing 169 may be substantially opaque.

In some embodiments, organizer 100 may comprise turntable 171 for rotating objects in communication with turntable 171. In some embodiments, turntable 171 may be disposed beneath and in communication with horizontal-organizer 135. See e.g., FIG. 1A. In some embodiments, turntable 171 may be disposed beneath and in communication with vertical-organizer 101. See e.g., FIG. 3A. The objects may be one or more of vertical-organizer 101 or horizontal-organizer 135.

In some embodiments, turntable 171 may be comprised of an upper member 173 and a base member 177. In some embodiments, upper member 173 may be disposed above base member 177. In some embodiments, both upper member 173 and base member 177 may share a common axis of rotation passing through a center of upper member 173 and a center of base member 177, such that upper member 173 may rotate with respect to base member 177. See e.g., FIG. 1B. In some embodiments, upper member 173 may be one or more of substantially flat, substantially planar, and/or substantially circular.

In some embodiments, an exterior bottom of base member 177 may be in removable contact with at least a portion of a substrate. In some embodiments, the substrate may be selected from the group comprising: a floor, a ground, a desktop, a tabletop, or top exterior 155 of enclosure-top 153 of horizontal-organizer 135.

In some embodiments, an exterior top of upper member 173 may be in removable contact with at least a portion of the exterior of bottom 105 of vertical-organizer 101 or bottom exterior 151 of enclosure-bottom 149 of horizontal-organizer 135.

In some embodiments, disposed between upper member 173 and base member 177 may be a rotational means that may permit rotation of upper member 173 with respect to base member 177 about the common axis of rotation. In some embodiments, the rotational means may be one or more of a plurality of bearings, two regions of complimentary low friction surfaces, and/or an axle located concentrically with the common axis of rotation.

In some embodiments, upper member 173 and base member 177 may be substantially constructed from rigid to semi-rigid materials of construction. In some embodiments, upper member 173 and base member 177 may be substantially constructed from one or more of plastics, metal, wood, composites, laminates, cardboard, ceramics, stone, or glass.

In some embodiments, upper member 173 and base member 177 may be substantially constructed from one or more thermoplastics. In some embodiments, upper member 173 and base member 177 may be substantially constructed from one or more of polyoxymethylene (POM, such as Delrin®, Celcon®, Ramtal®, Duracon®, Hostaform®, and the like), ABS, PVC, polycarbonate, nylon, polystyrene, PP, and polyethylene (PE, including HDPE), and/or the like. Various fillers and/or colorants may be added to any such thermoformed plastic formulations. For example, and without limiting the scope of the present invention, fillers may provide desirable textures and/or increase structural strength (e.g., by using glass fibers or the like).

In some embodiments, upper member 173 and base member 177 may be substantially constructed of substantially transparent materials of construction. In some embodiments, upper member 173 and base member 177 may be substantially constructed of substantially opaque materials of construction. In some embodiments, some regions of upper member 173 and base member 177 may be substantially transparent while other regions of upper member 173 and base member 177 may be substantially opaque.

Now turning to a discussion of FIG. 2. FIG. 2 may depict may depict a perspective view of an embodiment of a vertical-organizer 201; wherein perimeter-wall 111 geometry may be curved as opposed to substantially flat as in vertical-organizer 101. In some organizer embodiments, vertical-organizer 201 may replace vertical-organizer 101.

In some embodiments, a two dimensional projection of vertical-organizer 201 from a top or a bottom direction may result in an overall two dimensional exterior shape selected from the group comprising: a circle or an ellipse. For example, and without limiting the scope of the present invention, in some exemplary embodiments, this two dimensional projection may be a circle, see e.g., FIG. 2 (and see the FIG. 7 series of figures).

In some embodiments of vertical-organizer 201, each perimeter-wall 111 may be curved as viewed from the top direction. See e.g., FIG. 2. Recall that side-wall 107 may comprise one or more of radial-walls 109 and perimeter-walls 111. In some embodiments, each perimeter-wall 111 may be curved in a sinuous fashion as viewed from the top direction. See e.g., FIG. 2. That it, the sinuous fashion may flow in a path of one or more turns without angular segments.

In some embodiments, each radial-wall 109 may be curved as viewed from the top direction. In some embodiments, each radial-wall 109 may be curved in the sinuous fashion as viewed from the top direction. This embodiment is not depicted in the figures.

In some embodiments, each perimeter-wall 111 of curved vertical-organizer 201 may comprise top edge 113. Such top edges 113 may define where openings 117 to each respective receptacle 103 may be located. In some embodiments, top edges 113 of perimeter-walls 111 of each receptacle 103 selected from the one or more receptacles 103 may be crenulated with at least one crenulation 115. In some embodiments, such top edges 113 that may be crenulated may comprise at least one valley and at least two peaks, wherein the at least two peaks are higher than the at least one valley, with respect to bottom 105. In some embodiments, these top edges 113 that may be crenulated may follow a path that may be sinuous, i.e., sinuous crenulation path 216. See e.g., FIG. 2. Such paths may be smooth and wavelike or any other predetermined pattern.

In the case of curved vertical-organizers, such as curved vertical-organizer 201 or the curved vertical-organizer shown in FIG. 7A, center receptacle 119 shape may be a pie wedge shape (or a pizza slice shape); see e.g., FIG. 2 and FIG. 7A.

The FIG. 3 series of figures may comprise FIG. 3A through FIG. 3G. The FIG. 3 series of figures may depict various views of organizer 300. Organizer 300 may be different from organizer 100 in of two ways. In organizer 300 there may be two charging modules 161. In organizer 300 turntable 171 may be disposed between vertical-organizer 101 and horizontal-organizer 135. However, details of each subassembly of organizer 300 may be substantially the same as the subassemblies of organizer 100. For example, and without limiting the scope of the present invention, organizer 300 may comprise one vertical-organizer 101, one turntable 171, one horizontal-organizer 135, and two charging modules 161. Likewise, in organizer 300, vertical-organizer 101 may be replaced with vertical-organizer 201, or any other vertical-organizer described and disclosed herein, such as vertical-organizer 401 or vertical-organizer 501.

Figure 3A:
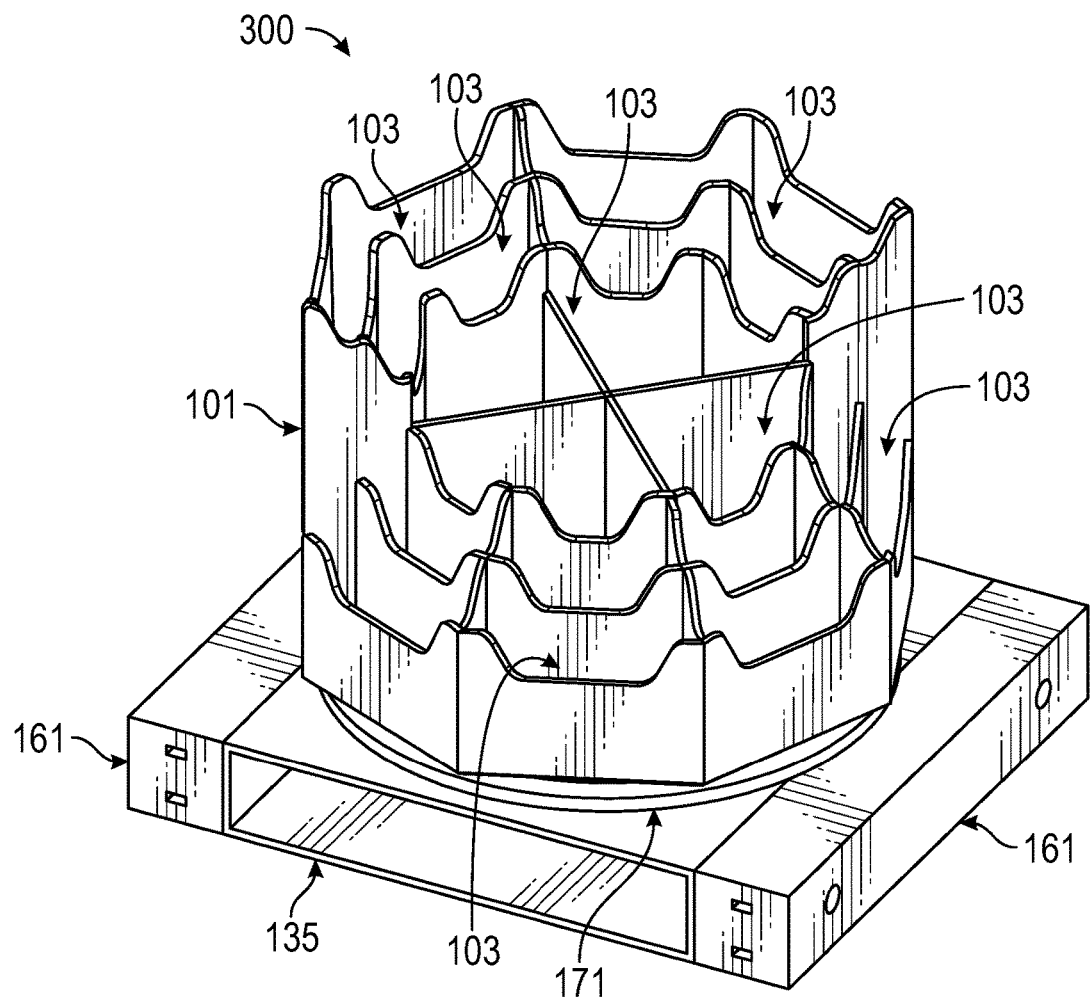
FIG. 3A may depict a perspective view of an embodiment of an assembled organizer.
Figure 3B:
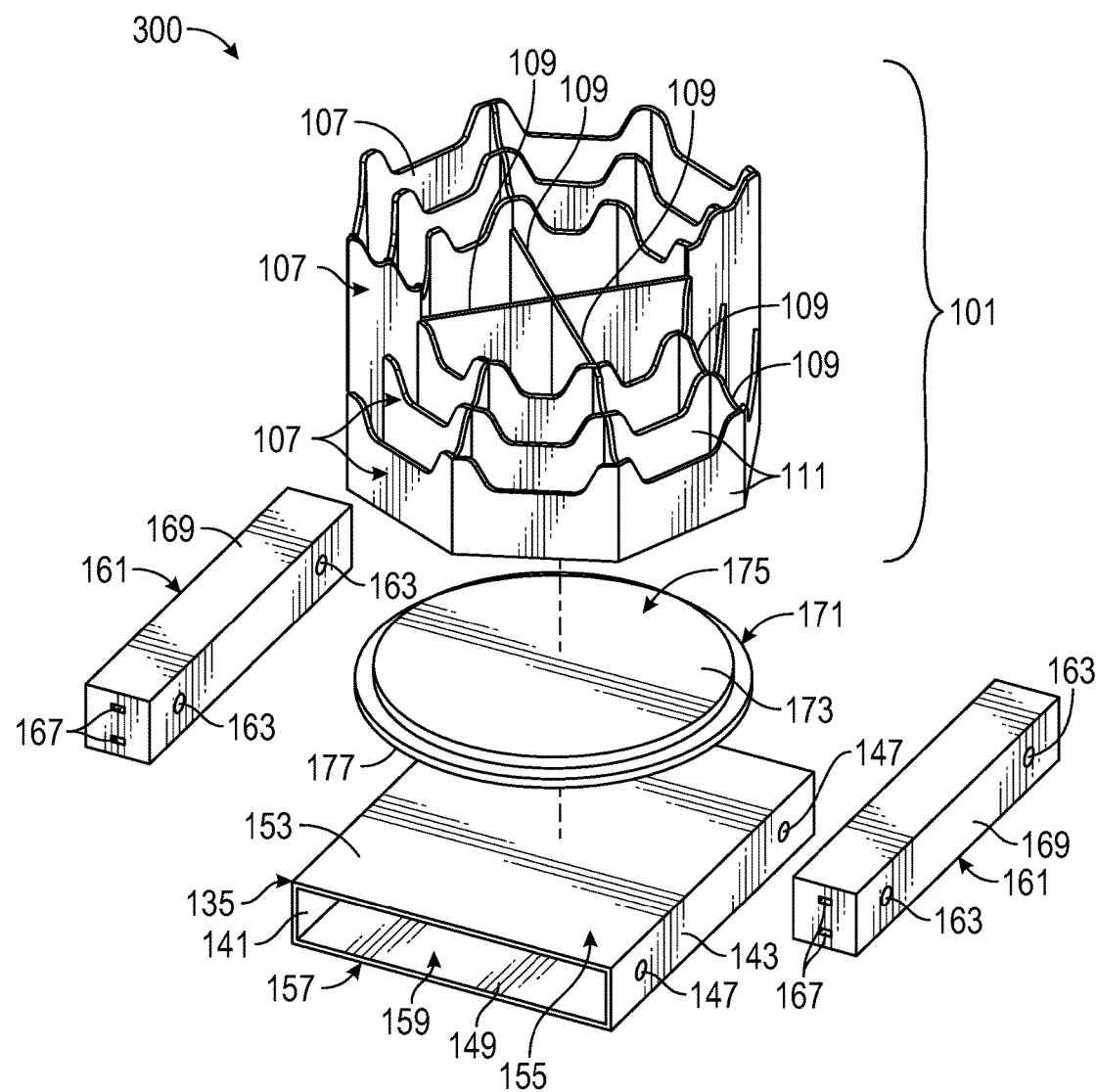
FIG. 3B may depict an exploded perspective view of subassemblies from the organizer of FIG. 3A.
Figure 3C:
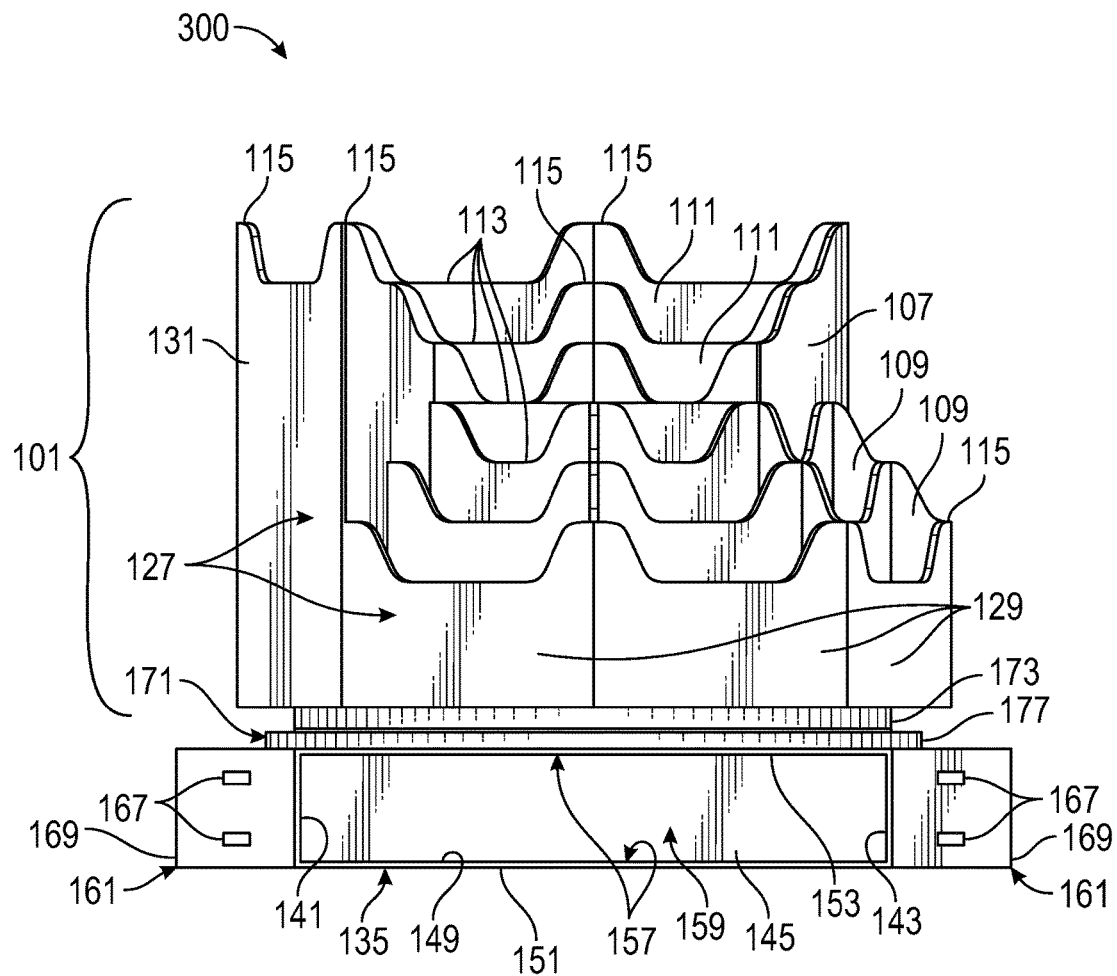
FIG. 3C may depict a front view of the organizer of FIG. 3A.
Figure 3D:
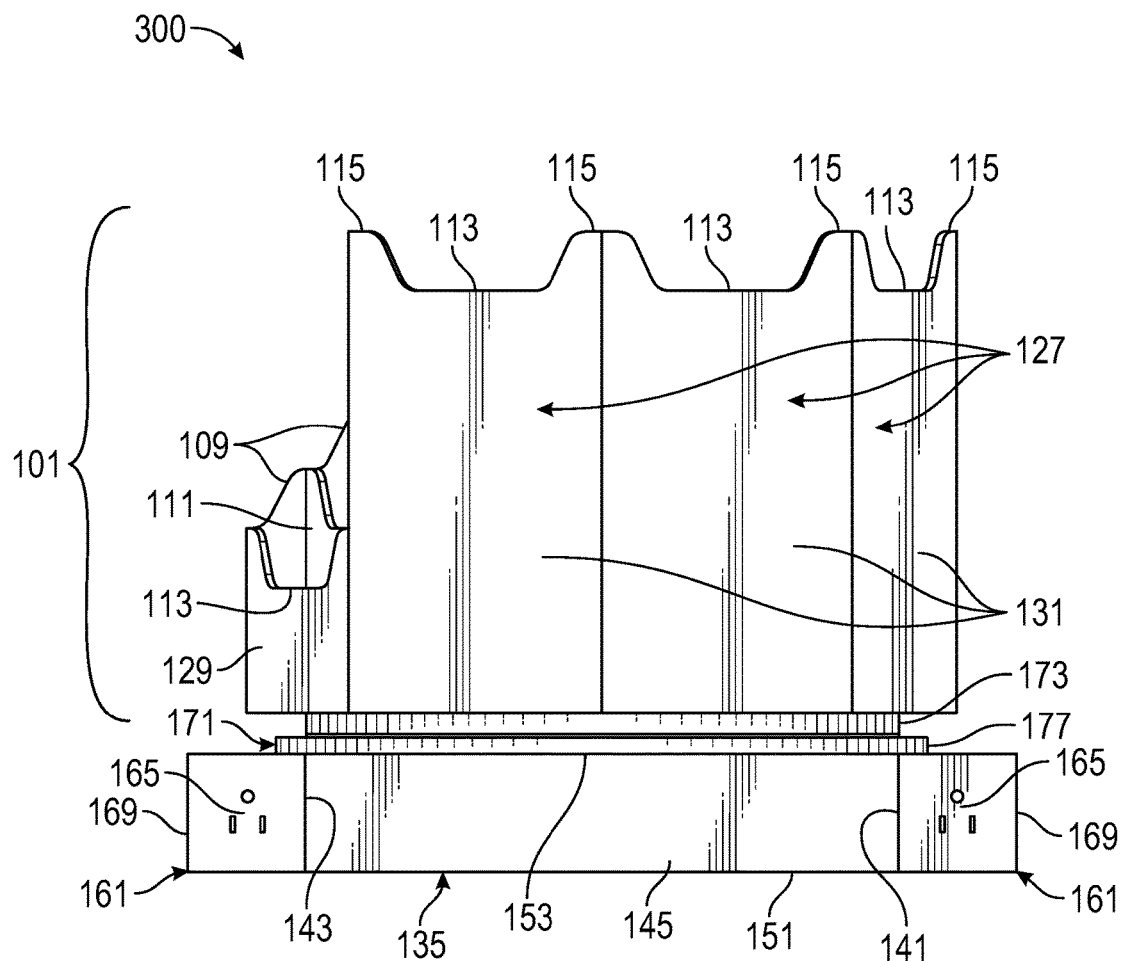
FIG. 3D may depict a back view of the organizer of FIG. 3A.
Figure 3E:
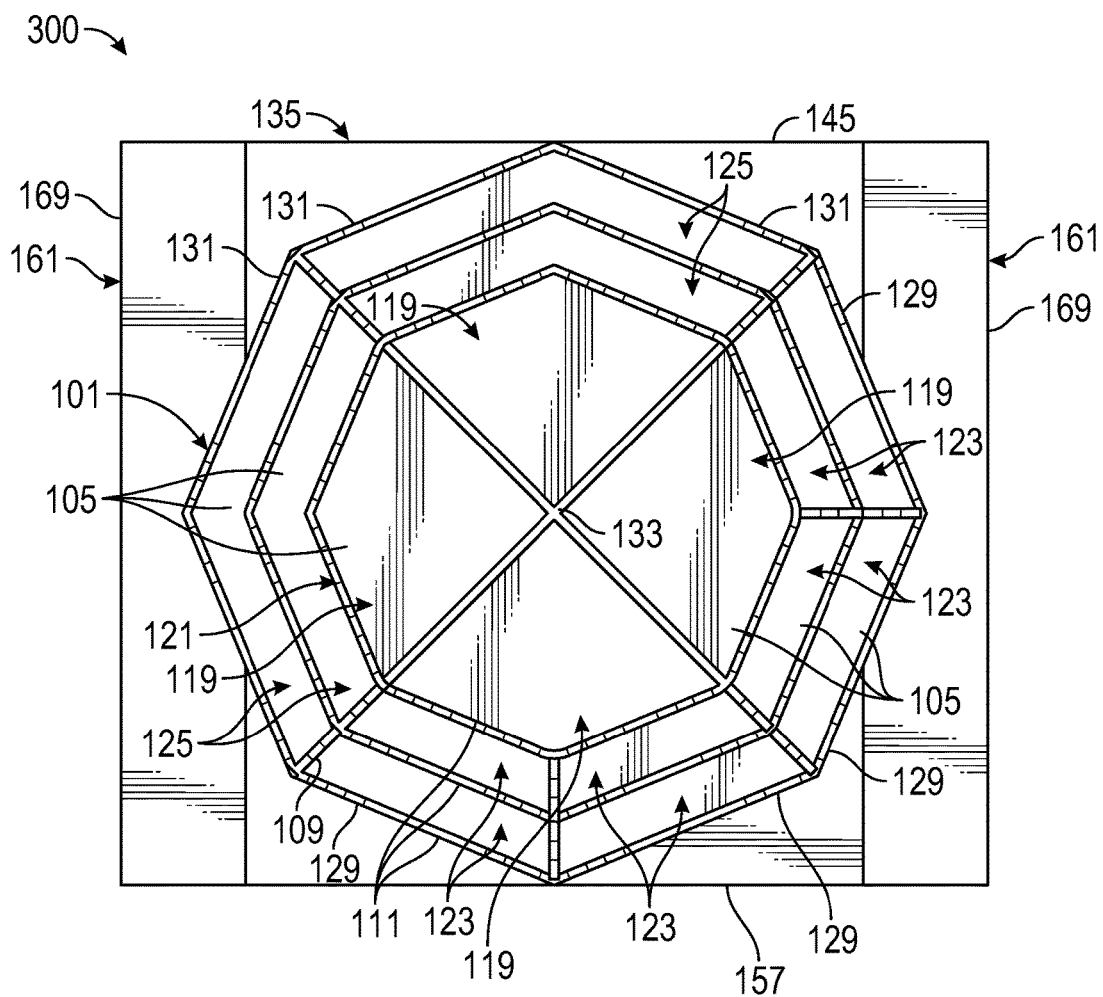
FIG. 3E may depict a top view of the organizer of FIG. 3A.
Figure 3F:
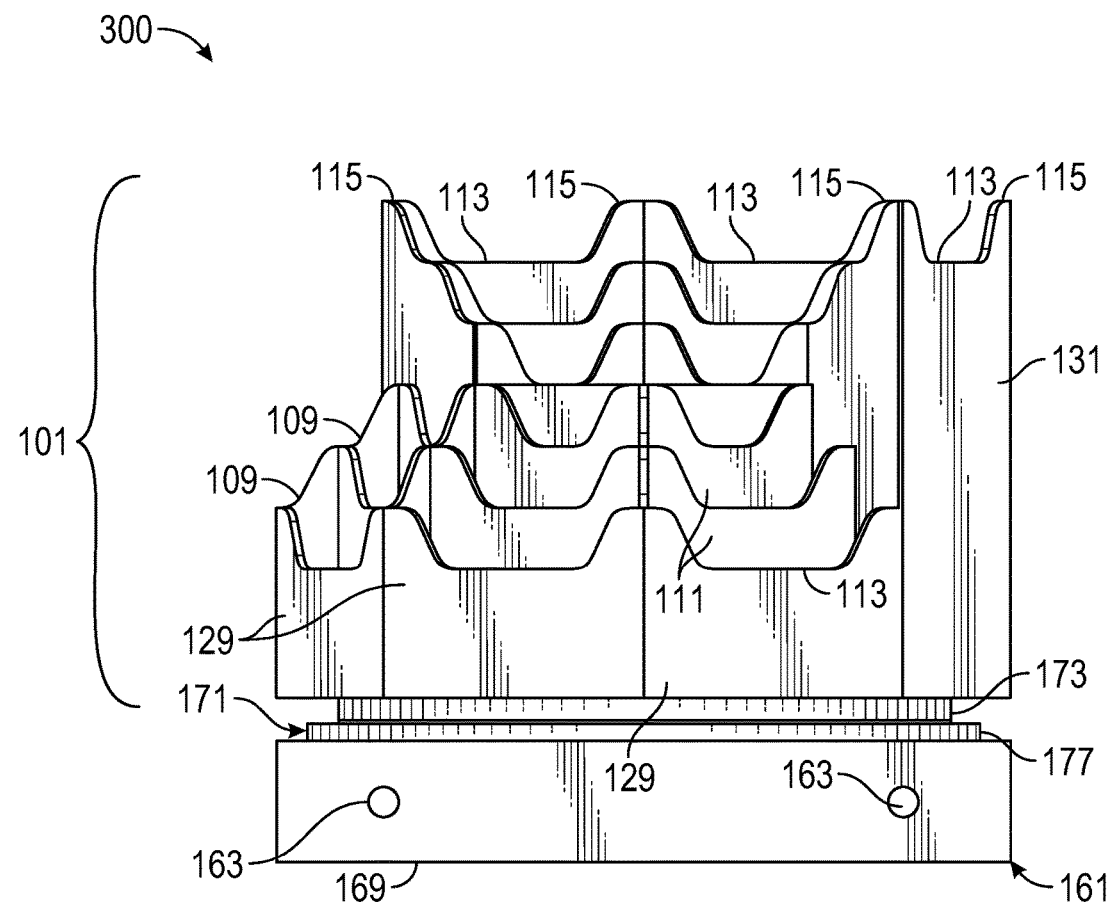
FIG. 3F may depict a right-side view of the organizer of FIG. 3A.
Figure 3G:
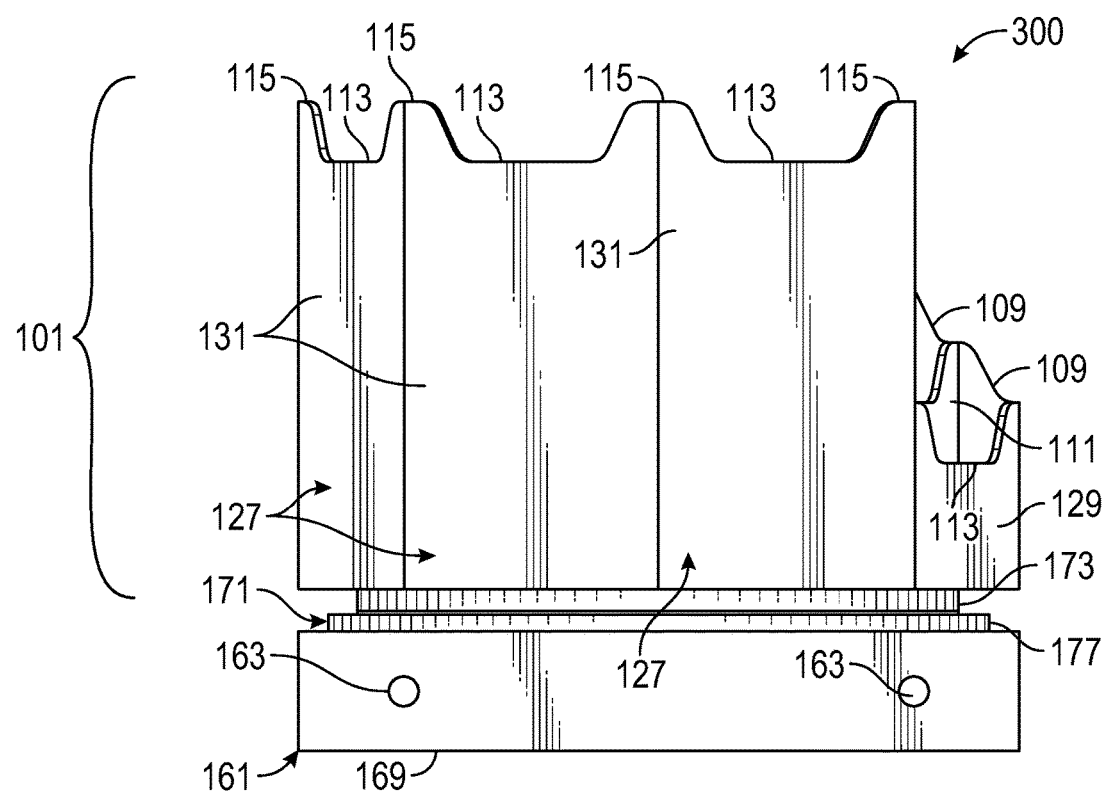
FIG. 3G may depict a left-side view of the organizer of FIG. 3A.

FIG. 3A may depict a perspective view of an embodiment of an assembled organizer 300 in an assembled state. FIG. 3B may depict an exploded perspective view of the subassemblies of organizer 300. FIG. 3C may depict a front view of organizer 300. FIG. 3D may depict a back view of organizer 300. FIG. 3E may depict a top view of organizer 300. FIG. 3F may depict a right-side view of organizer 300. FIG. 3G may depict a left-side view of organizer 300. Note, a bottom view of organizer 300 may not be depicted; however, see FIG. 1F, wherein the bottom view of organizer 100 may be similar to the bottom view of organizer 300, except organizer 300 may comprise one additional charging module 161, disposed opposite of the other charging module 161 and turntable 171 in organizer 300 would not be visible from the bottom view of organizer 300.

In some embodiments of organizer 300, turntable 171 may be disposed beneath and in communication with vertical-organizer 101. See e.g., FIG. 3A. In some embodiments, turntable 171 may be disposed between horizontal-organizer 135 and vertical-organizer 101, with horizontal-organizer 135 resting upon some substrate or surface (e.g., a desktop or a table top). See e.g., FIG. 3A. In some embodiments, at least some portion of top exterior 155 of at least one enclosure-top 153 of horizontal-organizer 135 may be in communication with at least some portion of a bottom exterior of turntable 171. See e.g., FIG. 3A and FIG. 3B. In some embodiments, at least some portion of a top exterior of turntable 171 may be in communication with at least some portion of the bottom exterior of vertical-organizer 101. In some embodiments, at least some portion of upper member 173 of turntable 171 may be in communication with at least some portion of the bottom exterior of vertical-organizer 101. See e.g., FIG. 3A.

In some embodiments, first-enclosure-side-wall 141 of horizontal-organizer 135 may be in removable attachment with one charging module 161 and second-enclosure-side-wall 143 of horizontal-organizer 135 may be in removable attachment with another charging module 161. See e.g., FIG. 3A and FIG. 3B.

Figure 4:
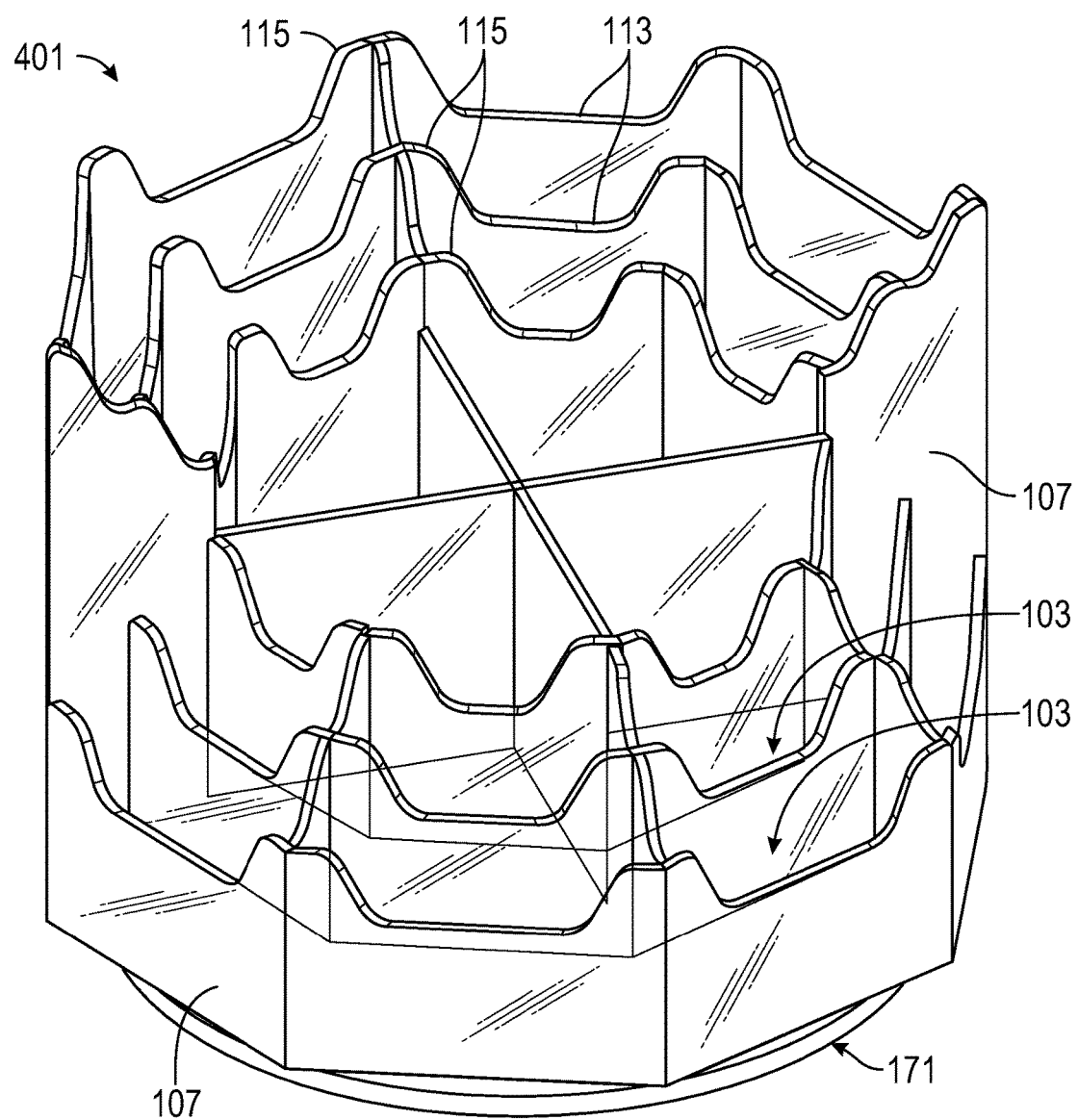
FIG. 4 may depict a perspective view of an embodiment of a vertical-organizer, wherein at least a portion of the vertical-organizer may be constructed from substantially transparent materials of construction.

FIG. 4 may depict a perspective view of an embodiment of a vertical-organizer 401, wherein at least a portion of vertical-organizer 401 may be constructed from substantially transparent materials of construction. Like the progressively tiered structure, such transparency may maximize article visibility and enhance usability of any organizer comprising vertical-organizer 401.

In some embodiments, one or more of side-walls 107 may be substantially constructed of substantially transparent materials of construction, such that any such resulting side-walls 107 of vertical-organizer 401 may be substantially transparent. See e.g., FIG. 4.

In some embodiments, one or more of side-walls 107 may be substantially constructed of substantially opaque materials of construction, such that any such resulting side-walls 107 may be substantially opaque. See e.g., FIG. 4. In some embodiments, some side-walls 107 may be transparent while other side-walls 107 may be opaque.

In some embodiments, any of the vertical-organizers (e.g., 101, 201, 401, 501, and/or the like) may be substantially constructed of substantially transparent materials of construction. In some embodiments, at least the front half of receptacles 103 of any of the vertical-organizers (e.g., 101, 201, 401, 501, and/or the like) may be substantially constructed of substantially transparent materials of construction. The at least front half of receptacles 103 may comprise plurality of trapezoid shaped receptacles 123 and the front two of the one or more center receptacles 119. See e.g., FIG. 4. In some embodiments, at least the back half of receptacles 103 of any of the vertical-organizers (e.g., 101, 201, 401, 501, and/or the like) may be substantially constructed of substantially opaque materials of construction. The at least back half of receptacles 103 may comprise plurality of irregular shaped polygon receptacles 125 and the back two of the one or more center receptacles 119. See e.g., FIG. 4.

Figure 5A:
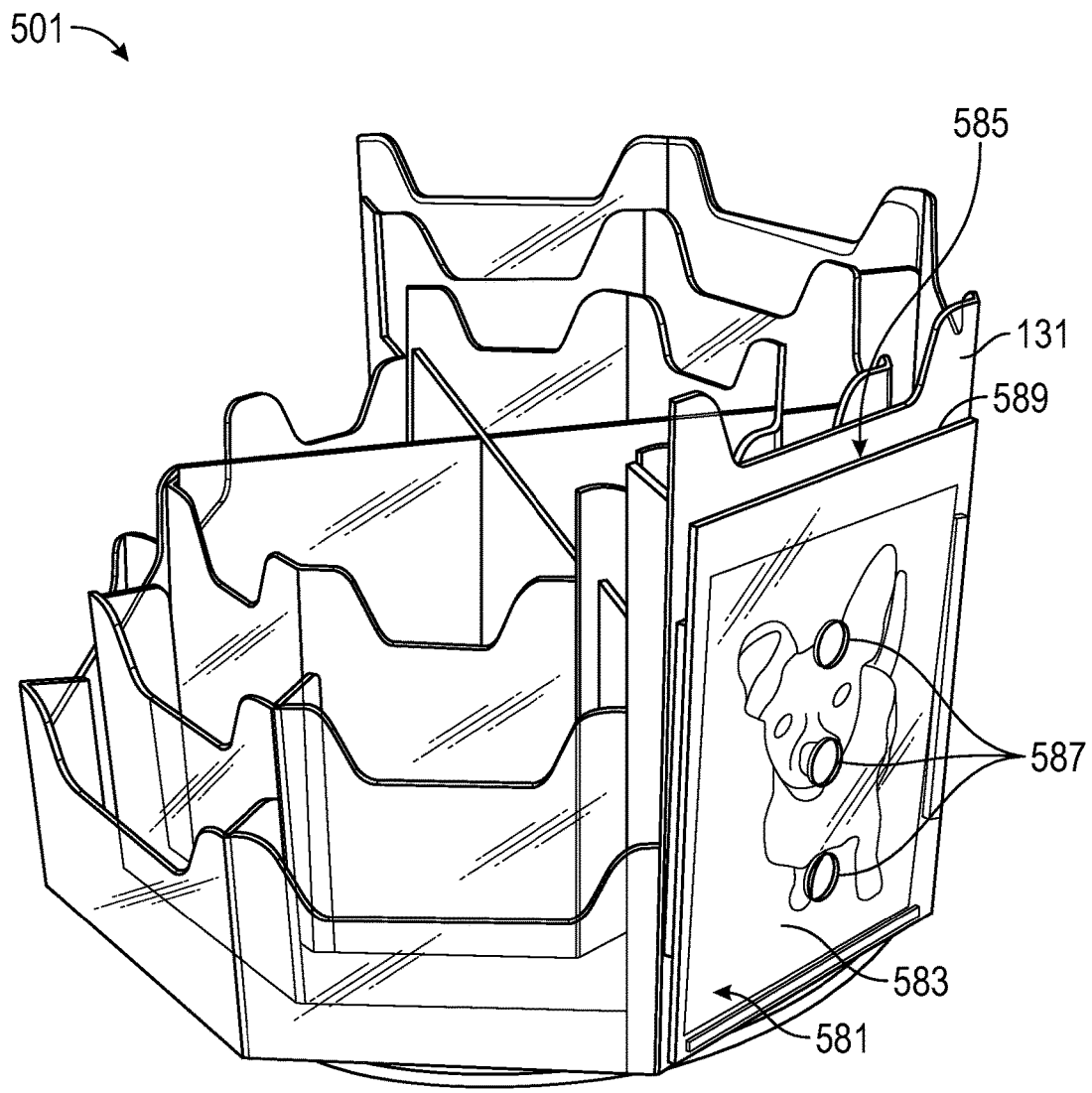
FIG. 5A may depict a perspective view of an embodiment of a vertical-organizer, wherein the vertical-organizer comprises one or more photo-holders.
Figure 5B:
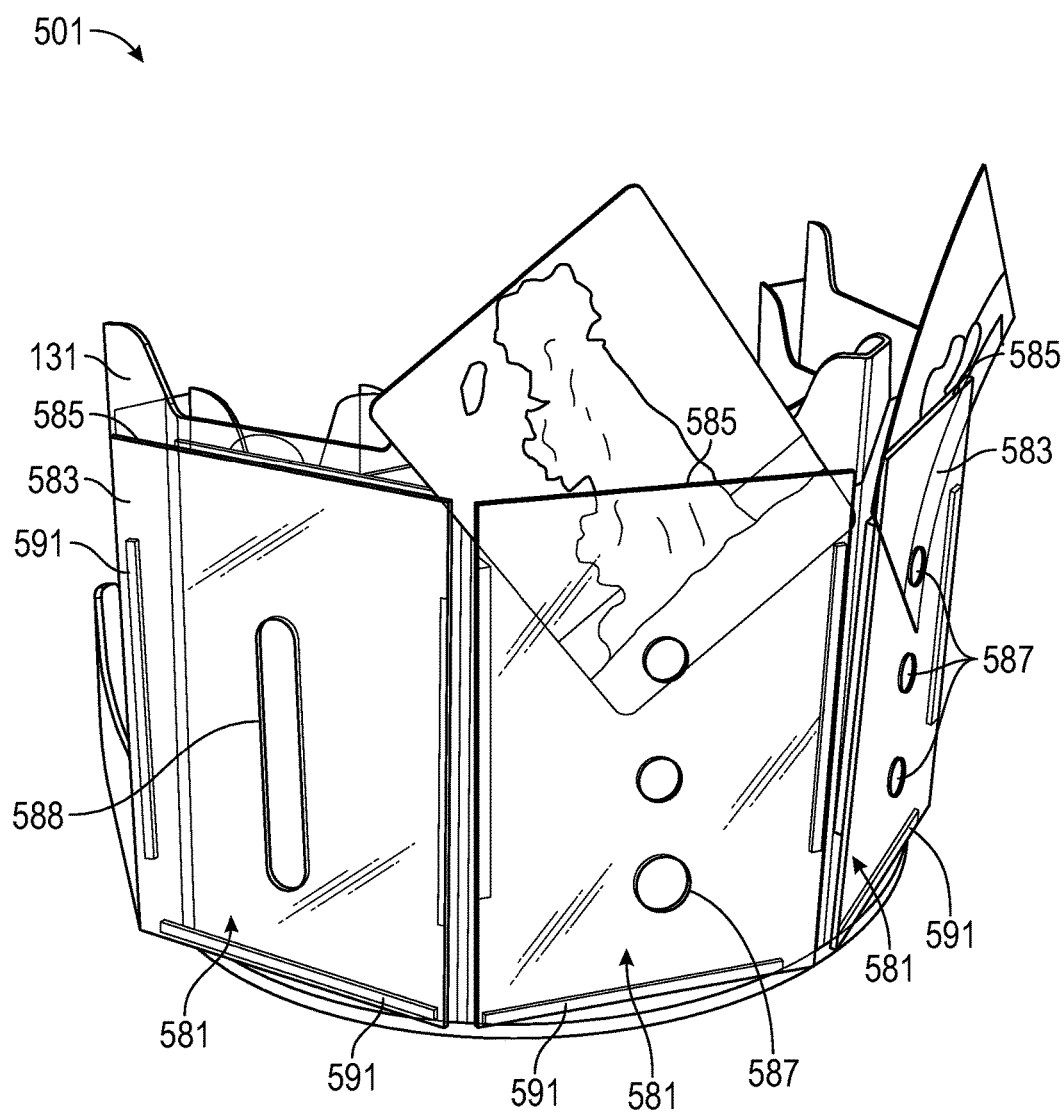
FIG. 5B may depict a back perspective view of the embodiment of the vertical-organizer comprising the one or more photo-holders wherein a photo may be depicted being inserted into (or removed from) the one or more photo-holders.
Figure 5C:
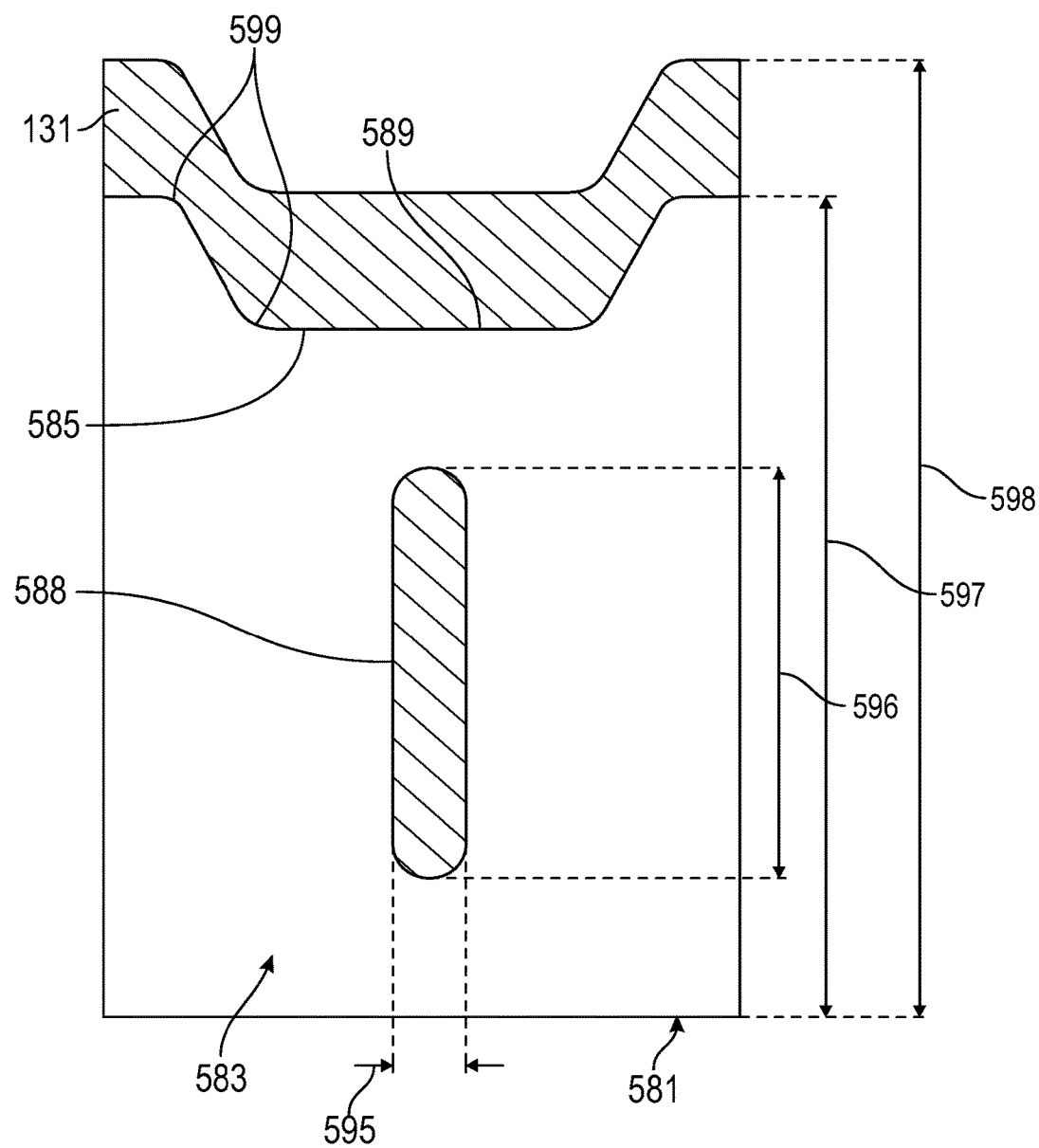
FIG. 5C may depict a front view of a photo-holder.
Figure 5D:
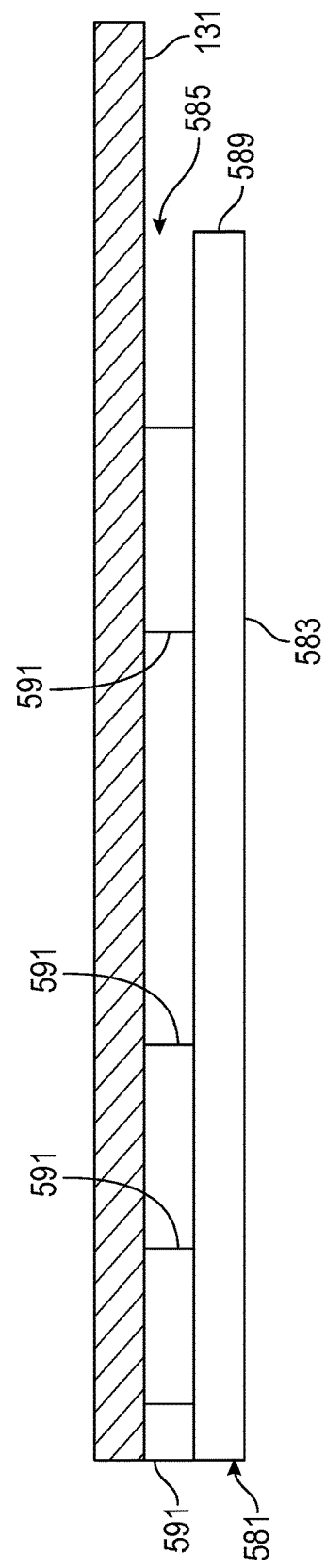
FIG. 5D may depict a side view of a photo-holder.

The FIG. 5 series of figures may comprise FIG. 5A through FIG. 5F. These FIG. 5 series figures may depict various views of photo-holders 581. FIG. 5A may depict a perspective view of an embodiment of a vertical-organizer 501, wherein vertical-organizer 501 may comprise one or more photo-holders 581. FIG. 5B may depict a back perspective view of vertical-organizer 501 comprising one or more photo-holders 581 wherein a photo may be depicted being inserted into the one or more photo-holders 581 (or alternatively where the photo may be being removed). FIG. 5C may depict a front view of photo-holder 581. FIG. 5D may depict a side view of photo-holder 581. FIG. 5E may depict a top view of photo-holder 581. FIG. 5F may depict a bottom view of photo-holder 581.

In some embodiments, vertical-organizer 501 may comprise one or more photo-holders 581. Note, aside from the addition of one or more photo-holders 581, vertical-organizer 501 may be substantially the same as vertical-organizer 101, vertical-organizer 201, or vertical-organizer 401; such that these other vertical-organizers may also be used with one or more photo-holders 581. In some embodiments, one or more photo-holders 581 may be attached to at least one outer back 131 of exterior outside surface 127 of vertical-organizer 501. In some embodiments, one or more photo-holders 581 may be attached to at least one outer back 131 of exterior outside surface 127 of any vertical-organizer disclosed herein, such as vertical-organizer 501, vertical-organizer 101, curved vertical-organizer 201, the vertical-organizer of FIG. 6B, and/or the curved vertical-organizer of FIG. 7A.

In some embodiments, photo-holder 581 may be a substantially planar member and may be substantially transparent. In some embodiments, this substantially planar member of photo-holder 581 may be substantially flat and straight (e.g., when attached to vertical-organizer 501, vertical-organizer 101, or the vertical-organizer of FIG. 6B); whereas, in other embodiments, this substantially planar member of photo-holder 581 may be substantially flat and curved (e.g., when attached to curved vertical-organizer 201 or the curved vertical-organizer of FIG. 7A). Each photo-holder 581 has a holder height 597. In some embodiments, holder height 597 may be the same or less than back wall height 598, where back wall height 598 may be the height of outer back 131. In some embodiments, each photo-holder 581 may comprise a sleeve (e.g., a cavity) sized to removably hold at least one photograph. Or alternatively, in some embodiments, the planar member of photo-holder 581, together with one or more spacers 591, and outer back 131 may form the sleeve or the cavity that is for removable holding of at least one photograph; wherein the one or more spacers 591 are disposed between and in communication with photo-holder 581 and outer back 131. See the FIG. 5 series of figures in general.

In some embodiments, an exterior-surface 583 of one or more photo-holders 581 may be substantially transparent to permit viewing of the at least one photograph when that at least one photograph may be removably inserted into the sleeve of the given photo-holder 581. See e.g., FIG. 5A and FIG. 5B.

In some exemplary embodiments, where the overall two dimensional exterior shape of the vertical-organizer may be the octagon (see e.g., FIG. 1E, FIG. 3E, and the FIG. 6 series of figures), there may be four distinct outer back 131 regions, corresponding to four back sides of the octagon. In some embodiments, each or at least one, of these four distinct outer back 131 regions may have one photo-holder 581 attached. Or in some embodiments, one, two, or three of these four distinct outer back 131 regions may have one photo-holder 581 attached. See e.g., FIG. 5A and FIG. 5B.

In some embodiments, the sleeve of each photo-holder 581 may be two planar members with a cavity disposed between these two planar members sized to accommodate a photograph. In some embodiments, these two planar members may be substantially parallel with respect to each other. In some embodiments, the sleeve may be formed from just one planar member that comprises exterior-surface 583 and with one of the four distinct outer back 131 regions that may form a back of the sleeve. Each such planar member may be substantially parallel with each of the four distinct outer back 131 regions.

In some embodiments, each photo-holder 581 selected from one or more photo-holders 581 may comprise a sleeve-opening 585 providing access to the sleeve for the at least one photograph. In some embodiments, sleeve-opening 585 may be located on a top (top edge 589) of photo-holder 581. See e.g., FIG. 5 series of figures in general.

In some embodiments, exterior-surface 583 may comprise one or more of at least one access-hole 587 or at least one access-slot 588. In some embodiments, at least one access-hole 587 and/or at least one access-slot 588 may permit a user to physically touch (e.g., with a finger) the at least one photograph when the at least one phonograph may be removably located within the sleeve for purposes of inserting or removing the at least one photograph from the sleeve. See e.g., FIG. 5B and FIG. 5C.

In some embodiments, the planar member that may comprise exterior-surface 583 may be attached to any of the four distinct outer back 131 regions by one or more spacers 591. See e.g., FIG. 5D. In some embodiments, one or more spacers 591 may be disposed between the planar member and any of the four distinct outer back 131 regions. Such spacer 591 may be attached to any of the four distinct outer back 131 regions and attached to the planar member by one or more of the following: chemical adhesive, solvent bonding, ultrasonic bonding, heat welding, friction fits, snap fits, mechanical fasteners, and/or the like. Thus, the photo-holder 581 attachment means may at least be a combination of spacers 591 how such spacers 591 are attached to outer back 131 regions and to the interior side (inside) of photo-holder 581.

In some embodiments, photo-holder 581 may comprise a top edge 589. In some embodiments, top edge 589 may be crenulated. See e.g., FIG. 5C. In some embodiments, top edge 589 of photo-holder 581 may be crenulated in a substantially similar pattern of crenulations 115 of top edges 113 of at least one outer back 131 of exterior outside surface 127 of vertical-organizer 501. In some embodiments, top edges 589 that may be crenulated may comprise at least one valley and at least two peaks, wherein the at least two peaks may be higher than the at least one valley, with respect to bottom 105. In some embodiments, top edges 589 that may be crenulated may follow a path is one or more of sinuous or geometric (see e.g., FIG. 5C for the geometric crenulation path). For example, and without limiting the scope of the present invention, a given crenulation path may be formed from corners, such as corners 599 as depicted in FIG. 5C; wherein such corners 599 are located along top edge 589. In some embodiments, such corners, as corners 599, may have a radius of substantially 3/16 of an inch. In some embodiments, crenulation paths on the top of perimeter-walls 111 along top edges 113 may also comprise such corners similar to corners 599 and with similar radius dimensions.

In some embodiments, a given photo-holder 581 may comprise an access-slot 588 only, a plurality of access-holes 587 only, or both an access-slot 588 and a plurality of access-holes 587. In some embodiments, a given vertical-organizer, may comprise from one to four photo-holders 581. In some embodiments, the given vertical-organizer, with the one to four photo-holders 581, may have only access-slots 588 on the photo-holders 581, or only plurality of access-holes 587 on the photo-holders 581, or some photo-holders 581 with only access-slots 588 and other photo-holders 581 with only access-holes 587.

In some embodiments, photo-holder 581 may be substantially constructed from rigid to semi-rigid materials of construction. In some embodiments, photo-holder 581 may be substantially constructed from one or more thermoplastics or glass. In some embodiments, photo-holder 581 may be substantially constructed from one or more of polyoxymethylene (POM, such as Delrin®, Celcon®, Ramtal®, Duracon®, Hostaform®, and the like), ABS, PVC, polycarbonate, nylon, polystyrene, PP, and polyethylene (PE, including HDPE), and the like. Various fillers and/or colorants may be added to any such thermoformed plastic formulations. For example, and without limiting the scope of the present invention, fillers may provide desirable textures and/or increase structural strength (e.g., by using glass fibers or the like).

In some embodiments, photo-holder 581 may be substantially constructed of substantially transparent materials of construction. In some embodiments, the planar member that may comprise exterior-surface 583 may be substantially constructed of substantially transparent materials of construction.

The FIG. 6 series of figures may comprise FIG. 6A through FIG. 6K. The FIG. 6 series of figures may depict a plurality of panels 611 and a plurality of dividers 609 that may be used to construct vertical-organizers such as vertical-organizer 101, vertical-organizer 401, and/or vertical-organizer 501.

In some embodiments, plurality of panels 611 and plurality of dividers 609, when substantially constructed of one or more plastics, may be one eighth (⅛) inch in thickness as may be customarily measured within the plastics sheeting industry. In some embodiments, plurality of panels 611 and plurality of dividers 609, when substantially constructed of one or more plastics, may be substantially one eighth (⅛) inch in thickness. In some embodiments, plurality of panels 611 and plurality of dividers 609 may be substantially one thirty second (1/32) inch in thickness to substantially one quarter (¼) inch in thickness.

In some embodiments, bottom 105 and the side-walls 107 may all be separate articles of manufacture that may be assembled together to form vertical-organizer 101, vertical-organizer 401, and/or vertical-organizer 501. In such embodiments, side-walls 107 may be the plurality of panels 611 and the plurality of dividers 609. That is, the plurality of dividers 609 may form the radial-walls 109 and the plurality of panels 611 may form perimeter-walls 111. See e.g., the FIG. 6 series of figures. The assembling together of bottom 105 and such sidewalls 107 may be done by one or more of the following: chemical adhesive, solvent bonding, ultrasonic bonding, heat welding, friction fits, snap fits, mechanical fasteners, and/or the like.

In some embodiments, plurality of dividers 609 may comprise one or more of: lowest height divider 609a, next lowest height divider 609b, next highest height divider 609c, and highest height divider 609d.

In some embodiments, plurality of panels 611 may comprise one or more of: lowest height panel 611a, highest height panel 611b, next lowest height panel 611c, next highest height panel 611d, front highest height panel 611e, and back lowest height panel 611f.

Figure 6C:
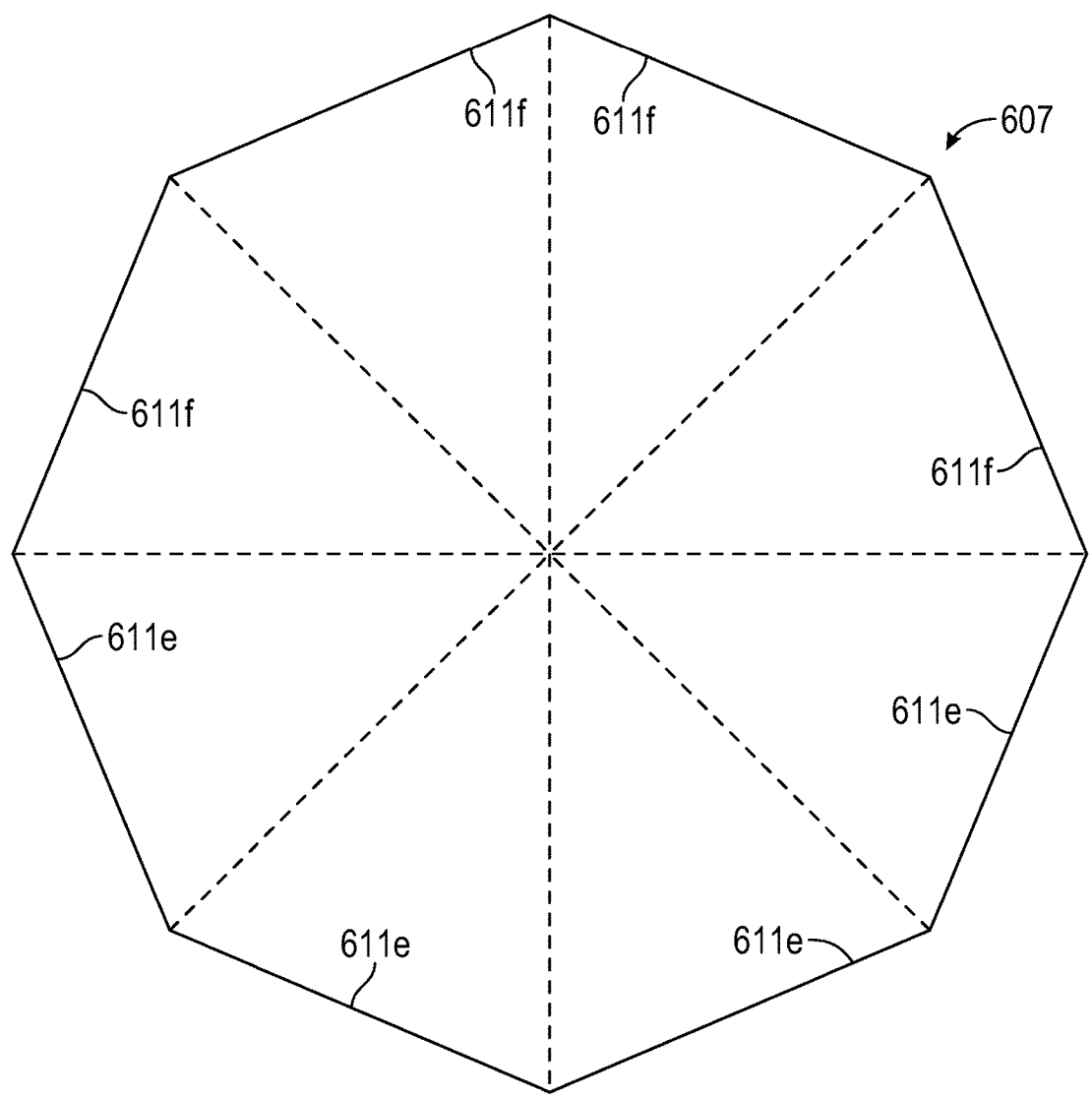
FIG. 6C may depict a top view of how some of the plurality of panels may be used to construct the inner ring of the vertical-organizer shown in FIG. 6B.
Figure 6D:
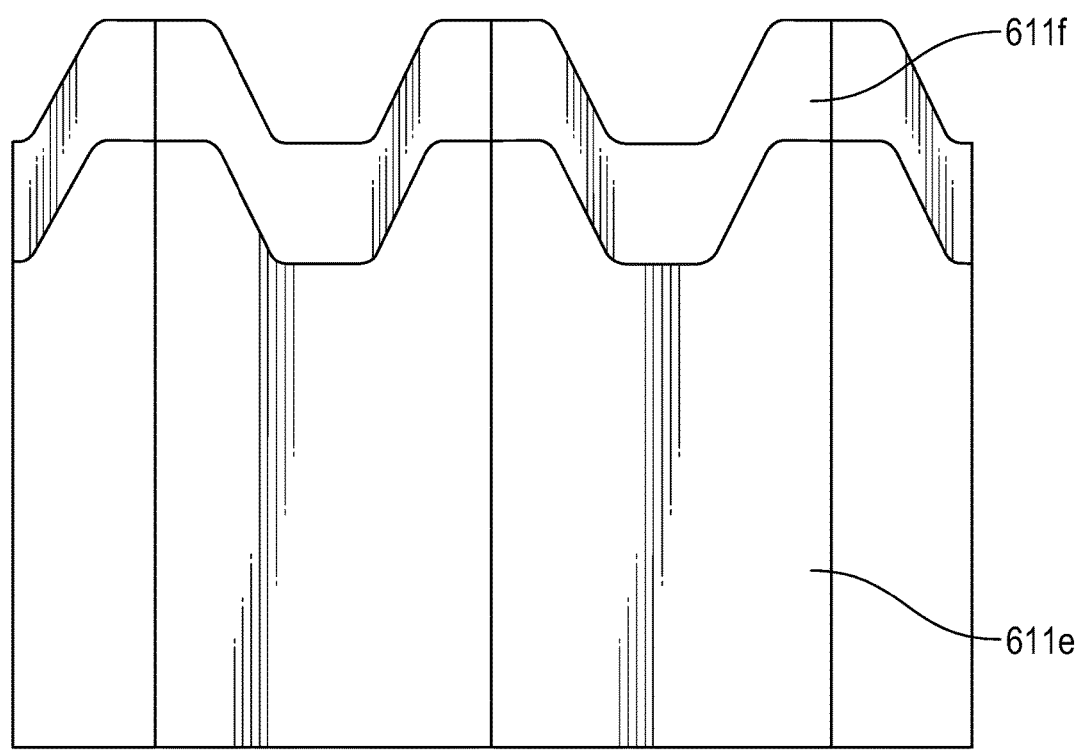
FIG. 6D may depict from a front view how some of the plurality of panels may be used to construct the inner ring of the vertical-organizer shown in FIG. 6C.
Figure 6E:
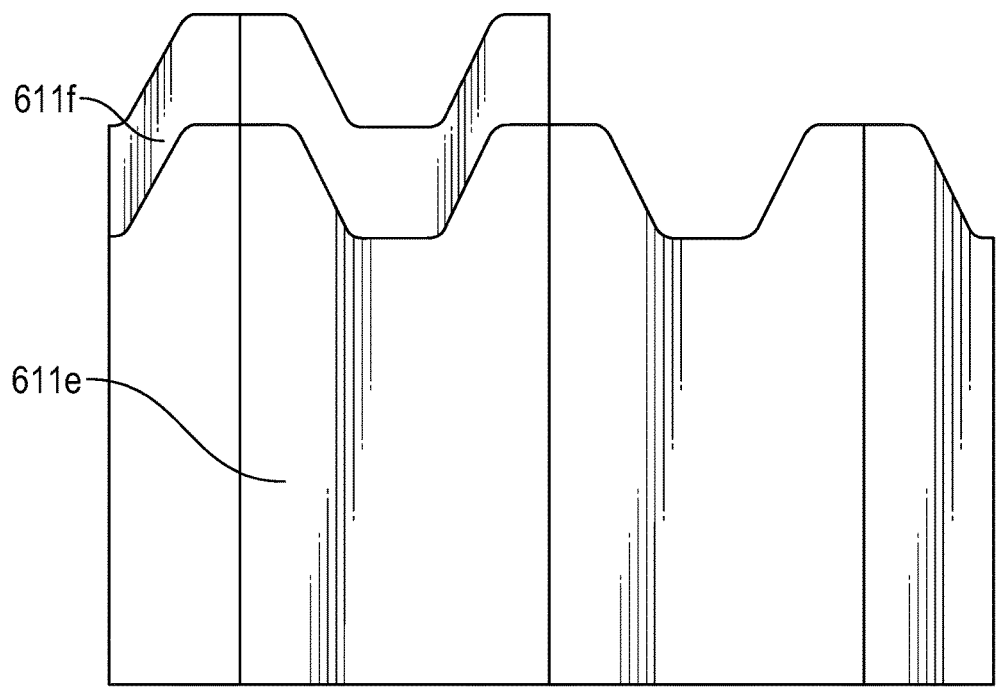
FIG. 6E may depict from a left-side view how some of the plurality of panels may be used to construct the inner ring of the vertical-organizer shown in FIG. 6C.
Figure 6F:
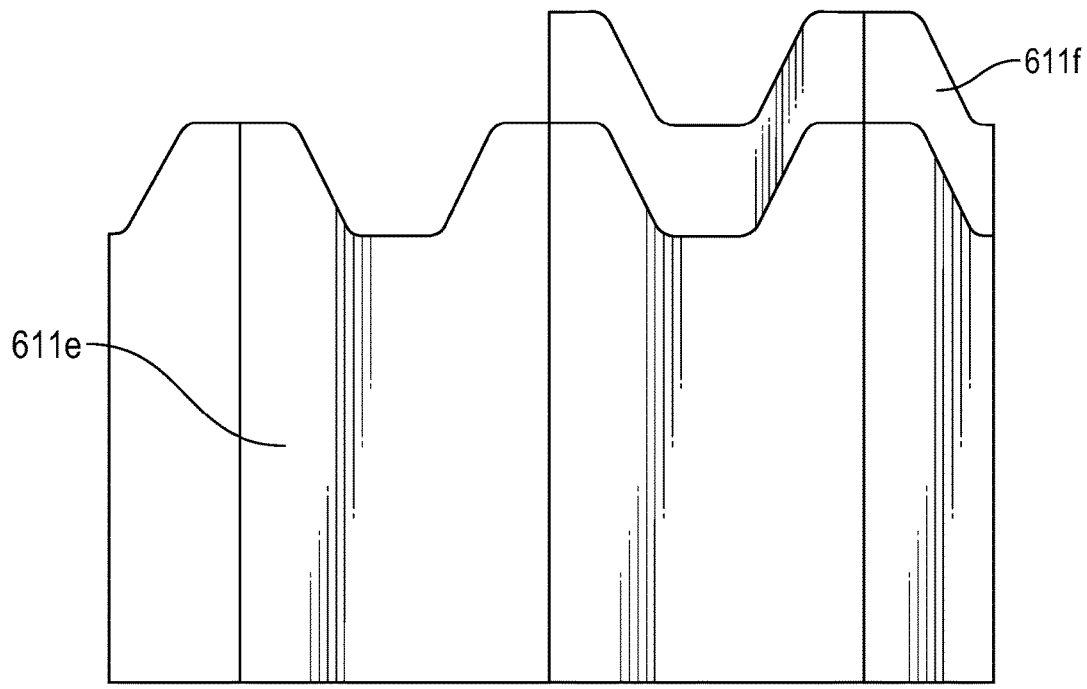
FIG. 6F may depict from a right-side view how some of the plurality of panels may be used to construct the inner ring of the vertical-organizer shown in FIG. 6C.
Figure 6G:
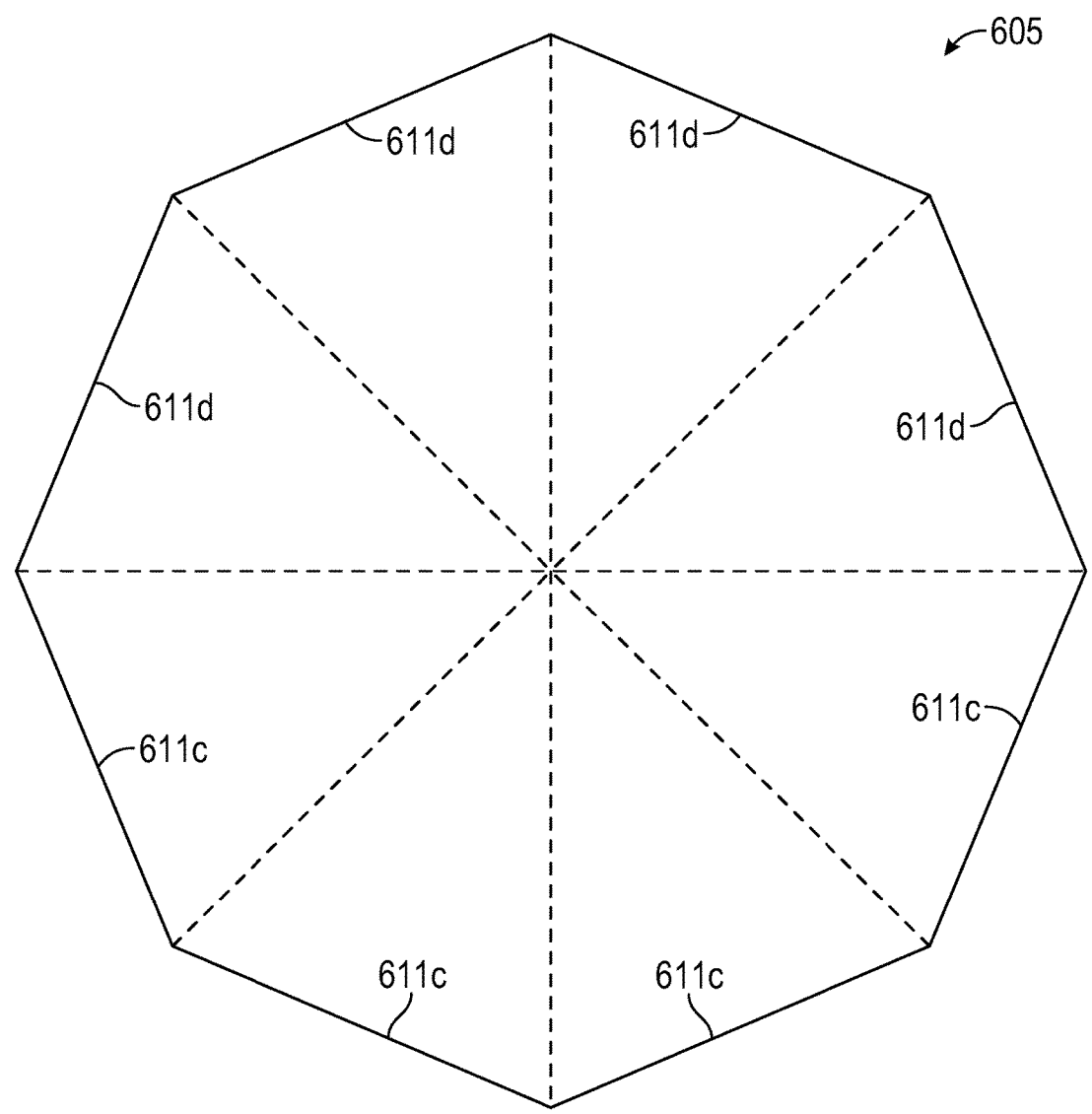
FIG. 6G may depict a top view of how some of the plurality of panels may be used to construct the middle ring of the vertical-organizer shown in FIG. 6B.
Figure 6H:
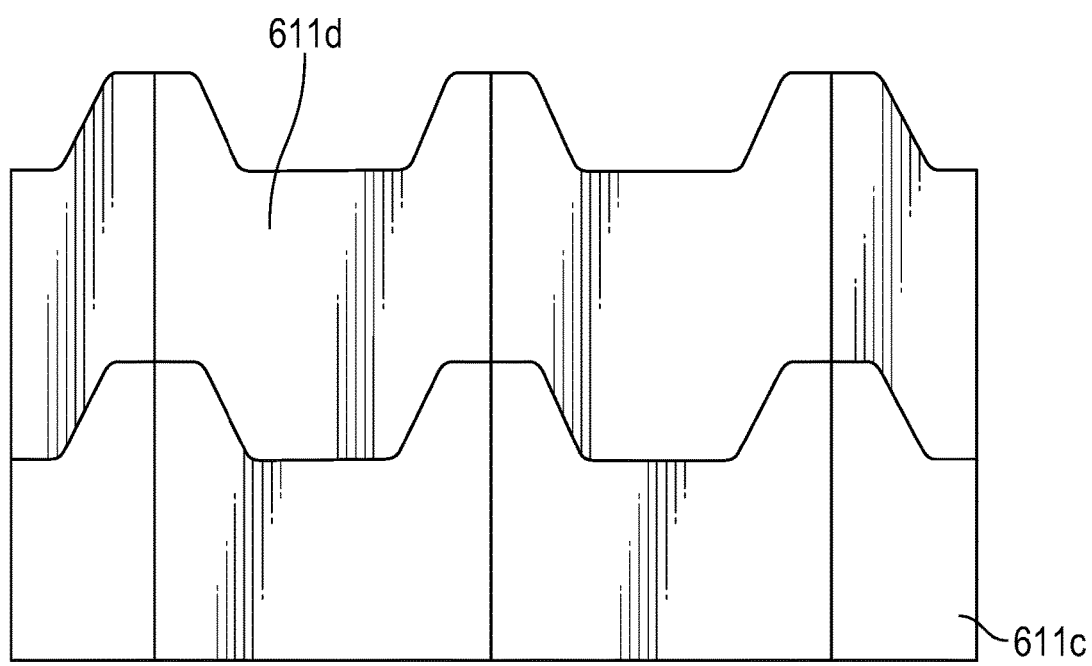
FIG. 6H may depict from a front view how some of the plurality of panels may be used to construct the middle ring of the vertical-organizer shown in FIG. 6G.
Figure 6I:
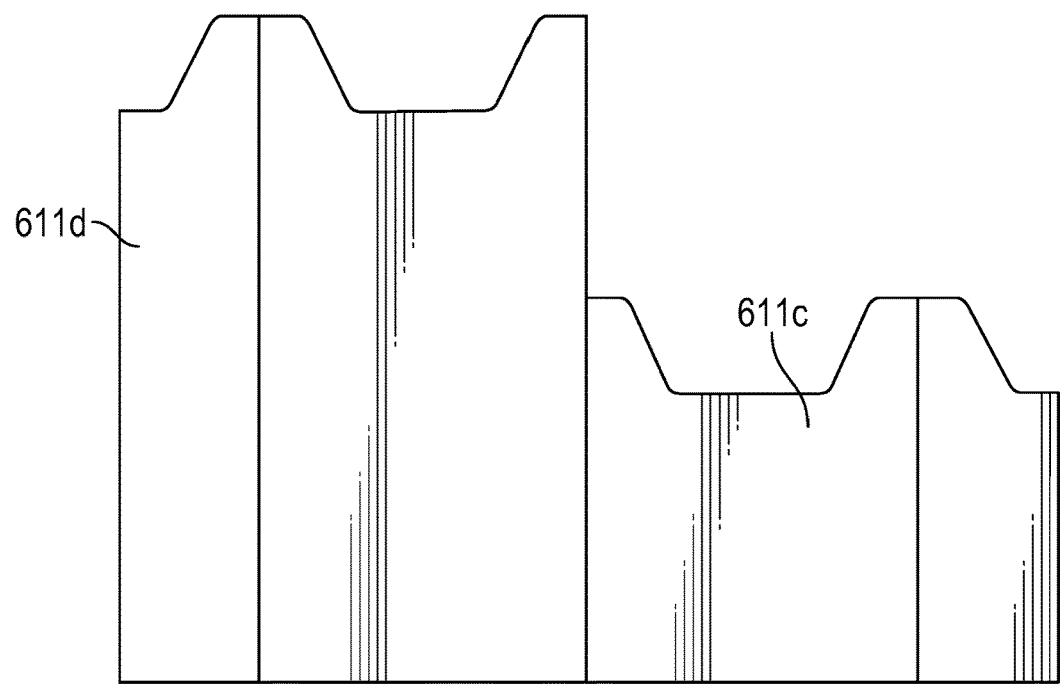
FIG. 6I may depict from a left-side view how some of the plurality of panels may be used to construct the middle ring of the vertical-organizer shown in FIG. 6G.
Figure 6J:
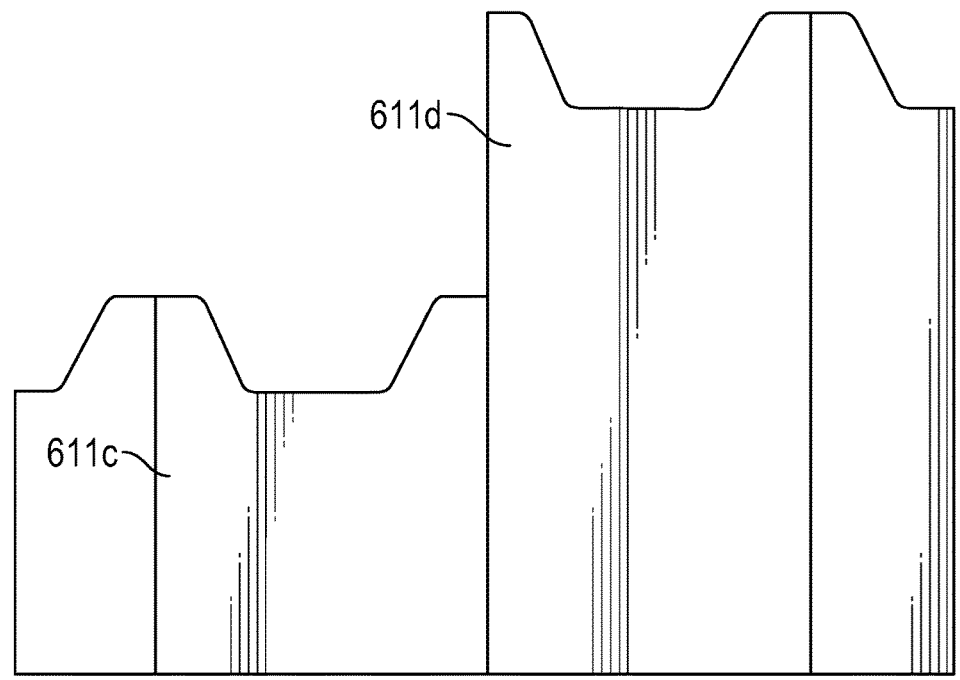
FIG. 6J may depict from a right-side view how some of the plurality of panels may be used to construct the middle ring of the vertical-organizer shown in FIG. 6G.
Figure 6K:
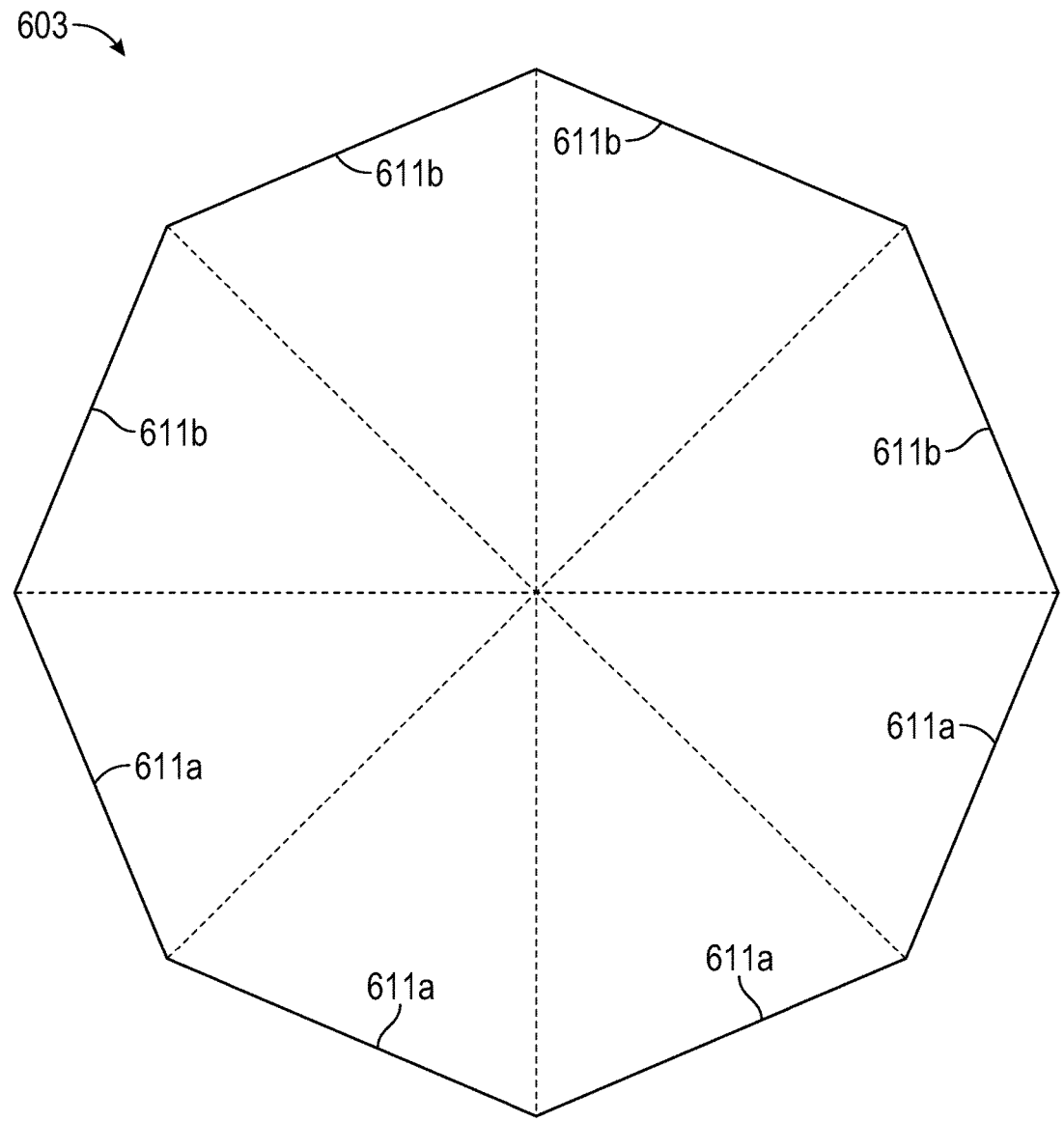
FIG. 6K may depict a top view of how some of the plurality of panels may be used to construct the outer ring of the vertical-organizer shown in FIG. 6B.

FIG. 6A may depict plurality of panels 611 and plurality of dividers 609, wherein this plurality of panels 611 and plurality of dividers 609 may be used to construct a vertical-organizer, such as vertical-organizer 101, vertical-organizer 401, and/or vertical-organizer 501. FIG. 6B may depict a top view showing how plurality of panels 611 and plurality of dividers 609 from FIG. 6A may be used to construct the vertical-organizer, such an octagon vertical-organizer. This vertical-organizer shown in FIG. 6B may comprise an inner ring 607, a middle ring 605, and an outer ring 603. FIG. 6C may depict a top view of how some of the plurality of panels 611 (611e and 611f) may be used to construct inner ring 607 of the vertical-organizer shown in FIG. 6B. FIG. 6D may depict from a front view of how some of the plurality of panels 611 (611e and 611f) may be used to construct inner ring 607 of the vertical-organizer shown in FIG. 6C. FIG. 6E may depict from a left-side view of how some of the plurality of panels 611 (611e and 611f) may be used to construct inner ring 607 of the vertical-organizer shown in FIG. 6C. FIG. 6F may depict from a right-side view of how some of the plurality of panels 611 (611e and 611f) may be used to construct inner ring 607 of the vertical-organizer shown in FIG. 6C. FIG. 6G may depict a top view of how some of the plurality of panels 611 (611c and 611d) may be used to construct middle ring 605 of the vertical-organizer shown in FIG. 6B. FIG. 6H may depict from a front view of how some of the plurality of panels 611 (611c and 611d) may be used to construct middle ring 605 of the vertical-organizer shown in FIG. 6G. FIG. 6I may depict from a left-side view of how some of the plurality of panels 611 (611c and 611d) may be used to construct middle ring 605 of the vertical-organizer shown in FIG. 6G. FIG. 6J may depict from a right-side view of how some of the plurality of panels 611 (611c and 611d) may be used to construct middle ring 605 of the vertical-organizer shown in FIG. 6G. FIG. 6K may depict a top view of how some of the plurality of panels 611 (611a and 611b) may be used to construct outer ring 603 of the vertical-organizer shown in FIG. 6B.

In some embodiments, the vertical-organizer (e.g., vertical-organizer 101, vertical-organizer 401, and/or vertical-organizer 501) may comprise a plurality of receptacles 103. In some embodiments, plurality of receptacles 103 may be formed from plurality of panels 611 and from plurality of dividers 609. In some embodiments, each receptacle 103 selected from plurality of receptacles 103 may be formed from at least one panel 611 selected from plurality of panels 611 and from at least one divider 609 selected from plurality of dividers 609. In some embodiments, each divider 609 selected from plurality of dividers 609 may radiate from common center 133 directly outwards away from common center 133 as viewed from the top. In some embodiments, plurality of panels 611 may be arranged into three concentric rings as viewed from the top about the common center 133. See e.g., FIG. 6B. In some embodiments, each receptacle 103 selected from plurality of receptacles 103 may be sized to removably store the one or more articles.

In some embodiments, each divider 609 selected from the plurality of dividers 609 and each panel 611 selected from the plurality of panels 611 may be a separate article of manufacture that may be attached to each other to form the plurality of receptacles 103.

In some embodiments, the three concentric rings may comprise outer ring 603, middle ring 605, and inner ring 607. In some embodiments, middle ring 605 may be disposed between outer ring 603 and inner ring 607. In some embodiments, outer ring 603 may have the largest diameter of the three concentric rings. In some embodiments, a diameter of outer ring 603 may be substantially twelve inches. In some embodiments, middle ring 605 may have a diameter less than the diameter of outer ring 603, but more than a diameter of inner ring 607. In some embodiments, the diameter of middle ring 605 may be substantially ten inches. In some embodiments, the diameter of inner ring 607 may be the smallest diameter of the three concentric rings. In some embodiments, the diameter of inner ring 607 may be substantially eight inches. In other embodiments, the three concentric rings may comprise other diameter dimensions, but always less than a length, a width, or a diameter of a reference desk or reference table top, which the organizer may be placed on top of.

In some embodiments, each of the three concentric rings may share a common shape, but of different dimensions. In some embodiments, this common shape may be one of the following: an octagon, a polygon, a regular polygon, an irregular polygon, a circle, an ellipse, or the like. In some exemplary embodiments, this common shape may be one of the following: an octagon, hexagon, a circle, or an ellipse. See e.g., FIG. 6B wherein this common shape may be an octagon. (See e.g., FIG. 7A wherein this common shape may be a circle.)

In some embodiments, outer ring 603 may be comprised of eight panels 611 selected from plurality of panels 611. In some embodiments, each of these eight panels 611 may be arranged end to end forming outer ring 603. In some embodiments, these eight panels 611 may comprise four lowest height panels 611a and four highest height panels 611b. The four lowest height panels 611a may be grouped together, and the four highest height panels 611b may be grouped together, and then each group may be joined to form outer ring 603. Two of the four lowest height panels 611a may only touch lowest height panels 611a. Two of the four highest height panels 611b may only touch highest height panels 611b. In some embodiments, the four lowest height panels 611a may be substantially three inches high at a highest point (e.g., top edge 113 of crenulation 115). In some embodiments, the four highest height panels 611b may be substantially eight inches high at a highest point (e.g., top edge 113 of crenulation 115). See e.g., FIG. 6B and FIG. 6K.

In some embodiments, middle ring 605 may be comprised of eight panels 611 selected from plurality of panels 611. In some embodiments, each of these eight panels 611 may be arranged end to end forming middle ring 605. In some embodiments, these eight panels 611 may comprise four next lowest height panels 611c and four next highest height panels 611d. Two of the four next lowest height panels 611c may only touch next lowest height panels 611c. Two of the four next highest height panels 611d may only touch next highest height panels 611d. In some embodiments, the four next lowest height panels 611c may be substantially four inches high at a highest point (e.g., top edge 113 of crenulation 115). In some embodiments, the four next highest height panels 611d may be substantially seven inches high at a highest point (e.g., top edge 113 of crenulation 115). See e.g., FIG. 6B and FIG. 6G. See also, FIG. 6H, FIG. 6I, and FIG. 6J for front and side views of middle ring 605.

In some embodiments, inner ring 607 may be comprised of eight panels 611 selected from plurality of panels 611. In some embodiments, each of the eight panels 611 may be arranged end to end forming inner ring 607. In some embodiments, wherein the eight panels 611 may comprise four front highest height panels 611e and four back lowest height panels 611f. Two of the four front highest height panels 611e may only touch front highest height panels 611e. Two of the four back lowest height panels 611f may only touch back lowest height panels 611f. In some embodiments, the four front highest height panels 611e may be substantially five inches high at a highest point (e.g., top edge 113 of crenulation 115). In some embodiments, the four back lowest height panels 611f may be substantially six inches high at a highest point (e.g., top edge 113 of crenulation 115). See e.g., FIG. 6B and FIG. 6C. See also, FIG. 6D, FIG. 6E, and FIG. 6F for front and side views of inner ring 607.

In some embodiments, disposed within the inner ring 607 may be four dividers 609, selected from the plurality of dividers 609. These four dividers 609 may be arranged with each of the four dividers 609 running from common center 133 directly to inner ring 607, such that the four dividers 609 and inner ring 607 may form four center receptacles 119. In some embodiments, each center receptacle 119 selected from the four center receptacles 119 may be bound by two different dividers 609 and a non-overlapping portion of the inner ring 609. See e.g., FIG. 6B. In some embodiments, these four dividers 609 may be four of front highest panels

611e. That is, in some embodiments a quantity of four of front highest panels 611e may serve as the four center dividers in the given vertical-organizer. See e.g., FIG. 6B.

In some embodiments, disposed between a front half of the outer ring 603 and a front half of the middle ring 605 may be four front lowest receptacles. See e.g., FIG. 6B. In some embodiments, these four front lowest receptacles may be selected from plurality of trapezoid shaped receptacles 123. In some embodiments, these four front lowest receptacles may comprise two middle front lowest receptacles and on each side of the two middle front lowest receptacles may be a flanking front lowest receptacle. In some embodiments, each of the four front lowest receptacles may be arranged end to end. In some embodiments, the two middle front lowest receptacles may be formed by three lowest height dividers 609a selected from plurality of dividers 609. In some embodiments, one of those three lowest height dividers 609a may be shared between the two middle front lowest receptacles. In some embodiments, these three lowest height dividers 609a may run directly from outer ring 603 to middle ring 605. In some embodiments, each of two remaining flanking front lowest receptacles may be formed from a different one of the three lowest height dividers 609a in common with a different one of the two middle front lowest receptacles and each with one different highest height divider 609d selected from plurality of dividers 609. See e.g., FIG. 6B.

In some embodiments, the lowest height panels 611a that may form a portion (e.g., a front portion) of the four front lowest receptacles, i.e., the two middle front lowest receptacles and the two flanking front lowest receptacles, may have substantially similar structure and geometry. See e.g., FIG. 6B and FIG. 6A.

In some embodiments, the lowest height dividers 609a may have a maximum height of substantially a same height as the next lowest height panel 611c (e.g., substantially four inches). In some embodiments, the highest height dividers 609d may have a maximum height of substantially a same height as the highest height panel 611b (e.g., substantially eight inches). See e.g., FIG. 6A.

In some embodiments, disposed between a front half of the middle ring 605 and a front half of the inner ring 607 may be four front next lowest receptacles. See e.g., FIG. 6B. In some embodiments, these four front next lowest receptacles may be selected from plurality of trapezoid shaped receptacles 123. In some embodiments, these four front next lowest receptacles may comprise two middle front next lowest receptacles and on each side of the two middle front next lowest receptacles may be a flanking front next lowest receptacle. In some embodiments, each of the four next lowest receptacles may be arranged end to end. In some embodiments, the two middle front next lowest receptacles may be formed by three next lowest height dividers 609b selected from the plurality of dividers 609. In some embodiments, one of those three next lowest height dividers 609b may be shared between the two middle front next lowest receptacles. In some embodiments, these three next lowest height dividers 609b may run directly from middle ring 605 to inner ring 607. In some embodiments, each of two remaining flanking front next lowest receptacles may be formed from a different one of the three next lowest height dividers 609b in common with a different one of the two middle front next lowest receptacles and each with one different next highest height divider 609c selected from the plurality of dividers 609c. See e.g., FIG. 6B.

In some embodiments, the next lowest height panels 611c that may form portions (e.g., front portions) of each of the four front next lowest receptacles, i.e., the two middle front next lowest receptacles and the two flanking front next lowest receptacles, may have substantially similar structure and geometry. See e.g., FIG. 6B and FIG. 6A.

In some embodiments, the next lowest height dividers 609b may have a maximum height of substantially a same height as the front highest panel 611e (e.g., substantially five inches). In some embodiments, the next highest height dividers 609c may have a maximum height of substantially a same height as the next highest height panel 611d (e.g., substantially seven inches). See e.g., FIG. 6A.

In some embodiments, disposed between a back half of outer ring 603 and a back half of middle ring 605 may be two back highest receptacles. See e.g., FIG. 6B. In some embodiments, these two back highest receptacles may be selected from plurality of irregular shaped polygon receptacles 125. In some embodiments, these two back highest receptacles may be arranged end to end. In some embodiments, these two back highest receptacles may be formed from three highest height dividers 609d selected from the plurality of dividers 609, a common highest height divider 609d that may be shared between the two back highest receptacles and by two different flanking highest height dividers 609d. In some embodiments, each of these two different flanking highest height dividers 609d may be disposed opposite of each other. See FIG. 6B. In some embodiments, these three highest height dividers 609d may run directly from outer ring 603 to middle ring 605. In some embodiments, the highest height dividers 609d may have a maximum height of substantially a same height as the highest height panel 611b (e.g., substantially eight inches). See e.g., FIG. 6B.

In some embodiments each of the highest height panels 611b that may form part of two back highest receptacles, may have substantially similar structure and geometry. See e.g., FIG. 6A. In some embodiments each of the highest height dividers 609d that may form part of two back highest receptacles, may have substantially similar structure and geometry. See e.g., FIG. 6A. In some embodiments, the highest height dividers 609d may have a maximum height of substantially a same height as the highest height panel 611b (e.g., substantially eight inches).

In some embodiments, disposed between the back half of middle ring 605 and a back half of inner ring 607 may be two back next highest receptacles. See e.g., FIG. 6B. In some embodiments, these two back next highest receptacles may be selected from plurality of irregular shaped polygon receptacles 125. In some embodiments, these two back next highest receptacles may be arranged end to end. In some embodiments, the two back next highest receptacles may be formed from three next highest height dividers 609c selected from the plurality of dividers 609, a common next highest height divider 609c that may be shared between the two back next highest receptacles and by two different flanking next highest height dividers 609c. In some embodiments, each of these two different flanking next highest height dividers 609c may be disposed opposite of each other. In some embodiments, these three next highest height dividers 609c may run directly from middle ring 605 to inner ring 607. See e.g., FIG. 6B. In some embodiments, these next highest height dividers 609c may have a maximum height of substantially a same height as the next highest height panel 611d (e.g., substantially seven inches). See e.g., FIG. 6A.

In some embodiments each of the next highest height panels 611d that may form part of two back next highest receptacles, may have substantially similar structure and geometry. See e.g., FIG. 6A. In some embodiments each of the next highest height dividers 609c that may form part of two back next highest receptacles, may have substantially similar structure and geometry. See e.g., FIG. 6A.

The FIG. 7 series of figures may comprise FIG. 7A through FIG. 7E. The FIG. 7 series of figures may depict a plurality of curved panels 711 and a plurality of dividers 709 that may be used to construct curved vertical-organizers such as curved vertical-organizer 201. The FIG. 7 figures may be similar to the FIG. 6 figures, except in the FIG. 7 figures, plurality of curved panel 711 may be curved and not straight. And in the FIG. 7 figures, the crenulations path (pattern) may be sinuous crenulation path 216 versus the more angular crenulation path seen in vertical-organizer 101, 401, and 501.

In some embodiments, plurality of curved panels 711 and plurality of dividers 709, when substantially constructed of one or more plastics, may be one eighth (⅛) inch in thickness as may be customarily measured within the plastics sheeting industry. In some embodiments, plurality of curved panels 711 and plurality of dividers 709, when substantially constructed of one or more plastics, may be substantially one eighth (⅛) inch in thickness. In some embodiments, plurality of curved panels 711 and plurality of dividers 709 may be substantially one thirty second (1/32) inch in thickness to substantially one quarter (¼) inch in thickness.

In some embodiments, bottom 105 and the side-walls 107 may all be separate articles of manufacture that may be assembled together to form curved vertical-organizer 201 from the plurality of dividers 709 and from the plurality of curved panels 711 shown in the FIG. 7 series of figures. In such embodiments, side-walls 107 may be plurality of curved panels 711 and plurality of dividers 709. See e.g., the FIG. 7 series of figures. The assembling together of bottom 105 and of such side-walls 107 (e.g., plurality of curved panels 711 and plurality of dividers 709) may be done by one or more of the following: chemical adhesive, solvent bonding, ultrasonic bonding, heat welding, friction fits, snap fits, mechanical fasteners, and/or the like.

Figure 7B:
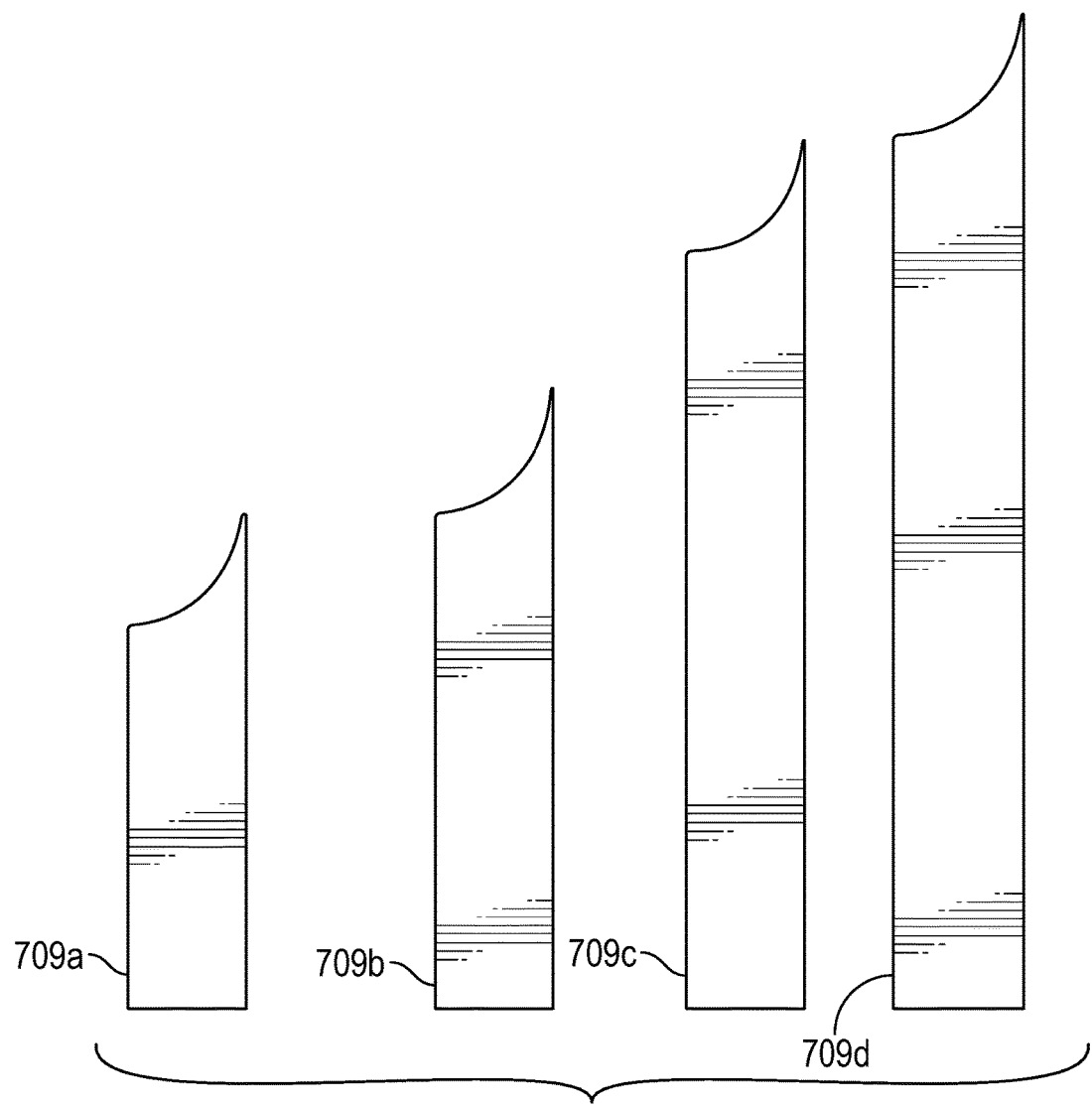
FIG. 7B may depict types of the plurality of dividers, not assembled, that may be used in construction of the curved vertical-organizer with curved panels shown in FIG. 7A.
Figure 7C:
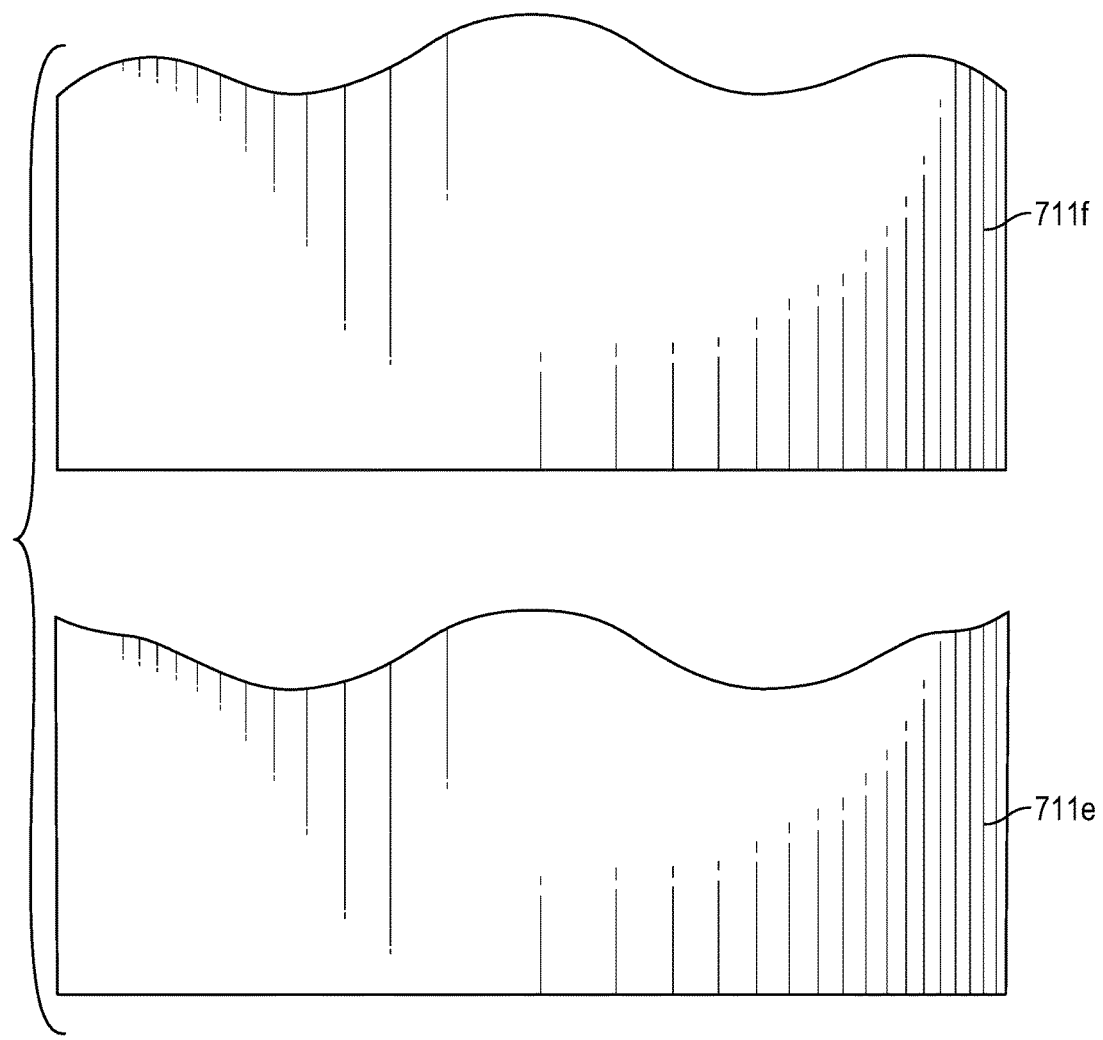
FIG. 7C may depict types of the plurality of curved panels, not assembled, used to construct the curved inner ring of the curved vertical-organizer with curved panels shown in FIG. 7A.
Figure 7D:
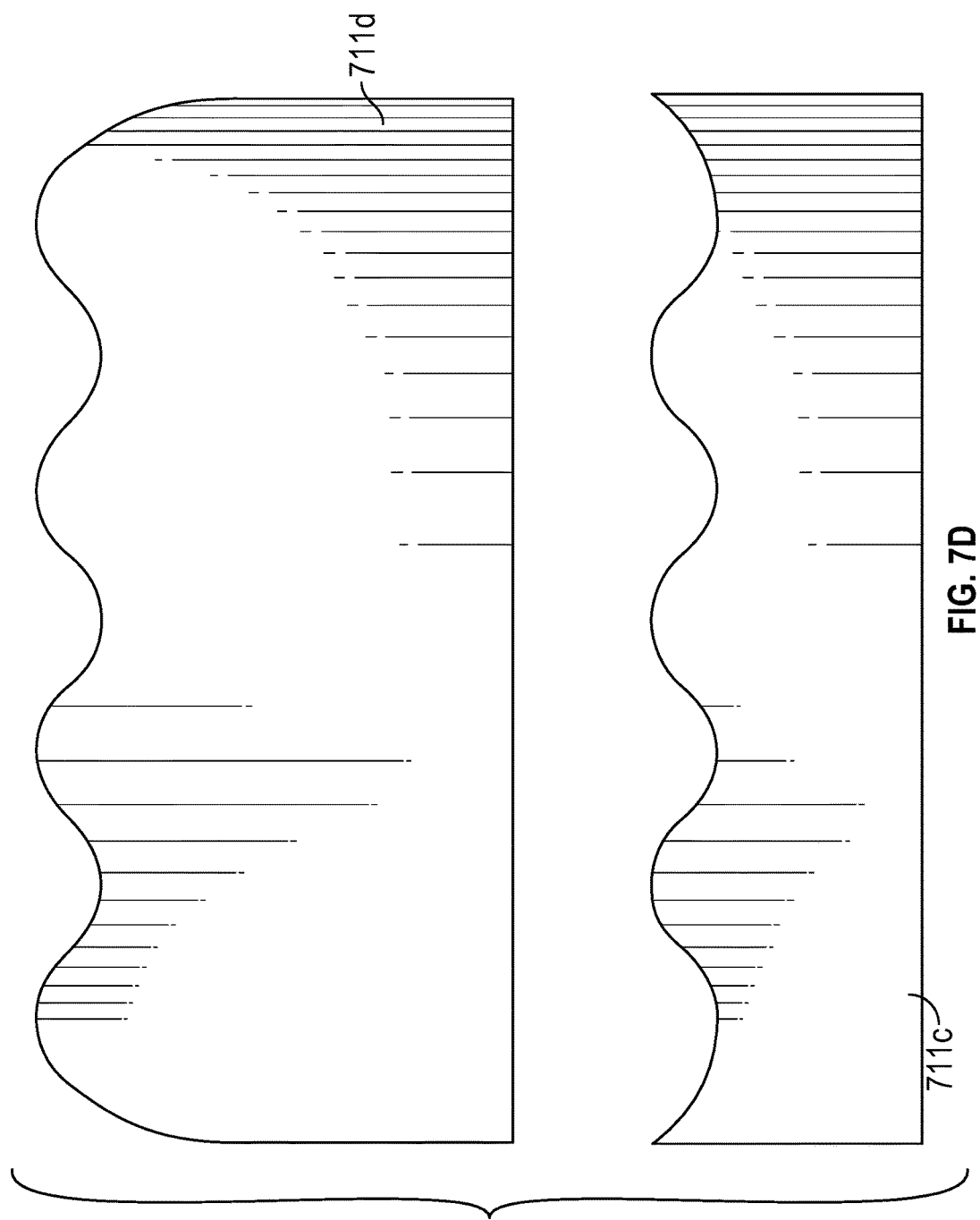
FIG. 7D may depict types of the plurality of curved panels, not assembled, used to construct the curved middle ring of the curved vertical-organizer with curved panels shown in FIG. 7A.
Figure 7E:
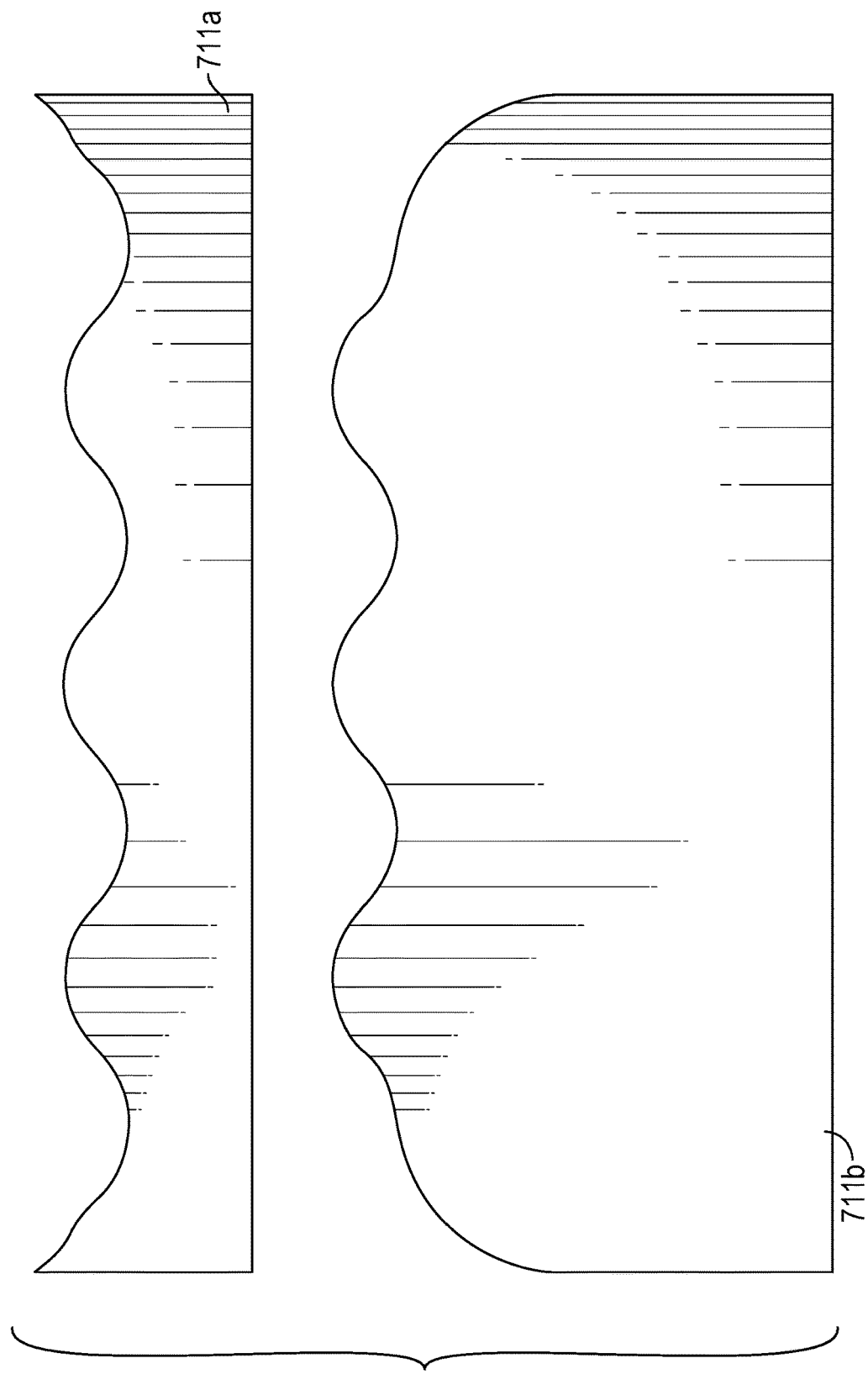
FIG. 7E may depict types of the plurality of curved panels, not assembled, used to construct the curved outer ring of the curved vertical-organizer with curved panels shown in FIG. 7A.

FIG. 7A may depict a top view showing how a plurality of curved panels 711 and a plurality of dividers 709 may be used to construct curved vertical-organizer 201 with curved panels 711. In some embodiments, this curved vertical-organizer with curved panels may comprise a curved inner ring, a curved middle ring, and a curved outer ring. See FIG. 7A. FIG. 7B may depict types of the plurality of dividers 709, not assembled, that may be used in construction of the curved vertical-organizer with curved panels 711 shown in FIG. 7A. FIG. 7C may depict types of the plurality of curved panels 711 (711e and 711f), not assembled, used to construct the curved inner ring of the curved vertical-organizer with curved panels 711 shown in FIG. 7A. FIG. 7D may depict types of the plurality of curved panels 711 (711c and 711d), not assembled, used to construct the curved middle ring of the curved vertical-organizer with curved panels shown in FIG. 7A. FIG. 7E may depict types of the plurality of curved panels 711 (711a and 711b), not assembled, used to construct the curved outer ring of the curved vertical-organizer with curved panels shown in FIG. 7A.

In some embodiments, plurality of dividers 709 may comprise one or more of: lowest height divider 709a, next lowest height divider 709b, next highest height divider 709c, and highest height divider 709d.

In some embodiments, plurality of curved panels 711 may comprise one or more of: lowest height panel 711a, highest height panel 711b, next lowest height panel 711c, next highest height panel 711d, front highest height panel 711e, and back lowest height panel 711f. In some embodiments, all such curved panels 711 may be curved when viewed from the top direction.

In some embodiments of curved vertical-organizer 201, each curved panel 711 may be curved as viewed from the top direction. See e.g., FIG. 7A. In some embodiments, each curved panel 711 may be curved in a sinuous fashion as viewed from the top direction. See e.g., FIG. 7A.

In the case of curved vertical-organizers, such as curved vertical-organizer 201 or the curved vertical-organizer shown in FIG. 7A, this center receptacle 119 shape may be a pie wedge shape (or a pizza slice shape); see e.g., FIG. 2 and FIG. 7A.

Figure 8:
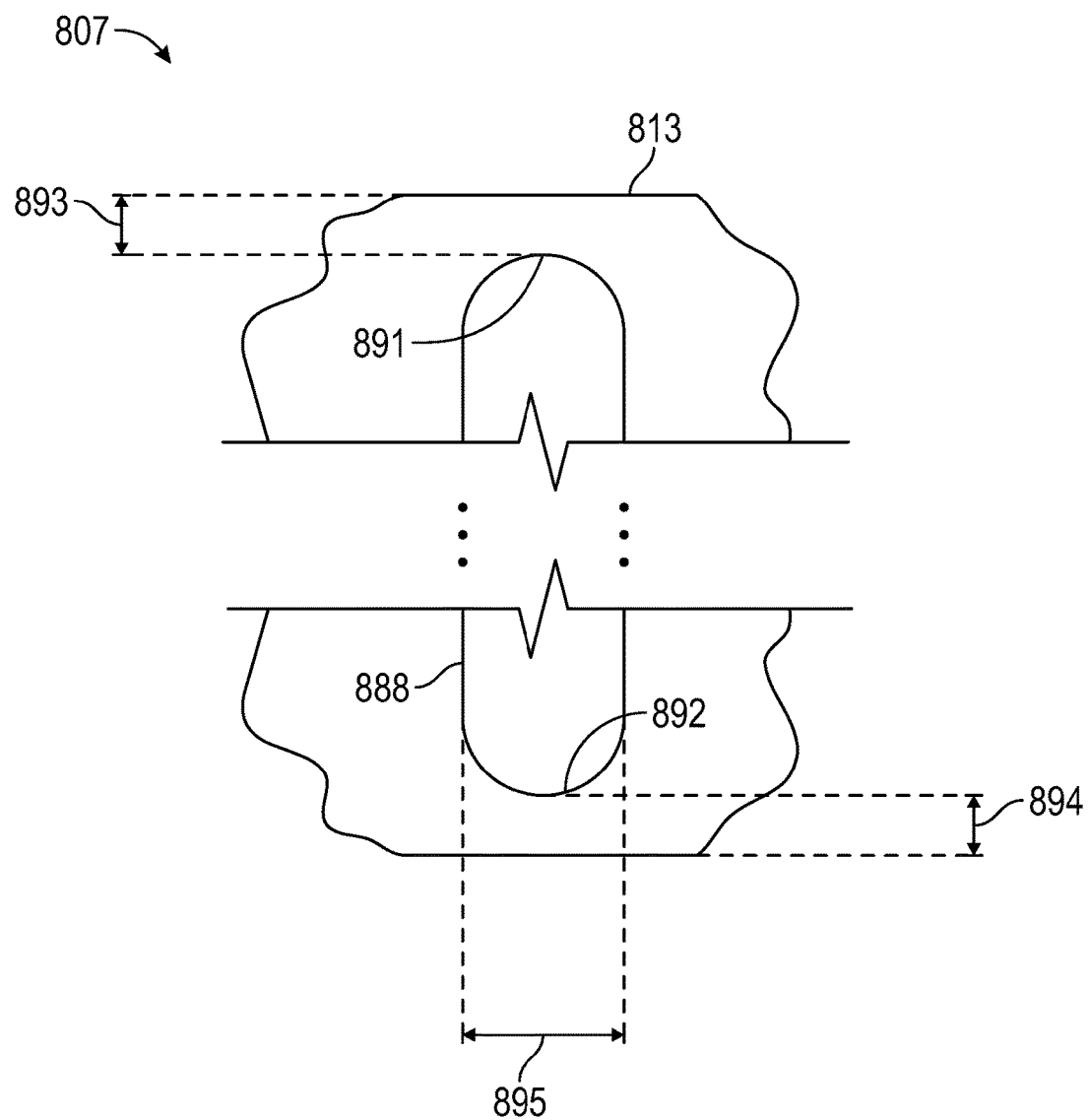
FIG. 8 may a depict portions of a wall (e.g., a panel) of a vertical-organizer, from a front view of the given wall, wherein this wall may comprise a slot.

FIG. 8 may a depict portions of a wall 807 (e.g., a panel) of a vertical-organizer, from a front view of the given wall 807. In some embodiments, any wall (e.g., side-walls 107, radial-walls 109, and/or perimeter-walls 111), any divider (e.g., plurality of dividers 609 and/or plurality of dividers 709), and/or any panel (e.g., plurality of panels 611 and/or plurality of curved panels 711) disclosed herein may be replaced with wall 807. Depending upon the wall, divider, and/or panel being replaced with wall 807, the length (i.e., height) of 807 is different, corresponding to the length (i.e., the height) of the wall, diver, and/or panel being replaced. In some embodiments, wall 807 may be crenulated, similar to how crenulations of other walls and/or panels have been shown and disclosed. In some embodiments, this wall 807 may comprise a top edge 813. In some embodiments, top edge 813 may be structurally and functionally substantially similar to top edges 113. In some embodiments, this wall 807 may comprise an access-slot 888. In some embodiments, this access-slot 888 may be a through slot passing entirely through a wall thickness of wall 807. As shown in FIG. 8, this access-slot 888 may be substantially vertical (when then given vertical-organizer is assembled) and substantially elongate. In some embodiments, this access-slot 888 may comprise two opposing terminal ends, top radius 891 and bottom radius 892. In some embodiments, top radius 891 may be a radius of substantially ⅜ of an inch. In some embodiments, bottom radius 892 may be a radius of substantially ⅜ of an inch. In some embodiments, top radius 891 may be separated from top edge 813 by a proximate distance denoted as top separation gap 893. For example, and without limiting the scope of the present invention, in some embodiments, top separation gap 893 may be substantially 0.25 inch. In other embodiments, top separation gap 893 may be other distances. In some embodiments, bottom radius 892 may be separated from a bottom of wall 807 by a proximate distance denoted as bottom separation gap 894. For example, and without limiting the scope of the present invention, in some embodiments, bottom separation gap 894 may be substantially 0.25 inch. In other embodiments, bottom separation gap 894 may be other distances. See e.g., FIG. 8. In some embodiments, this access-slot 888 may be sized such that its access-slot width 895 is wide enough to accommodate entry of a user's fingertip passing into and through access-slot 888. For example, and without limiting the scope of the present invention, in some embodiments, access-slot width 895 may be substantially 0.75 inch. In other embodiments, access-slot width 895 may be other distances. This access-slot 888 may serve a function to allow the user to use their fingertip to articulate and/or manipulate one or more articles being removably held in a given receptacle 103 that wall 807 helps to form. This access-slot 888 may serve a function to increase visibility to the user of the one or more articles being removably held in a given receptacle 103 that wall 807 helps to form.

For example, and without limiting the scope of the present invention, one or more lowest height panels 611a of a given vertical-organizer may be replaced with wall(s) 807. For example, and without limiting the scope of the present invention, one or more next lowest height panels 611c of a given vertical-organizer may be replaced with wall(s) 807. For example, and without limiting the scope of the present invention, one or more lowest height panel 711a of a given vertical-organizer may be replaced with wall(s) 807. For example, and without limiting the scope of the present invention, one or more next lowest height panel 711c of a given vertical-organizer may be replaced with wall(s) 807. Thus, in some embodiments, wall 807 may be curved in a similar fashion to any of the plurality of curved panels 711. For example, and without limiting the scope of the present invention, a front half of the outer ring (e.g., outer ring 603 or the outer ring depicted in FIG. 7A) of a given vertical-organizer may be replaced using walls 807. For example, and without limiting the scope of the present invention, the lowest height walls (panels) of a given vertical-organizer may be replaced using walls 807. For example, and without limiting the scope of the present invention, the next lowest height walls (panels) of a given vertical-organizer may be replaced using walls 807.

In some embodiments, a given wall 807 may be substantially transparent. In some embodiments, a given wall 807 may be substantially opaque.

Figure 9:
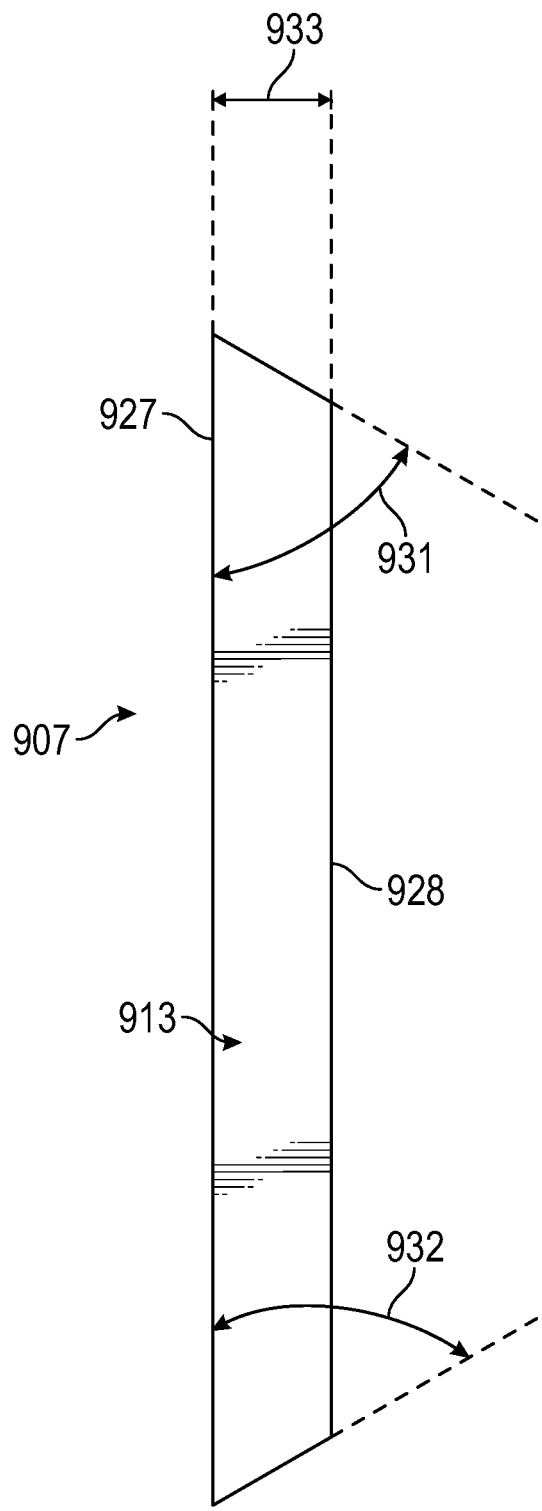
FIG. 9 may depict a wall of a vertical-organizer, shown from a top view.

FIG. 9 may depict a wall 907 of a vertical-organizer, shown from a top view. In some embodiments, top surface detail of any wall (e.g., side-walls 107, radial-walls 109, and/or perimeter-walls 111), any divider (e.g., plurality of dividers 609 and/or plurality of dividers 709), and/or any panel (e.g., plurality of panels 611 and/or plurality of curved panels 711) disclosed herein may be represented by wall 907 as shown in FIG. 9. In some embodiments, this wall 907 may comprise a top edge 913. In some embodiments, top edge 913 may be structurally and functionally substantially similar to top edges 113.

For example, and without limiting the scope of the present invention, the top surface detail of wall 907 may represent the top surface detail of one or more panels 611 selected the plurality of panels 611. For example, and without limiting the scope of the present invention, the top surface detail of wall 907 may represent the top surface detail of one or more perimeter-walls 111.

As shown in FIG. 9, from the top view, wall 907 may be elongate with opposing beveled edges, such that a two dimensional projection of wall 907 from the top view yields an elongate trapezoid. These two opposing beveled edges may comprise first-bevel-angle 931 and second-bevel-angle 932. For example, and without limiting the scope of the present invention, in some embodiments, first-bevel-angle 931 and second-bevel-angle 932 may each be substantially 67.5 degrees. In other embodiments, first-bevel-angle 931 and second-bevel-angle 932 may be other angles. As shown in FIG. 9, from the top view, wall 907 may comprise wall width 933. For example, and without limiting the scope of the present invention, in some embodiments, wall width 933 may be substantially 1/16 of an inch in width. In other embodiments, wall width 933 may be other wall thicknesses. In some embodiments, the two parallel elongate edges of wall 907, as viewed from the top, may be denoted by exterior outside surface 927 and opposing interior surface 928. In some embodiments, interior surface 928 may be facing a center of the given vertical-organizer, such as center 133; whereas, exterior outside surface 927 may be facing away from the center. In some embodiments, exterior outside surface 927 may be structurally and functionally substantially similar to exterior outside surface 127.

Figure 10A:
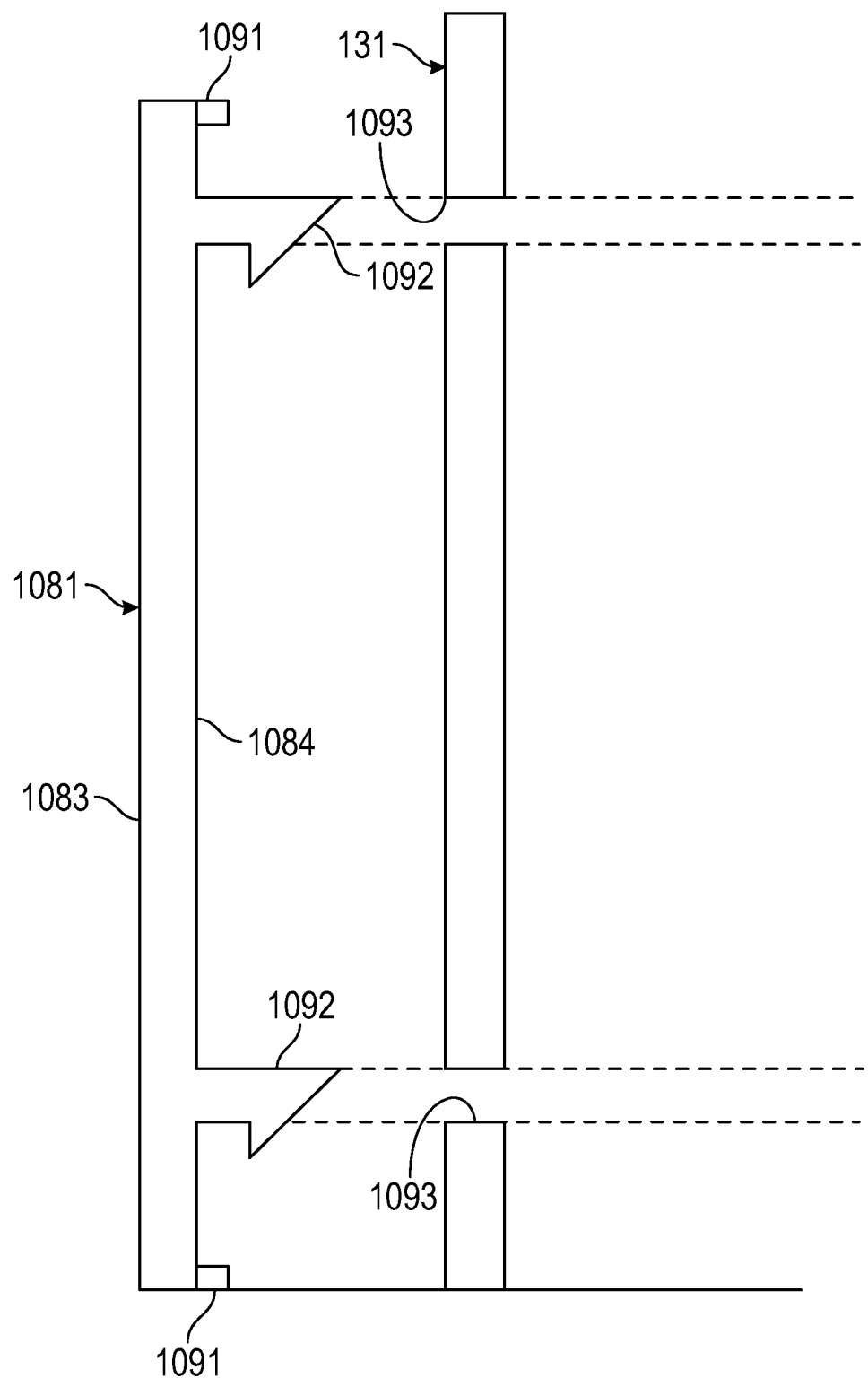
FIG. 10A may depict an embodiment of a photo-holder and how that photo-holder may be attached to an outer back of a vertical-organizer, shown from a side view.
Figure 10B:
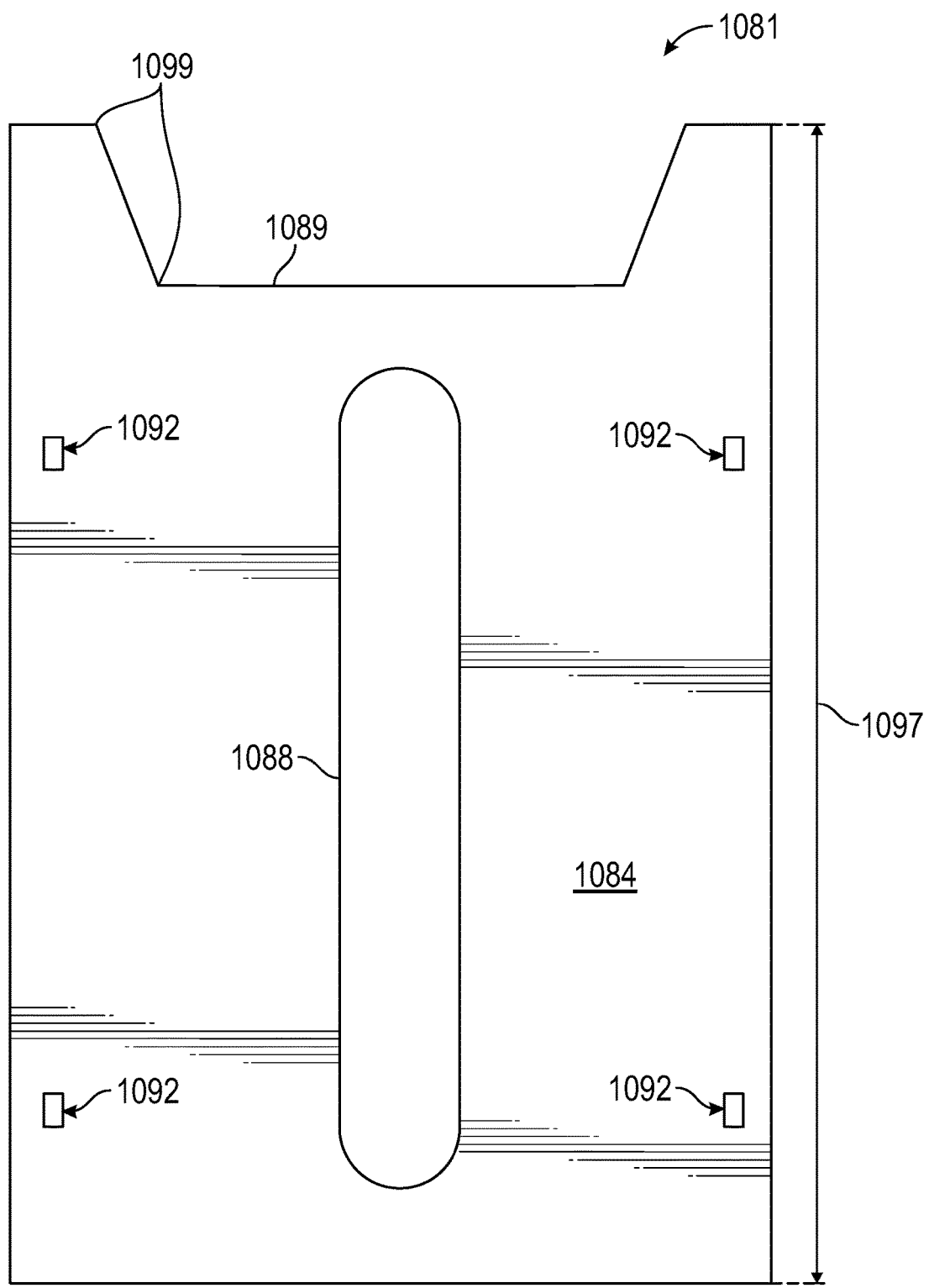
FIG. 10B may depict the photo-holder of FIG. 10A, shown from an inside view where a major surface of the photo-holder would be facing the outer back of the vertical-organizer, when assembled.

A FIG. 10 series of figures may comprise FIG. 10A and FIG. 10B. FIG. 10A may depict an embodiment of a photo-holder 1081 and how that photo-holder 1081 may be attached to a given outer back 131 (e.g., a back exterior wall) of a given vertical-organizer, shown from a side view. FIG. 10B may depict the photo-holder 1081 of FIG. 10A, shown from an inside view where a major surface of the photo-holder 1081 would be facing the outer back 131 of the given vertical-organizer, when assembled. In some embodiments, photo-holder 1081 may be a substantially planar member and may be substantially transparent. The photo-holder 1081 embodiment depicted in the FIG. 10 series of figures may show an attachment means to outer back 131 that varies from the photo-holder 581 embodiment attachment means shown in FIG. 5D, FIG. 5E, and in FIG. 5F.

In the photo-holder 1081 embodiment depicted in the FIG. 10 series of figures, photo-holder 1081, on its interior facing major surface 1084 (which opposes exterior-surface 1083) may be a plurality of protrusions 1092; wherein each such protrusion 1092 may be sized to be received into a complimentary protrusion-receiving-hole 1093 located on the given outer back 131. See e.g., FIG. 10A. Each such protrusion 1092 may extend substantially away from this interior facing major surface 1084 of photo-holder 1081. In some embodiments, each protrusion 1092 may terminate in one or more barbs, wherein such barbs may provide for a locking mechanical fastener fitting to the given protrusion-receiving-hole 1093. See e.g., FIG. 10A. The photo-holder 1081 attachment means may at least be a combination of protrusions 1092 and protrusion-receiving-hole 1093.

In some embodiments, once the protrusions 1092 are attached to the respective protrusion-receiving-hole 1093, that attachment may be intended to be permanent. In some embodiments, that intended permanent attachment may be reinforced by one or more of the following: chemical adhesive, solvent bonding, ultrasonic bonding, heat welding, friction fits, snap fits, mechanical fasteners, and/or the like.

In some embodiments, once the protrusions 1092 are attached to the respective protrusion-receiving-hole 1093, that attachment may be intended to be removable.

Aside from protrusions 1092 and protrusion-receiving-hole 1093, photo-holder 1081 may share structures and functions with photo-holder 581. For example, photo-holder 1081 may comprise: exterior-surface 1083, access-slot 1088, top edge 1089, corners 1099, holder height 1097, and use of spacers 1091. In some embodiments, exterior-surface 1083 may be structurally and functionally substantially similar to exterior-surface 583. In some embodiments, access-slot 1088 may be structurally and functionally substantially similar to access-slot 588. In some embodiments, access-slots 588, 888, and 1088 may all share structural and geometric properties and functional purposes for user fingertip access. In some embodiments, any given access-slot structure (e.g., 588, 888, and/or 1088) may be replaced with a plurality of access-holes, such as access-holes 587. In some embodiments, top edge 1089 may be structurally and functionally substantially similar to top edge 589. In some embodiments, corners 1099 may be structurally and functionally substantially similar to corners 599. In some embodiments, holder height 1097 may be structurally and functionally substantially similar to holder height 597. In some embodiments, spacers 1091 may be structurally and functionally substantially similar to spacers 591.

In some embodiments, the planar member of photo-holder 1081, together with one or more spacers 1091, and outer back 131 may form the sleeve or the cavity that is for removable holding of at least one photograph per sleeve (or per cavity); wherein the one or more spacers 1091 are disposed between and in communication with photo-holder 1081 and outer back 131.

In some embodiments, one or more photo-holders 1081 may be attached to at least one outer back 131 of exterior outside surface 127 of any vertical-organizer disclosed herein, such as vertical-organizer 501, vertical-organizer 101, curved vertical-organizer 201, the vertical-organizer of FIG. 6B, and/or the curved vertical-organizer of FIG. 7A. In some embodiments, photo-holder 1081 may replace photo-holder 581.

In some embodiments, this substantially planar member of photo-holder 1081 may be substantially flat and straight (e.g., when attached to vertical-organizer 501, vertical-organizer 101, or the vertical-organizer of FIG. 6B); whereas, in other embodiments, this substantially planar member of photo-holder 1081 may be substantially flat and curved (e.g., when attached to curved vertical-organizer 201 or the curved vertical-organizer of FIG. 7A).

In some embodiments, a given photo-holder 1081 may comprise an access-slot 1088 only, a plurality of access-holes 587 only, or both an access-slot 1088 and a plurality of access-holes 587. In some embodiments, a given vertical-organizer, may comprise from one to four photo-holders 1081. In some embodiments, the given vertical-organizer, with the one to four photo-holders 1081, may have only access-slots 1088 on the photo-holders 1081, or only plurality of access-holes 587 on the photo-holders 1081, or some photo-holders 1081 with only access-slots 1088 and other photo-holders 1081 with only access-holes 587.

In some embodiments, photo-holder 1081 may be substantially constructed from rigid to semi-rigid materials of construction. In some embodiments, photo-holder 1081 may be substantially constructed from one or more thermoplastics or glass. In some embodiments, photo-holder 1081 may be substantially constructed from one or more of polyoxymethylene (POM, such as Delrin®, Celcon®, Ramtal®, Duracon®, Hostaform®, and the like), ABS, PVC, polycarbonate, nylon, polystyrene, PP, and polyethylene (PE, including HDPE), and the like. Various fillers and/or colorants may be added to any such thermoformed plastic formulations. For example, and without limiting the scope of the present invention, fillers may provide desirable textures and/or increase structural strength (e.g., by using glass fibers or the like).

In some embodiments, photo-holder 1081 may be substantially constructed of substantially transparent materials of construction. In some embodiments, the planar member that may comprise exterior-surface 1083 may be substantially constructed of substantially transparent materials of construction.

Note, unless otherwise noted, as used herein when "substantially" may be used in reference to a given dimension this may be mean within plus or minus one thirty second (1/32 or 0.03125) of an inch. Other uses of "substantially" may denote that any such comparison being made need not be perfect. For example, "substantially parallel" may mean true geometric parallelism need not be bet and that if the two objects were extended could form an angle of one degree or less. For example, "substantially perpendicular" may mean true geometric perpendicular relationship need not be bet and that if the two objects could form an angle of 89 to 91 degrees. Or, for injection molded parts, "substantially parallel" or "substantially perpendicular" need not be true geometric properties because such injection molded parts may need to have some degree of draft in order to be readily released from a given mold cavity.

Note with respect to any materials of construction noted herein, it is not desired nor intended to thereby unnecessarily limit the present invention by reason of such restricted disclosure. That is, other materials of construction may be within the scope of various embodiments of the present invention.

Various embodiments of an organizer, specifically, a desk organizer, has been described. The foregoing description of the various exemplary embodiments of the invention has been presented for the purposes of illustration and disclosure. It is not intended to be exhaustive or to limit the invention to the precise form disclosed. Many modifications and variations are possible in light of the above teaching without departing from the spirit of the invention.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. An organizer for storing one or more articles, wherein the organizer comprises a vertical-organizer;
   wherein the vertical-organizer comprises a plurality of receptacles; wherein each receptacle selected from the plurality of receptacles comprises a bottom, side-walls, and a top oriented opening;
   wherein the side-walls comprise radial-walls and perimeter-walls; wherein each receptacle selected from the plurality of receptacles is bounded on sides by at least two of the radial-walls and by at least one of the perimeter-walls; wherein each radial-wall radiates in an outward direction from a center of the vertical-organizer towards an exterior outside surface of the vertical-organizer; wherein the center of the vertical-organizer is with respect to viewing the vertical-organizer from a top direction;
   wherein the top oriented openings are arranged in a series of progressively higher access heights as disposed from the bottom;
   wherein the series of the progressively higher access heights transition from a lowest height proximate to an outer front of the vertical-organizer progressing to a highest height proximate to an outer back of the vertical-organizer, such that the center is not a highest height region of the vertical-organizer;
   wherein each of the top oriented openings is defined by top edges such that for each receptacle selected from the plurality of receptacles the top edges that are closer to the outer front of the vertical-organizer are substantially shorter with respect to the bottom than the top edges of that given receptacle that are farther away to the outer front of the vertical-organizer, such that when the vertical-organizer is viewed from a front view at least a portion of a rear wall of each receptacle selected from the plurality of receptacles is visible; and
   wherein each receptacle selected from the plurality of receptacles is sized to store the one or more articles.

2. The organizer according to claim 1, wherein the series of the progressively higher access heights comprises five, six, or seven different access heights.

3. The organizer according to claim 1, wherein at least half of the plurality of receptacles have a trapezoid shape as viewed from a top direction.

4. The organizer according to claim 1, wherein the plurality of receptacles comprises one or more center receptacles located closest to the center of the vertical-organizer as viewed from the top direction; wherein the one or more center receptacles have one or more of a kite rhombus shape, a triangle shape, an octagon shape, or a pie wedge shape as viewed from the top direction.

5. The organizer according to claim 4, wherein the plurality of receptacles comprises a plurality of trapezoid shaped receptacles as viewed from the top direction; wherein the plurality of trapezoid shaped receptacles partially circumscribe the one or more center receptacles.

6. The organizer according to claim 5, wherein the plurality of receptacles comprises a plurality of irregular shaped polygon receptacles that are longer than wide as viewed from the top direction; wherein each irregular shaped polygon receptacle selected from the plurality of irregular shaped polygon receptacles is an irregular shaped hexagon formed from a pair of the perimeter-walls that are parallel but not linear and two of the radial walls; wherein the plurality of irregular shaped polygon receptacles partially circumscribe a remainder of the one or more center receptacles that is not circumscribed by a plurality of trapezoid shaped receptacles.

7. The organizer according to claim 1, wherein the plurality of receptacles are disposed within two, or three concentric octagons as viewed from the top direction.

8. The organizer according to claim 1, wherein the top edges of the perimeter-walls associated with each receptacle selected from the one or more receptacles are crenulated.

9. The organizer according to claim 1, wherein the plurality of receptacles comprise one or more center receptacles and a plurality of trapezoid shaped receptacles and a plurality of irregular shaped polygon receptacles; wherein each irregular shaped polygon receptacle selected from the plurality of irregular shaped polygon receptacles is an irregular shaped hexagon formed from a pair of the perimeter-walls that are parallel but not linear and two of the radial walls; wherein the one or more center receptacles are located closest to the center of the vertical-organizer as viewed from the top direction; wherein the plurality of trapezoid shaped receptacles partially circumscribe the one or more center receptacles; and wherein the plurality of irregular shaped polygon receptacles partially circumscribe a remainder of the one or more center receptacles that is not circumscribed by the plurality of trapezoid shaped receptacles, such that together, the plurality of trapezoid shaped receptacles and the plurality of irregular shaped polygon receptacles completely circumscribe the one or more center receptacles.

10. The organizer according to claim 9, wherein the side-walls of each center receptacle selected from the one or more center receptacles are formed from at least two of the radial-walls and at least one of the perimeter-walls; wherein the at least two of the radial-walls terminate together at the center; and disposed away from the center is the at least one of the perimeter-walls that connects to each of the at least two of the radial-walls forming the one or more center receptacles.

11. The organizer according to claim 9, wherein the side-walls of each trapezoid shaped receptacle selected from the plurality of trapezoid shaped receptacles is formed from at least two of the perimeter-walls and from at least two of the radial-walls; wherein the at least two of the perimeter-walls are substantially parallel to each other; and each of the at least two of the perimeter-walls connects to a different radial-wall of the at least of the two radial-walls.

12. The organizer according to claim 1, wherein at least one side-wall selected from the side-walls comprises an access-slot that is an opening through a thickness of the at least one side-wall; wherein the access-slot is elongate.

13. The organizer according to claim 1, wherein at least one of the side-walls is removable.

14. The organizer according to claim 1, wherein one or more of the side-walls are substantially constructed of substantially transparent materials of construction.

15. The organizer according to claim 1, wherein the vertical-organizer further comprises one or more photo-holders; wherein the one or more photo-holders are planar members that are attached to at least one outer back of an exterior outside surface of the vertical-organizer via an attachment means; wherein attachment of the one or more photo-holders to the outer back of the exterior outside surface of the vertical-organizer forms a sleeve sized to removably hold at least one photograph within the sleeve; wherein the one or more photo-holders is substantially transparent to permit viewing of the at least one photograph when that at least one photograph is removably inserted into the sleeve; and wherein each photo-holder selected from the one or more photo-holders comprises one or more of at least one access-hole or at least one access-slot; wherein the at least one access-hole or the at least one access-slot permits a user to touch a portion of the at least one photograph when the at least one phonograph is removably located within the sleeve for purposes of inserting or removing the at least one photograph from the sleeve.

16. The organizer according to claim 1, wherein the organizer further comprises one or more of the following:
at least one horizontal-organizer; wherein the at least one horizontal-organizer comprises at least one enclosure; wherein the at least one enclosure is sized to removably house stationary; wherein the at least one enclosure is formed from at least three enclosure-side-walls, at least one enclosure-bottom, and at least one enclosure-top; wherein the at least three enclosure-side-walls extend substantially perpendicular away from the at least one enclosure-bottom to connect and support the at least one enclosure-top; wherein the at least one-enclosure-top is disposed opposite from the at least one-enclosure bottom; wherein the at least three enclosure-side-walls comprise a first-enclosure-side-wall, a second-enclosure-side-wall, and a back-enclosure-side-wall; wherein the first-enclosure-side-wall is disposed opposite of the second-enclosure-side-wall; wherein the first-enclosure-side-wall and the second-enclosure-side-wall are substantially parallel to each other; wherein the first-enclosure-side-wall and the second-enclosure-side-wall are substantially perpendicular to the back-enclosure-side-wall; wherein the at least one enclosure further comprises at least one enclosure-opening, wherein the at least one enclosure-opening is disposed opposite of the back-enclosure-wall; wherein at least one enclosure-bottom, the at least one enclosure-top, and the at least three enclosure-side-walls substantially bound an enclosure-volume; wherein the stationary is removably stored substantially within the enclosure-volume; wherein access to the enclosure-volume is provided through the at least one enclosure-opening;
at least one charging module that is removably attached to the at least one horizontal-organizer via an attachment means; wherein the at least one charging module comprises a circuit; wherein the circuit comprises at least one standard electrical outlet for receiving a standard electrical plug; wherein the circuit comprises at least one port for removably connecting to at least one charging cable of at least one computing device; wherein the at least one charging module provides electrical power to the at least one computing device; and a turntable for rotating objects in communication with the turntable; wherein the turntable is disposed beneath and in communication with the at least one horizontal-organizer or wherein the turntable is disposed beneath and in communication with the vertical-organizer; wherein the objects are one or more of the vertical-organizer or the at least one horizontal-organizer.

* * * * *